(12) United States Patent
Bastawala et al.

(10) Patent No.: US 11,567,934 B2
(45) Date of Patent: Jan. 31, 2023

(54) CONSISTENT CLIENT-SIDE CACHING FOR FINE GRAINED INVALIDATIONS

(71) Applicant: Oracle International Corporation, redwood shores, CA (US)

(72) Inventors: Mehul Bastawala, Sunnyvale, CA (US); Atrayee Mullick, Santa Clara, CA (US); George Eadon, Hollis, NH (US); Ramesh Kumar, Foster City, CA (US)

(73) Assignee: Oracle International Corporation

( * ) Notice: Subject to any disclaimer, the term of this patent is extended or adjusted under 35 U.S.C. 154(b) by 622 days.

(21) Appl. No.: 15/958,517

(22) Filed: Apr. 20, 2018

(65) Prior Publication Data

US 2019/0325052 A1 Oct. 24, 2019

(51) Int. Cl.
*G06F 16/2453* (2019.01)
*G06F 12/0891* (2016.01)
*G06F 16/23* (2019.01)

(52) U.S. Cl.
CPC .... *G06F 16/24539* (2019.01); *G06F 12/0891* (2013.01); *G06F 16/2379* (2019.01); *G06F 2212/1044* (2013.01)

(58) Field of Classification Search
None
See application file for complete search history.

(56) References Cited

U.S. PATENT DOCUMENTS

| | | | |
|---|---|---|---|
| 5,544,345 A | 8/1996 | Carpenter | |
| 5,581,704 A * | 12/1996 | Barbara | G06F 12/0815 710/52 |
| 5,864,854 A | 1/1999 | Boyle | |
| 5,963,959 A | 10/1999 | Sun et al. | |
| 6,026,413 A | 2/2000 | Challenger et al. | |
| 6,549,917 B1 | 4/2003 | Pollard et al. | |
| 6,728,747 B1 | 4/2004 | Jenkins et al. | |
| 6,823,514 B1 | 11/2004 | Degenaro | |
| 6,912,562 B1 | 6/2005 | Krishnamurthy et al. | |

(Continued)

OTHER PUBLICATIONS

Oracle, "Oracle Database Development Guide", Jul. 2014 (Year: 2014).*

(Continued)

*Primary Examiner* — Yu Zhao
(74) *Attorney, Agent, or Firm* — Vista IP Law Group, LLP

(57) ABSTRACT

An approach for implementing function semantic based partition-wise SQL execution and partition pruning in a data processing system is provided. The system receives a query directed to a range-partitioned table and determines if operation key(s) of the query include function(s) over the table partitioning key(s). If so, the system obtains a set of values corresponding to each partition by evaluating the function(s) on a low bound and/or a high bound table partitioning key value corresponding to the partition. The system may then compare the sets of values corresponding to different partitions and determine whether to aggregate results obtained by executing the query over the partitions based on the comparison. The system may also determine whether to prune any partitions from processing based on a set of correlations between the set of values for each partition and predicate(s) of the query including function(s) over the table partitioning key(s).

20 Claims, 54 Drawing Sheets

(56) References Cited

U.S. PATENT DOCUMENTS

| | | | |
|---|---|---|---|
| 6,917,976 | B1 | 7/2005 | Slaughter et al. |
| 6,950,823 | B2 | 9/2005 | Amiri et al. |
| 6,957,236 | B1 | 10/2005 | Ganesh et al. |
| 6,976,022 | B2 | 12/2005 | Vemuri et al. |
| 6,981,004 | B2 | 12/2005 | Ganesh et al. |
| 7,181,476 | B2 | 2/2007 | Lee et al. |
| 7,240,091 | B1 | 7/2007 | Hopmann et al. |
| 7,376,682 | B2 | 5/2008 | Ramacher et al. |
| 7,523,342 | B1 | 4/2009 | Fu et al. |
| 7,526,508 | B2 | 4/2009 | Tan et al. |
| 9,305,056 | B1* | 4/2016 | Gupta .............. G06F 16/24552 |
| 9,697,253 | B2* | 7/2017 | Chidambaran ... G06F 16/24552 |
| 10,296,629 | B2* | 5/2019 | Chidambaran ... G06F 16/24539 |
| 2001/0034736 | A1 | 10/2001 | Eylon et al. |
| 2002/0064149 | A1 | 5/2002 | Elliott et al. |
| 2002/0087798 | A1 | 7/2002 | Perincherry et al. |
| 2002/0107835 | A1 | 8/2002 | Coram et al. |
| 2002/0116457 | A1 | 8/2002 | Eshleman |
| 2003/0004952 | A1 | 1/2003 | Nixon et al. |
| 2003/0009431 | A1 | 1/2003 | Souder et al. |
| 2003/0046286 | A1 | 3/2003 | Jacobs et al. |
| 2003/0204517 | A1 | 10/2003 | Skinner et al. |
| 2003/0217081 | A1 | 11/2003 | White et al. |
| 2004/0015504 | A1 | 1/2004 | Ahad et al. |
| 2004/0054643 | A1 | 3/2004 | Vemuri et al. |
| 2004/0054644 | A1 | 3/2004 | Ganesh et al. |
| 2004/0085980 | A1 | 5/2004 | Lee |
| 2004/0193653 | A1* | 9/2004 | Howard .............. G06F 16/2358 |
| 2004/0205057 | A1* | 10/2004 | Hutchison ........... G06F 16/2471 |
| 2004/0220961 | A1 | 11/2004 | Lee et al. |
| 2004/0267824 | A1 | 12/2004 | Pizzo et al. |
| 2005/0055381 | A1 | 3/2005 | Ganesh et al. |
| 2005/0055384 | A1 | 3/2005 | Ganesh et al. |
| 2005/0055672 | A1 | 3/2005 | Ramacher et al. |
| 2005/0055673 | A1 | 3/2005 | Dias et al. |
| 2005/0086195 | A1 | 4/2005 | Tan et al. |
| 2005/0108203 | A1 | 5/2005 | Tang et al. |
| 2005/0240943 | A1 | 10/2005 | Smith et al. |
| 2005/0246716 | A1 | 11/2005 | Smith et al. |
| 2006/0036676 | A1 | 2/2006 | Cardone et al. |
| 2006/0136508 | A1 | 6/2006 | Idicula et al. |
| 2006/0271510 | A1 | 11/2006 | Harward et al. |
| 2006/0271511 | A1 | 11/2006 | Harward et al. |
| 2006/0271557 | A1* | 11/2006 | Harward .............. G06F 9/45504 |
| 2007/0143344 | A1 | 6/2007 | Luniewski |
| 2007/0244918 | A1 | 10/2007 | Lee et al. |
| 2008/0095339 | A1 | 4/2008 | Elliott et al. |
| 2008/0098041 | A1* | 4/2008 | Chidambaran ... G06F 16/24552 |
| 2008/0098173 | A1* | 4/2008 | Chidambaran ... G06F 16/24552 711/118 |
| 2008/0235291 | A1 | 9/2008 | Lahiri et al. |
| 2009/0109959 | A1 | 4/2009 | Elliott et al. |
| 2019/0102297 | A1* | 4/2019 | Jaskiewicz .............. G06F 16/00 |

OTHER PUBLICATIONS

Non-Final Office Action for U.S. Pat. No. 10,296,629 dated Nov. 16, 2009.
Final Office Action for U.S. Pat. No. 10,296,629 dated May 26, 2010.
Non-Final Office Action for U.S. Pat. No. 10,296,629 dated Feb. 27, 2012.
Creekbaum et al., "Snapshot Concepts & Architecture", Oracle8i Replication, Release 2 (8.1.6), A76959-01, Oracle Corporation (Feb. 1999).
Non-Final Office Action for U.S. Pat. No. 9,697,253 dated Jul. 21, 2010.
Final Office Action for U.S. Pat. No. 9,697,253 dated Dec. 14, 2010.
Advisory Action for U.S. Pat. No. 9,697,253 dated Feb. 23, 2011.
Final Office Action for U.S. Pat. No. 10,296,629 dated Aug. 6, 2012.
Advisory Action for U.S. Pat. No. 10,296,629 dated Oct. 16, 2012.
Fielding et al., "Method Definitions", Hypertext Transfer Protocol, HTTP/1.1 RFC 2616, Copyright (C) The Internet Society (Jun. 1999), 5 pages.
Non-Final Office Action for U.S. Pat. No. 9,697,253 dated May 2, 2013.
Final Office Action dated Nov. 15, 2013, for U.S. Pat. No. 9,697,253.
Advisory Action dated Feb. 24, 2014, for U.S. Pat. No. 9,697,253.
Non-final Office Action dated Jan. 30, 2015 for U.S. Pat. No. 10,296,629.
Final Office Action dated Aug. 25, 2015, for related U.S. Pat. No. 10,296,629.
Non-final Office Action dated Nov. 5, 2015, for related U.S. Pat. No. 9,697,253.
Non-final Office action dated Aug. 31, 2016 for related U.S. Pat. No. 9,697,253.
Notice of Allowance and Fee(s) due dated Feb. 17, 2017 for related U.S. Pat. No. 9,697,253.
Non-Final Office Action dated May 3, 2018, for related U.S. Pat. No. 10,296,629.
Notice of Allowance dated Jan. 4, 2019, for related U.S. Pat. No. 10,296,629.
Advisory Action for U.S. Pat. No. 10,296,629 dated Aug. 5, 2010.

* cited by examiner

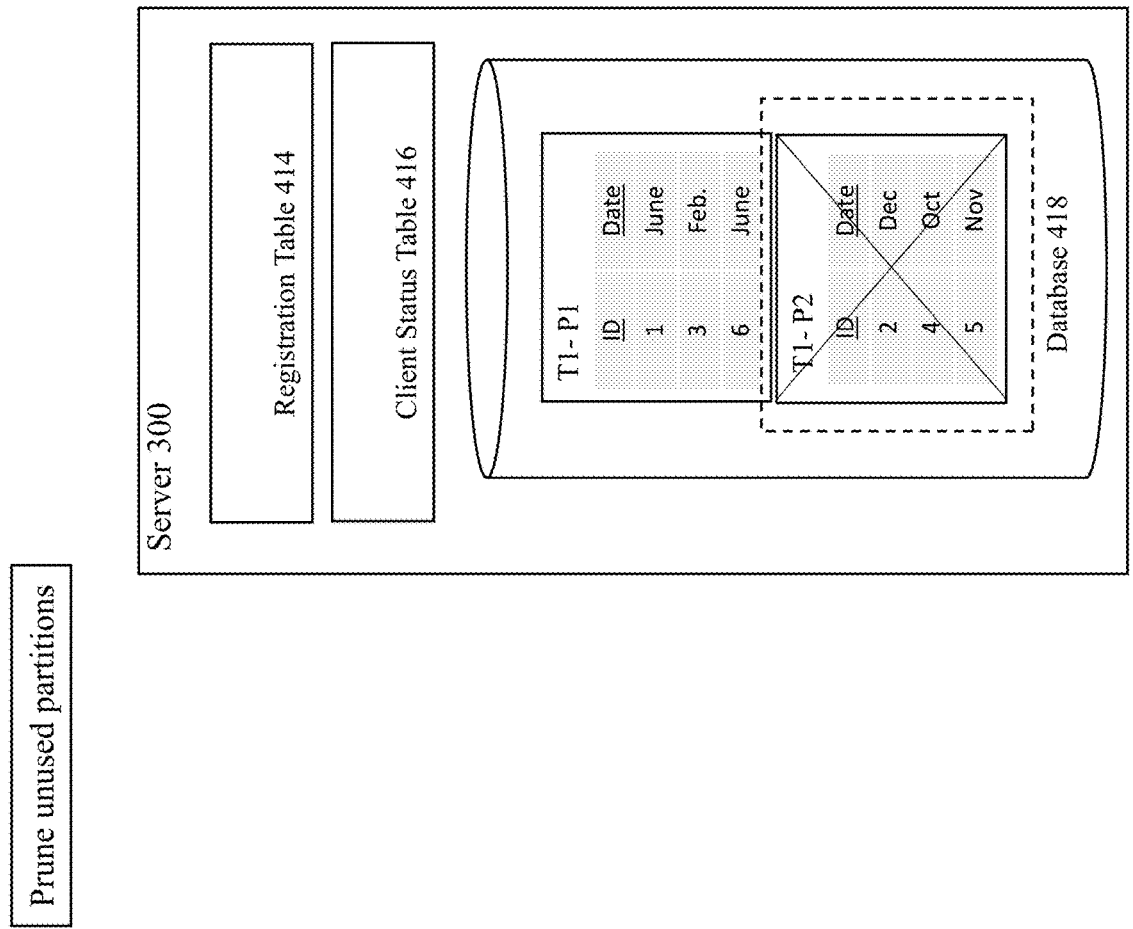
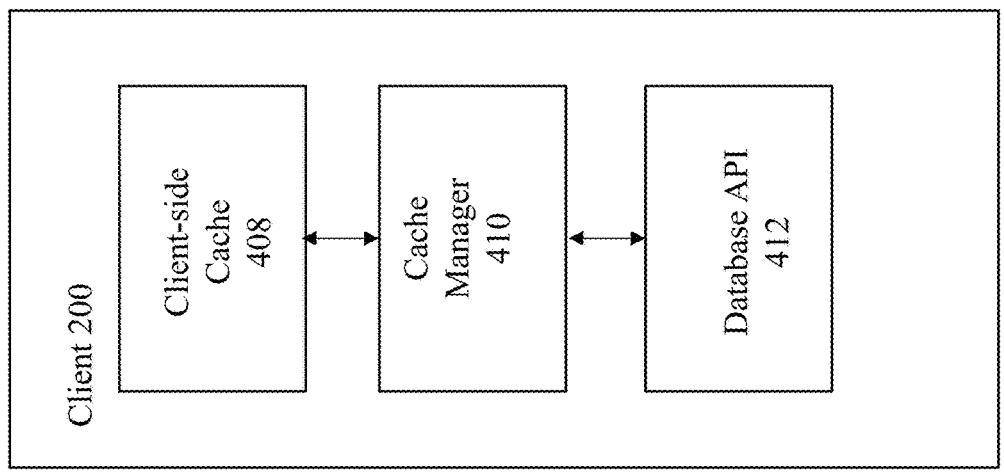
Fig. 4c

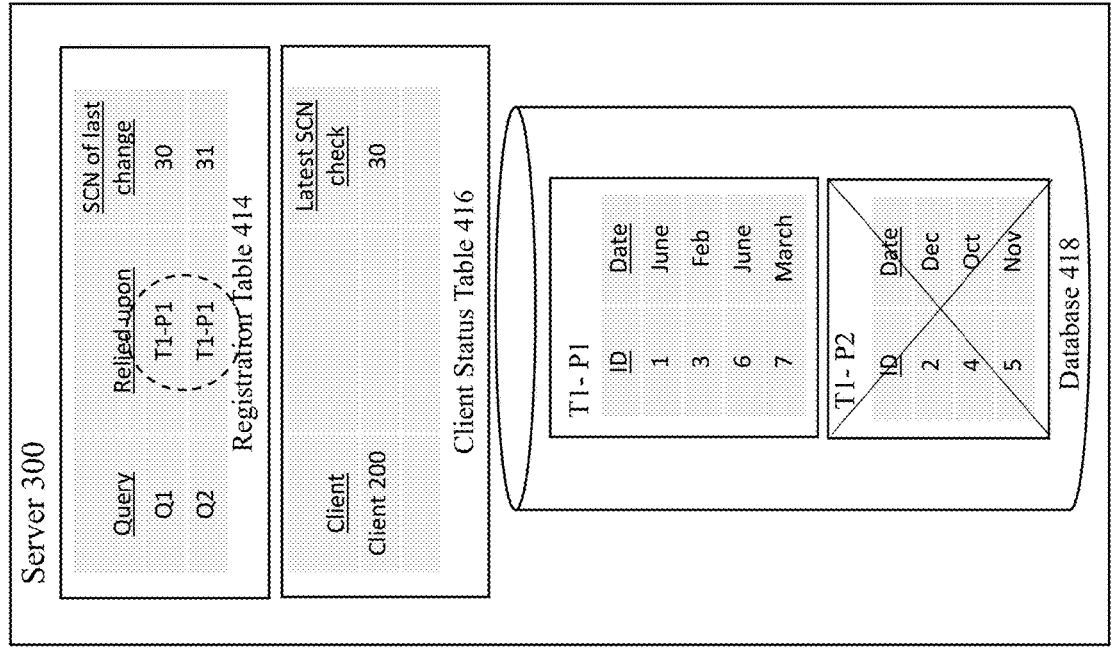
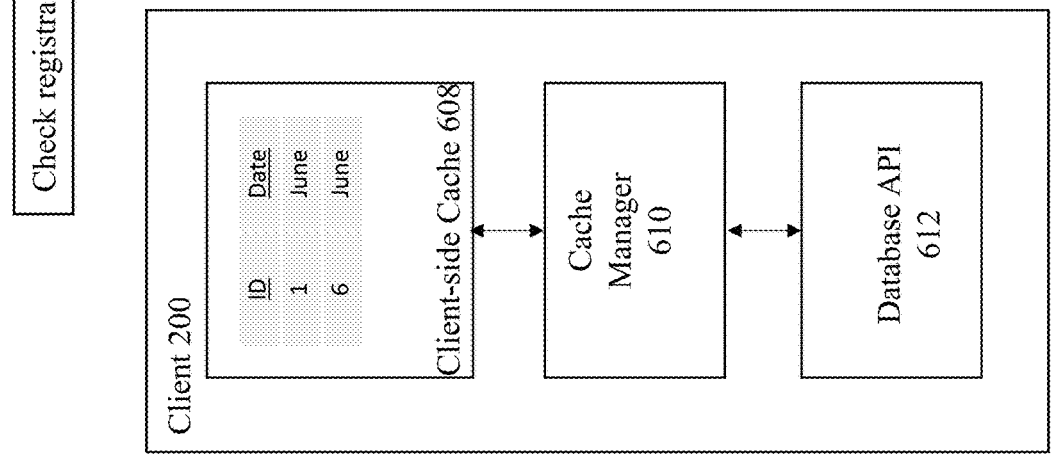
Fig. 6c

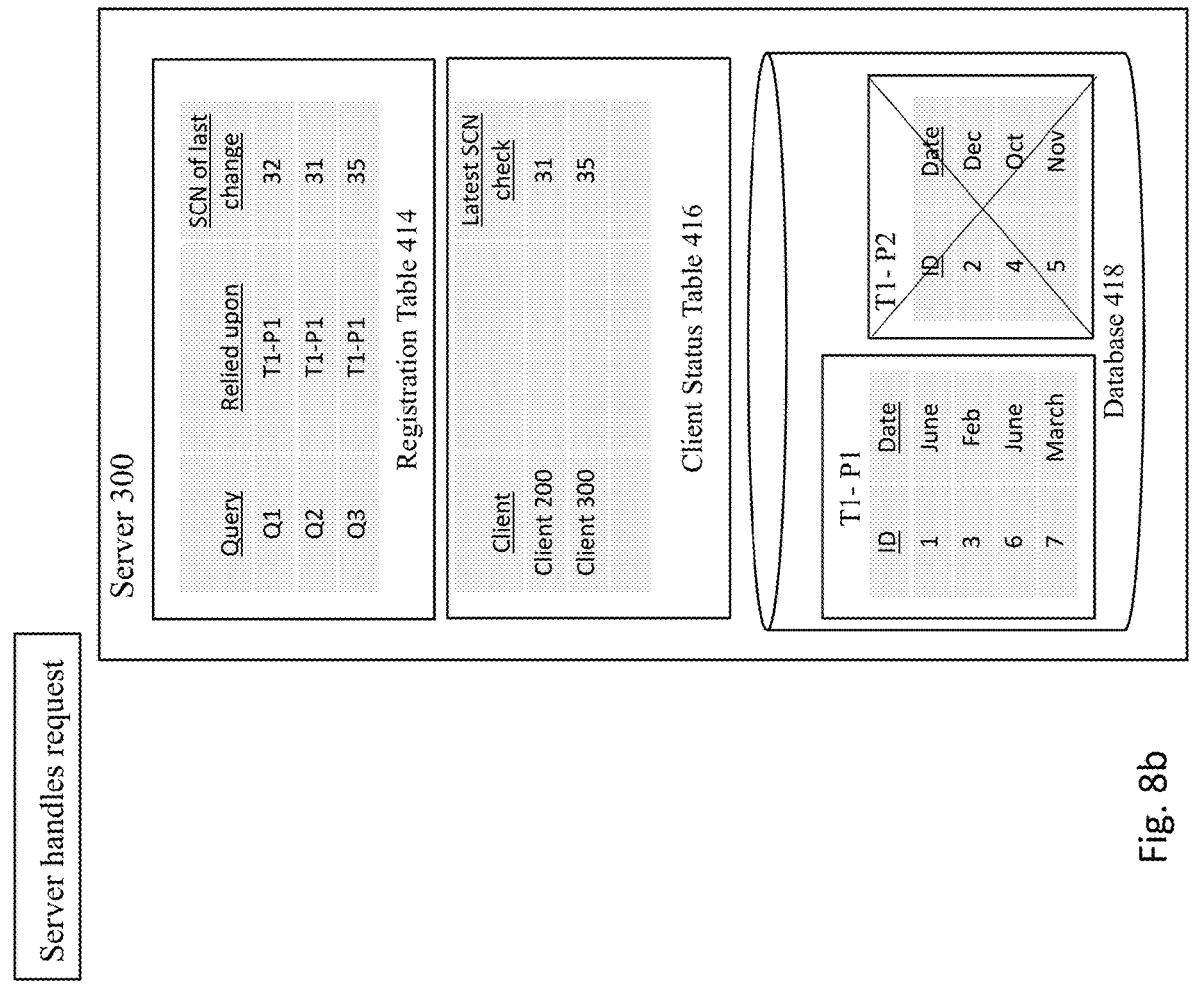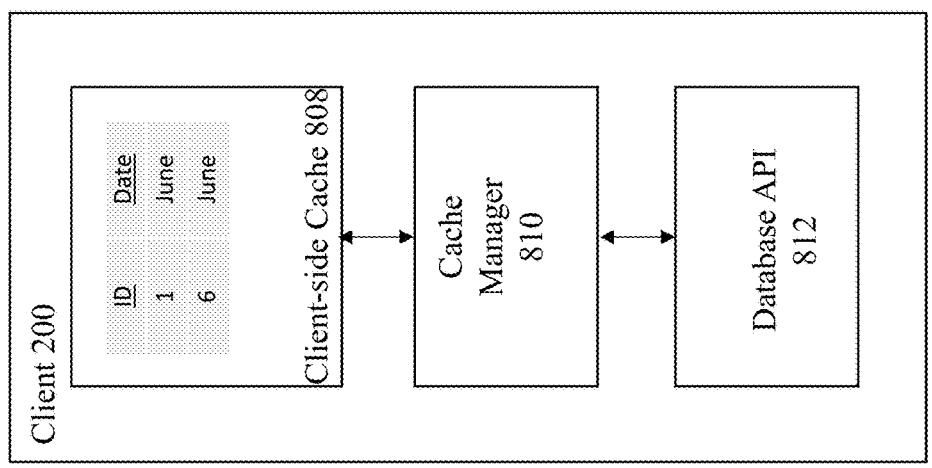
Fig. 8b

CONSISTENT CLIENT-SIDE CACHING FOR FINE GRAINED INVALIDATIONS

FIELD

Embodiments of the invention relate to database systems and, more particularly, to a client-side cache in computer systems.

BACKGROUND

In computer systems, a cache refers to a fast-access storage mechanism (such as memory) that holds data so that future requests for that data may be served faster from cache. The data stored in the cache may be the result of an earlier computation, or the duplicate of data stored elsewhere. A data or data item of which a copy is stored in cache is referred to as a source data item. The copy of the source item in the cache is referred to as a cache copy.

Caches are particularly helpful when the original data is expensive to fetch or expensive to compute relative to retrieval from a cache. The process of managing a cache is referred to as cache management. Cache management includes retrieving copies of source data items and storing them in a cache, providing valid cache copies to clients that request copies of a source data item, and maintaining and optimizing the use of a cache. A cache management system may include modules which may be composed of specialized software dedicated to managing one or more caches and may be executed by clients of a cache or servers of the source data, or a combination thereof.

In the context of databases, database caching can substantially improve the efficiency and throughput of database operations/applications, e.g., while processing indexes, data dictionaries and frequently used subsets of data. Database caches greatly improve the scalability and performance of applications that access databases by caching frequently used data.

A client-side query cache is a cache that is located at the database client. There are numerous advantages provided by the client-side cache. For example, if the requested data is located at the cache on the client, the requested data may be retrieved from the cache and thus eliminate the cost and expense of sending the request to the server and receiving the response from the server to retrieve query results. Client machines may also be added horizontally to provide caching capabilities in client memory and reduce the expense of setting up additional servers in supporting caching query results. Furthermore, storage on the client side offers the benefit of not only having the queries closer to the client but also ensure that the client's most relevant query results are stored at that client.

However, storage of query results in a client-side cache may introduce problems pertaining to the correctness of the query results within that cache. Database systems often need to guarantee the validity of query results with respect to transactional consistency, and therefore even if the query results data is obtained from a client-side cache instead of a server, it is expected that cached data being retrieved should not violate the expected guarantees of validity and correctness. For any caches that exist on the server-side (as opposed to the client-side), the correctness of cached data is easily managed since the server can simultaneously execute transactional operations while invalidating data that is out-of-date within its own server-side cache. However, it is a significant challenge to maintain the correctness of data within client-side caches, given the large number of clients in modern database systems with each client having its own cache, and considering the diverse sets of cached data that exists within the caches of each respective client.

Therefore, there is a need for an improved method and mechanism to efficiently and effectively manage invalidations of cached data within database client-side caches.

SUMMARY

Embodiments of the present invention provide a method, system, and a computer product for registering queries and various objects within a system that are tied to that query and tracking query registrations based on partition and sub partition ids, columns in select query, and bind variables. The data manipulation language commands (DMLs) will not invalidate all cached queries on tables, but only those queries with matching partition info, columns, and bind variables. As such, a fine grained invalidation based consistent client cache is described where cache invalidations are pruned by looking at partition information, column names, or bind values.

Further details of aspects, objects, and advantages of the invention are described below in the detailed description, drawings, and claims. Both the foregoing general description and the following detailed description are exemplary and explanatory. They are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 4A-4F illustrates an example directed toward receiving a query with partitioning according to some embodiments of the invention

FIGS. 6A-6D illustrates an example of invalidating a registered query with an update according to some embodiments of the invention.

FIGS. 8A-8E illustrates an example of piggybacking an invalidation response according to some embodiments of the invention.

FIGS. 10A-10M illustrates an example of registering queries that rely on column-based invalidations according to some embodiments of the invention.

DETAILED DESCRIPTION OF THE EMBODIMENTS OF THE INVENTION

Figure 1:
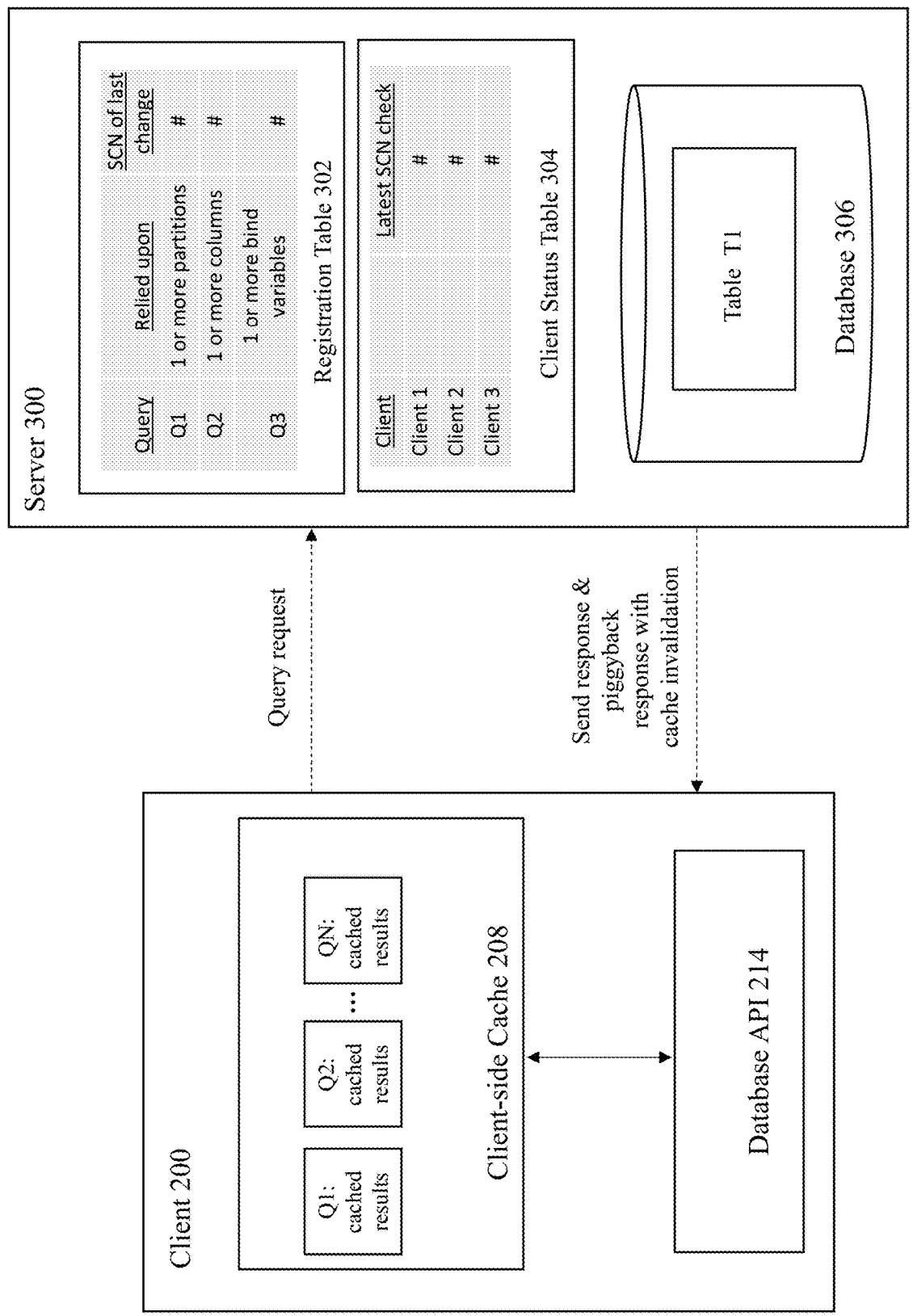
FIG. 1 depicts an architecture for implementing consistent client-side cache.

Embodiments of the present invention provide methods, systems, and a computer product for efficiently managing invalidations of cached data within database client-side caches.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

As noted above, a significant challenge exists when attempting to maintain the correctness of data within client-side caches. One possible approach to address this problem is to perform table-based tracking of changes with respect to cached data in client-side caches. In this approach, as transactions are processed at the database server, specific queries may be identified which are reliant upon one or more tables that are changed by a given transaction. Any results-set data for those queries that are maintained at client-side caches can then be invalidated by identifying which of the queries identified as being reliant upon a changed dependency table is associated with cached results at a client.

The issue with this table-based tracking approach is that it operates at a relatively coarse level of invalidation. Consider the situation where an extremely large table was processed by an earlier query, and the results data for that query is now cached at a local client-side cache. Assume that a later transaction modified a very tiny portion of that extremely large table. Under the table-granularity invalidation approach described above, the entirety of that result set in the client-side cache would need to be invalidated, even though only a small portion of the underlying table that the query depends upon changed. In fact, it is even possible that the portion of the table that was changed was not even relied upon to produce the original results set, and hence the later transaction did not affect the content or validity of the cached results set.

Therefore, embodiments of the present invention provide an approach to implement fine-grained invalidation of client-side cached data that provides a much more accurate and efficient approach to identify the data in a client-side cache that needs to be invalidated. According to some embodiments, invalidation of client-side cached data is implemented by registering queries and various objects within a system that are tied to a given query and tracking query registrations based on partition and sub partition ids, columns in select query, and/or bind variables.

FIG. 1 illustrates components of a system used for registering queries and various objects within a system that are tied to that query and tracking query registrations based on partition and sub partition ids, columns in select query, and bind variables. In various embodiments, some aspects of the embodiments may be implemented separately or as a whole. For illustrative purposes, FIG. 1 shows a client 200 that communicates a query request that is received at server 300. However, in various embodiments, the client 200, as well as additional clients not pictured, may communicate additional queries to the server 300. Furthermore, conventional components of data processing systems and clients, such as detailed API layers, and the like are not shown so as to not obscure the components of the data processing system to be discussed with regard to FIG. 1.

In FIG. 1, database queries that have been previously requested by the client 200 using a Database Application Programming Interface (Database API) 214 are stored in a client-side cache 208. The client-side cache 208 has stored multiple query results, as depicted by Q1: cached results, Q2: cached results, ... QN: cached results. The client-side cache 208 reflects the contents of cached results from queries applied to one or more tables at the database server, such as table T1 from Database 306 on the Database Server 300.

The Database Server 300 may access or consist of the database 306 to fulfill SQL query requests or DML commands from the Client 200. In one or more embodiments, the Database Server 300 could access or consist of a cluster of databases and within the cluster broadcast received transactions to the other database instances within the cluster. In response to SQL query requests, the Database Server 300 will return one or more result sets generated upon execution of the SQL query by the Database 306.

To identify query results that may need to be invalidated, the server 300 maintains a Registration Table 302 to track the queries for which results are cached at a client. Each entry in this table corresponds to a different query, and includes at least three columns: (a) a first column holding the identifier for a specific query; (b) a second column to track any underlying dependencies relied upon to generate the query results for the registered query, where at least some of the underlying dependencies are at a fine-grained level of granularity (e.g., at levels smaller than an entire table); and (c) a time/commit number of the last change to a dependent data/structure/object for that query.

As explained in more detail below, the dependencies tracked by the Registration Table 300 can be at a level of granularity smaller than the table level. For example, the Registration Table 300 may track specific partitions that are relied upon and/or associated by a given query. In addition, the Registration Table 300 may track one or more columns relied upon and/or associated with a query. As another example, some embodiments may track one or more bind variables associated with a query. It is noted that these examples of tracked fine-grained dependencies are merely illustrative, and other types of fine-grained dependency levels may be tracked as well according to various embodiments of the invention.

With regard to the time/commit number of the last change tracked in the Registration Table 300, it is noted that a record of the state of the database (e.g., a snapshot) can typically be created when a transaction is executed as of a given state of the database. For example, a System Commit Number (SCN) often refers to a unique number assigned at the time of commit of a transaction, where the number monotonically increases within the database system. For the purposes of illustration and not by way of limitation, the term "SCN" will be used throughout this document to refer to identifiers for such committed changes within a database system.

The database system also includes a Client Status Table 304 that tracks the last time a given client was notified of possible invalidations of query results data cached at that client. Each entry in this table corresponds to a specific client, and each row in the table includes at least three columns: (a) a first column holding the identifier for a given client; (b) a second column to keep track of query IDs related to the client; and (c) a third column that identifies the latest SCN check for the client.

Figure 2:
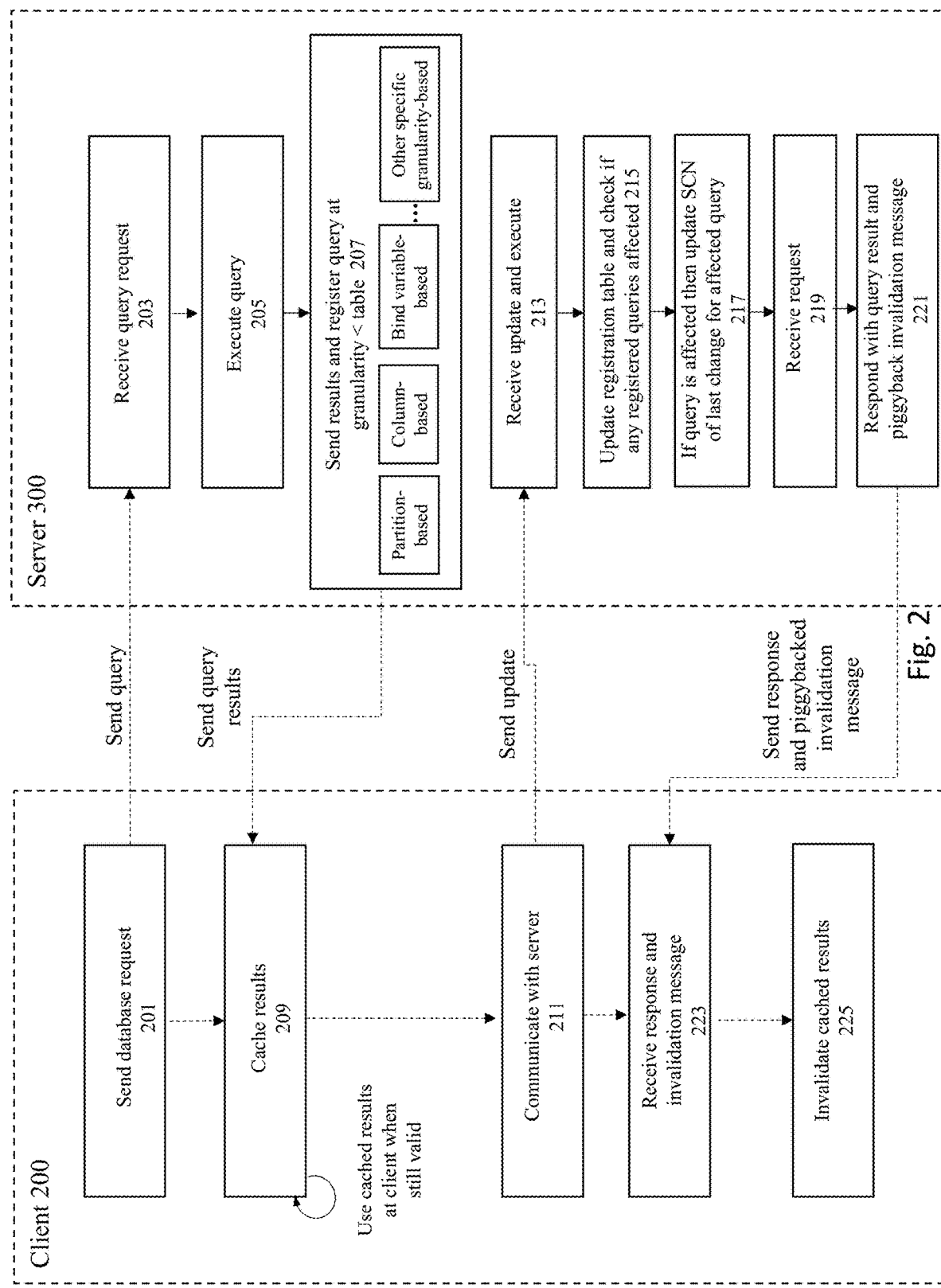
FIG. 2 is a flowchart of a process for implementing a consistent client-side cache.

FIG. 2 shows a flowchart of an approach to implement some embodiments of the invention, where the structures shown in FIG. 1 are employed to generate cache invalidations for registered queries that are pertinent to client 200. At 201, a client 200 sends a database request to the server, e.g., to execute a SQL query where the SQL query is delivered to the database server via the Database API 214. Next, at 203, the server 300 receives the query request from the client. At 205, the database server executes the query.

At 207, the server 300 sends the query results back to the client 200. If the query is deemed "cacheworthy", then the query is registered within the registration table 302. It is noted that not all query results are determined to have the correct criteria to be cached. For example, queries that are not likely to be repeated should not have its results cached. As another example, queries corresponding to results that are likely to be invalid very quickly should not be cached, e.g., where the queried tables undergo rapid/constant changes. For at least some of the entries within the registration table, the level of granularity for the registration is less than the granularity of a table (e.g., partition-based, column-based, bind variable based, or any other specific granularity smaller than a table).

If the query is deemed cacheworthy, then at 209, the query results sent by the database server are stored in a caching mechanism at the client (e.g., in a memory device located at the client). The client can thereafter continue to access those cached query results while they are still valid, instead of being required to repeatedly send the query to the server to be re-processed to re-generate the query results.

At a future point in time at 211, a request may be received by the server to update one or more objects within the database. For example, an update operation may be received by the database server from another client to update one or more rows within a table managed by the database server.

At 213, the server checks whether there are any registered queries that have been affected by the update operation (that was performed at 211). If so, then at 217, the server updates the affected entries within the registration table with the current SCN of the transaction that made the update.

At a later time at 222, the client may send a request/communication to the server. The general idea is that any request that is received at the server at 219 from the client will require a response that can be usefully utilized to "piggyback" additional invalidation information from the server to the client. Therefore, the request may pertain to any type of request for any topic or object of interest, whether or not the request is related to the data currently cached in the client-side cache—it does not matter since the response message is being used as a vehicle for notifying the client of invalidations without requiring a separate/dedicated roundtrip between the entities just for the invalidation message.

A check is made of the queries associated with the client in the client status table 304. For any such queries, a check is made within the registration table 302 as to whether any queries associated with the client has a SCN that is greater than the time of the last SCN check by the client. If so, then this indicates that since the last time the client communicated with the server, an intervening transaction has made a change to a dependent object for a query registered with the client. In this situation, at 221, when the server responds back to the client with the response to the client request, the response message will also include a piggybacked invalidation message for query results affected by the later update to a dependent object.

At 223, the client 200 receives the response and piggybacked invalidation message. Thereafter, at 225, the client will invalidate the cached results that are stored in the client-side cache identified in the invalidation message.

Partition-Based or Sub-Partition Invalidations

This portion of the document will now describe an approach to implement a consistent client-side cache for partition-based registrations of queries according to some embodiments of the invention.

Partitioning addresses key issues in supporting large database tables and indexes by decomposing them into smaller and more manageable pieces called partitions. SQL queries and DML, statements do not need to be modified to access partitioned tables. This allows partitioning to be transparent to an application. For partitioned table (or index) each partition is stored in its own data (or index) segment, with its own set of extents. A partitioned object typically has a partitioning key, which consists of one or more columns that determine the partition where each row is stored. A database may automatically perform insert, update, and delete operations to the appropriate partition using the partitioning key. For queries that have predicates on the partition key, the results can be achieved by accessing a subset of partitions, rather than the entire table. For some queries, this technique of partition pruning can improve performance by multiple orders of magnitude. Partitioning can use several different methods to distribute the data into partitions. HASH partitioning maps data to partitions by hashing the value of the partition key; RANGE partitioning associates a range or partition key values with each partition; and LIST partitioning associates a list of discrete partition key values with each partition. An object can be composite partitioned where it is partitioned by one key and data distribution method and then each partition is further subdivided into subpartitions using a second key and data distribution method.

Figure 3:
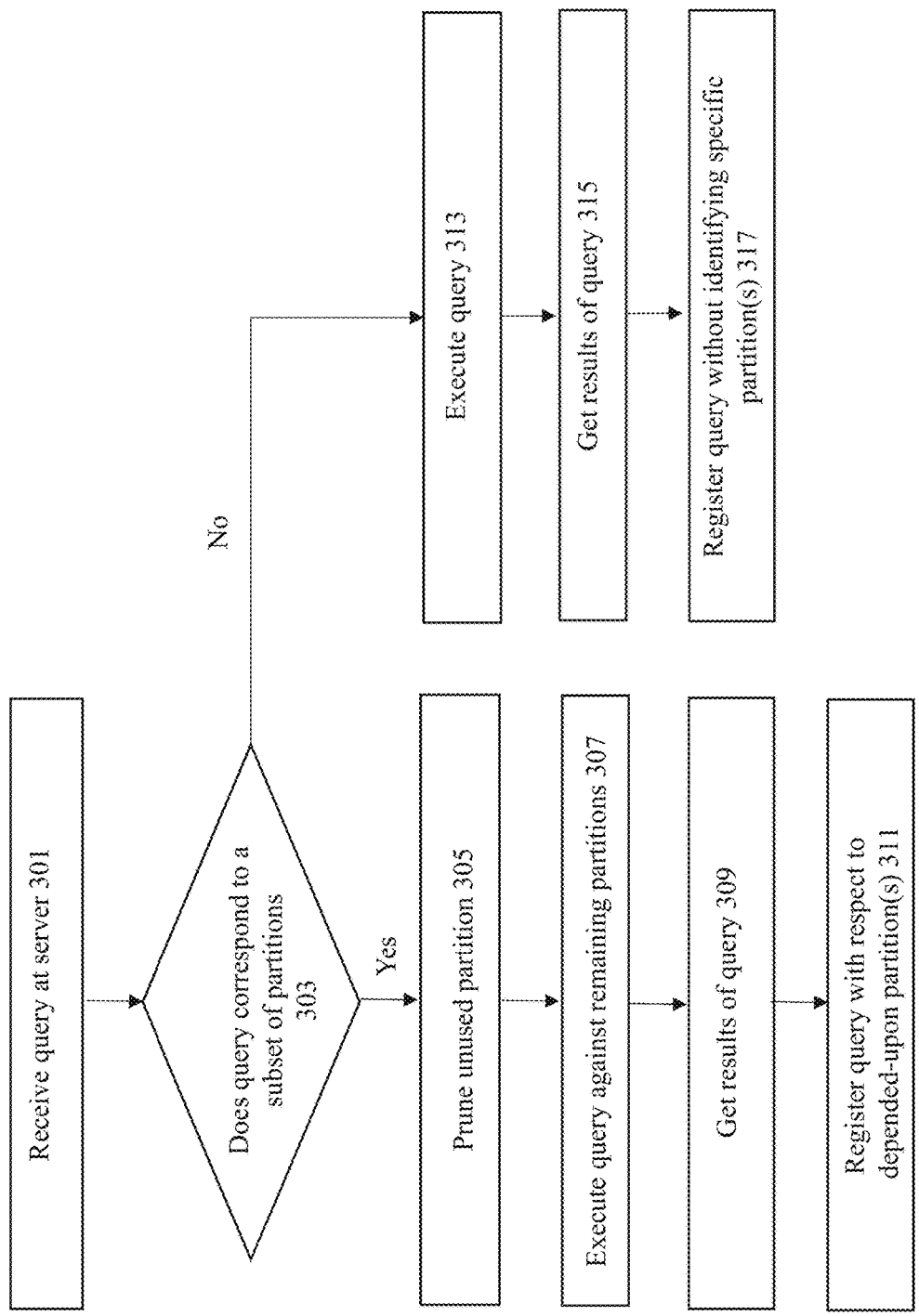
FIG. 3 is a flowchart of a process for implementing a consistent client-side cache for partition-based registrations according to some embodiments of the invention.

FIG. 3 shows a flowchart of an approach to implement a consistent client-side cache for partition-based registrations of queries according to some embodiments of the invention. In FIG. 3, the flowchart begins by receiving a query at the server 301. Next, a determination is made whether the query corresponds to a subset of partitions at 303. If the query does not correspond to a subset of partitions, then the query is executed at 313. The server will obtain the result of the query at 315 and register the query in the registration table without identifying specific partition(s) at 317.

However, if the determination is made that the query indeed corresponds to a subset of partitions, then the server prunes unused partitions at 305. At 307, the server executes the query against the remaining partitions. The server will obtain the result of the query at 309 and register the query in the registration table along with the depended-upon partition(s) at 311. During query registration, the system stores the subpartition IDs that the query is dependent on. When a DML operation occurs, the system is able to see the subpartition IDs mapped to those extent/segments where data impacted by DML resides in.

The set of partitions and subpartitions accessed by a query may be known when the query is compiled by the relational database management system (rdbms) and this is called static pruning. Alternatively, the set of partitions and subpartitions may not be known until the query is executed by the rdbms, and this is called "dynamic partition pruning." For example, dynamic partition pruning happens when there is a query that contains a predicate which involve a subquery, where the system does not know the results of the subquery until the query is executed. In one embodiment, when a query uses dynamic pruning, the system tracks which partitions are accessed during query execution and uses those partition and subpartition IDs for query registration. In another embodiment, query registration stores the object IDs for the table as part of a coarse grain registration. If each partition or sub-partition has a unique object ID, the system can include these sub-partition object IDs also in the query registration.

If an end user drops or adds new partitions, in one embodiment, the system can visit all queries relying on that partitioned table and modify their dependent partition IDs. The system them sends the invalidations to all clients. In another embodiment, the system drops the registered queries forcing the client caches to come to the server to re-execute and re-register the queries.

FIGS. 4A-4F illustrates an example of processing a query with partitioning according to some embodiments of the invention.

Figure 4A:
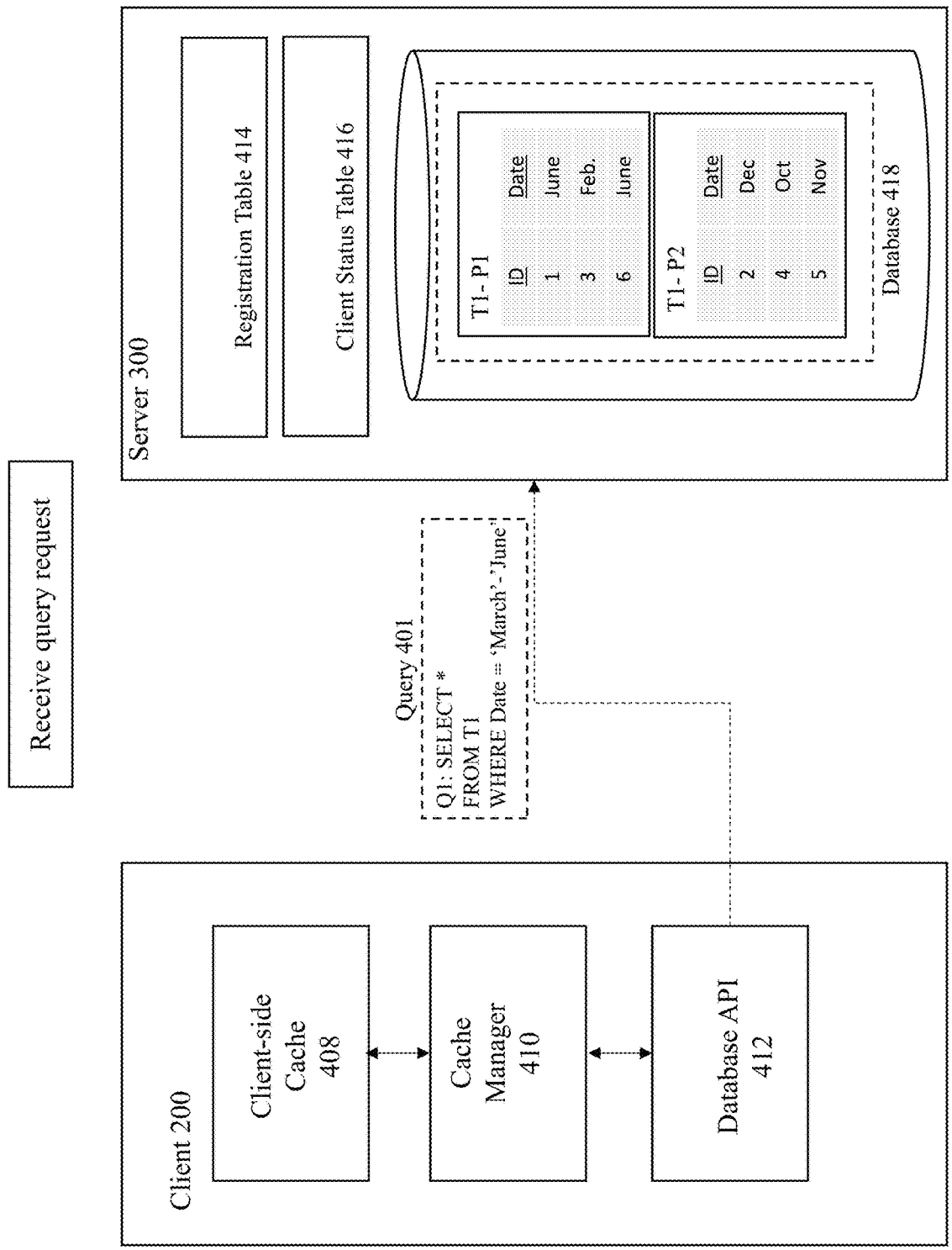
Figure 4B:
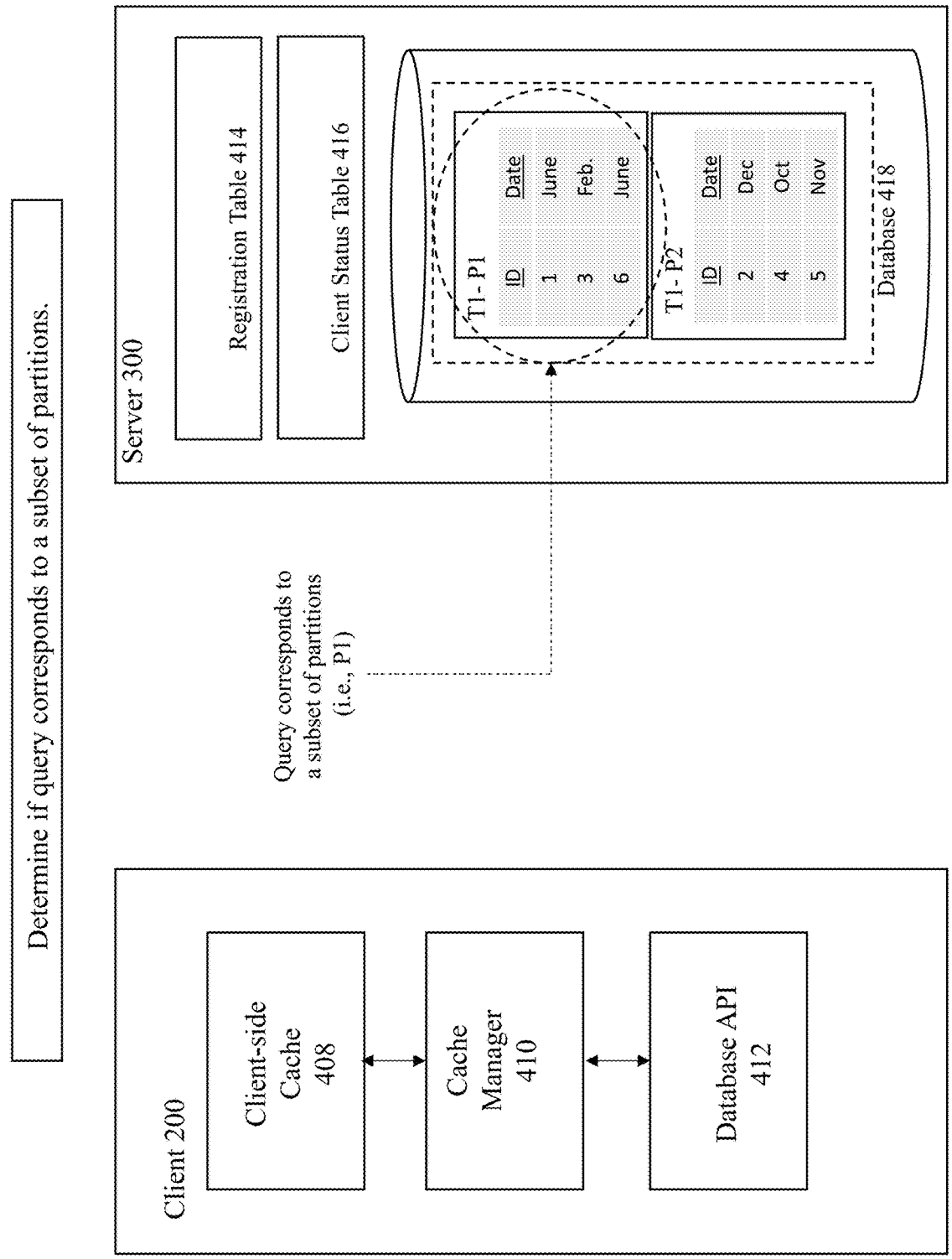

As shown in FIG. 4A, the Server 300 receives the following query 401: "SELECT*FROM t1 WHERE Date BETWEEN 'MARCH' AND 'JUNE'" In this example, the server 300 has made a determination that the query corresponds to a subset of partitions due to the nature of the two partitions T1-P1 and T1-P2, as shown in FIG. 4B, and determined that the query 401 is directed to a range-partitioned table and that the query 401 is capable of partition-wise execution. FIG. 4C shows the server pruning the unused partitioned table (e.g., T1-P1).

Figure 4D:
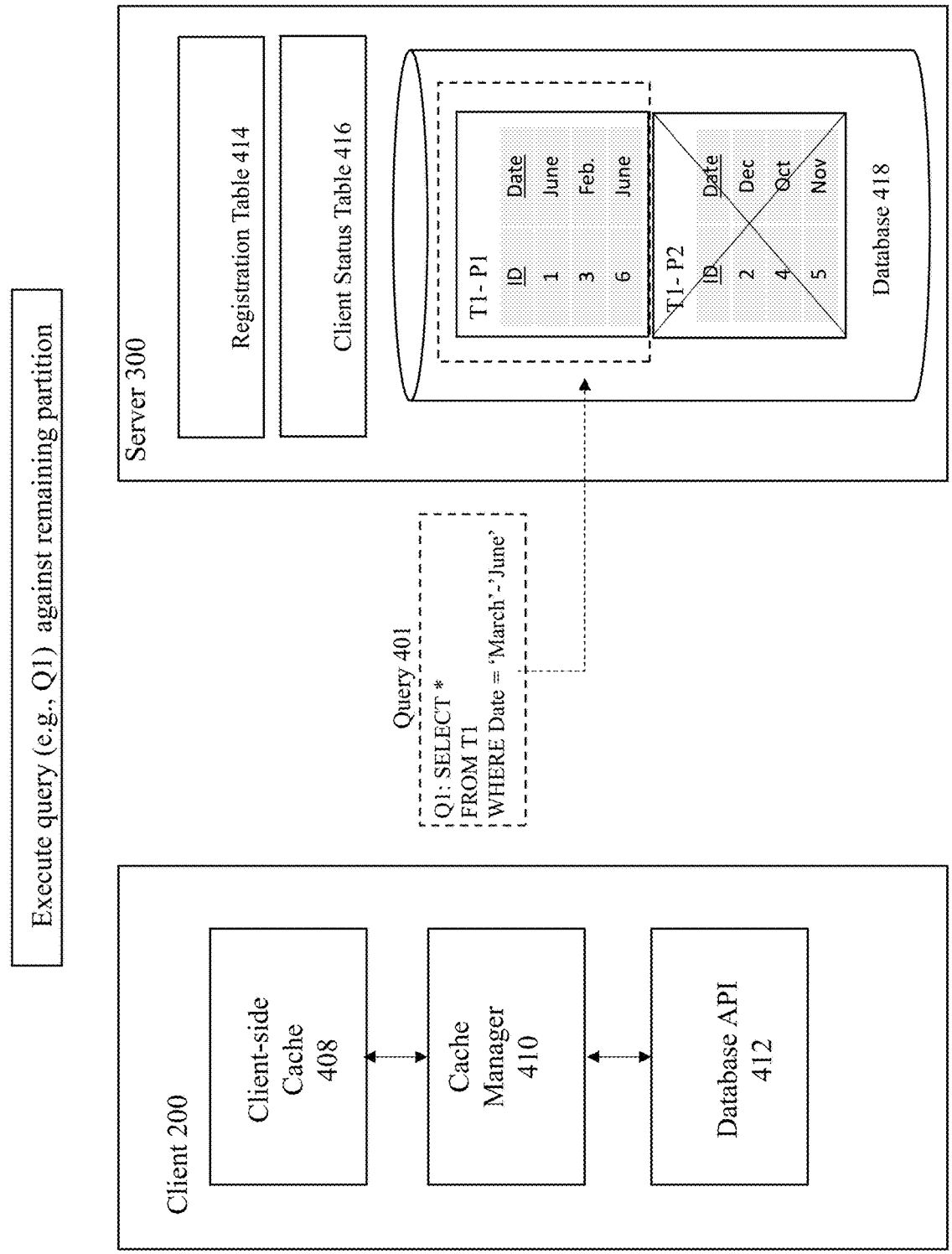

Next, the query 401 is executed against the remaining partition (T1-P1), as shown in FIG. 4D. Database transactions executed against the database may be assigned a Commit Snapshot having a respective SCN upon commit of a transaction. Each transaction may have its own database wide unique transaction ID and the Commit Snapshot is typically recorded in persistent journals (e.g., a registration table) atomically with the commit. It is possible with a transaction id to read the corresponding registration table and retrieve the transaction Commit Snapshot. In general, even if the Commit Snapshot cannot be accurately determined, it may be possible to determine an upper bound on the Commit Snapshot. Queries executed against the database may pick up a consistent Snapshot (i.e., the query result set may be guaranteed to contain the effects of all transactions that have a Commit Snapshot less than or equal to the Query Snapshot and no others.)

Figure 4E:
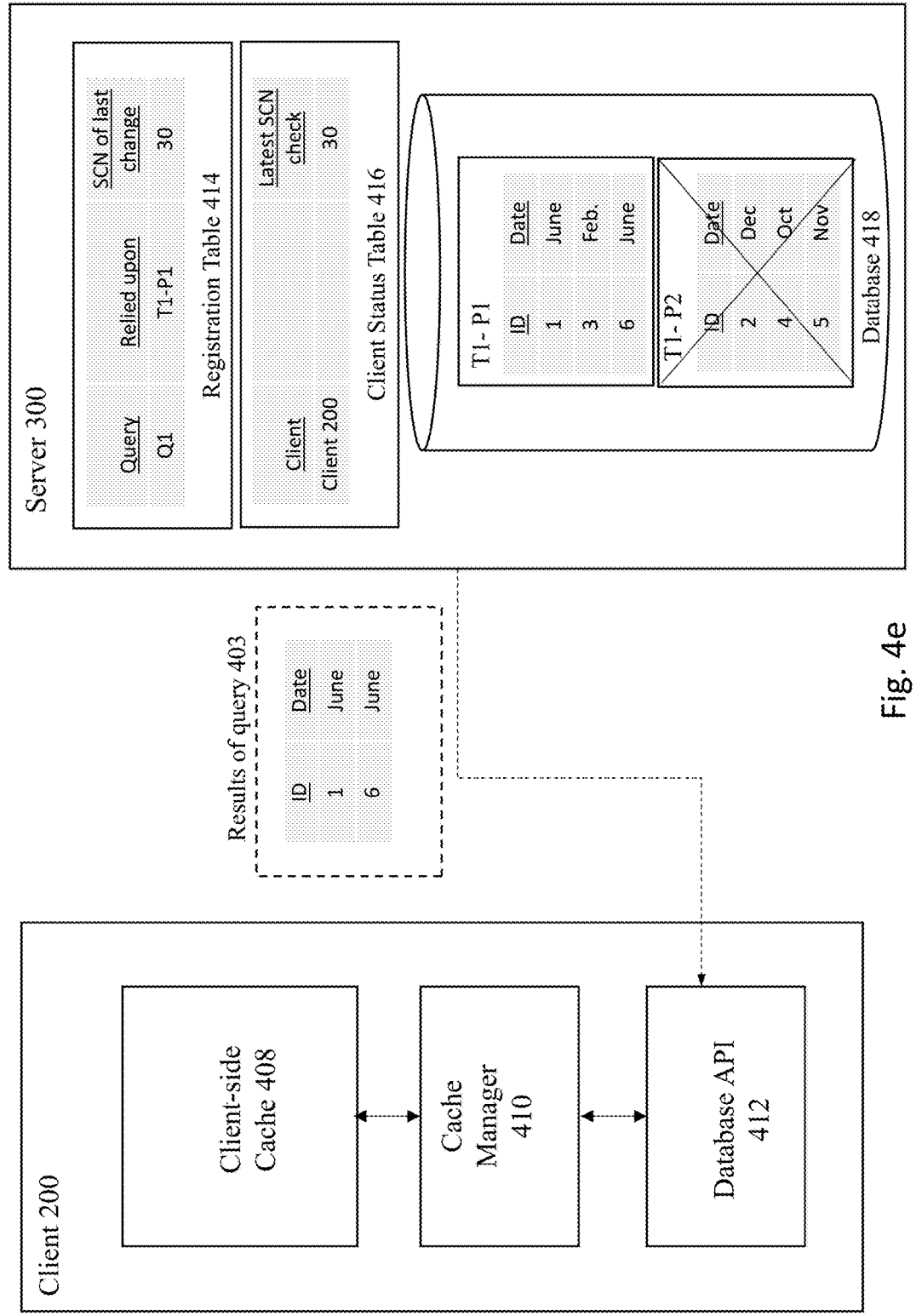
Figure 4F:
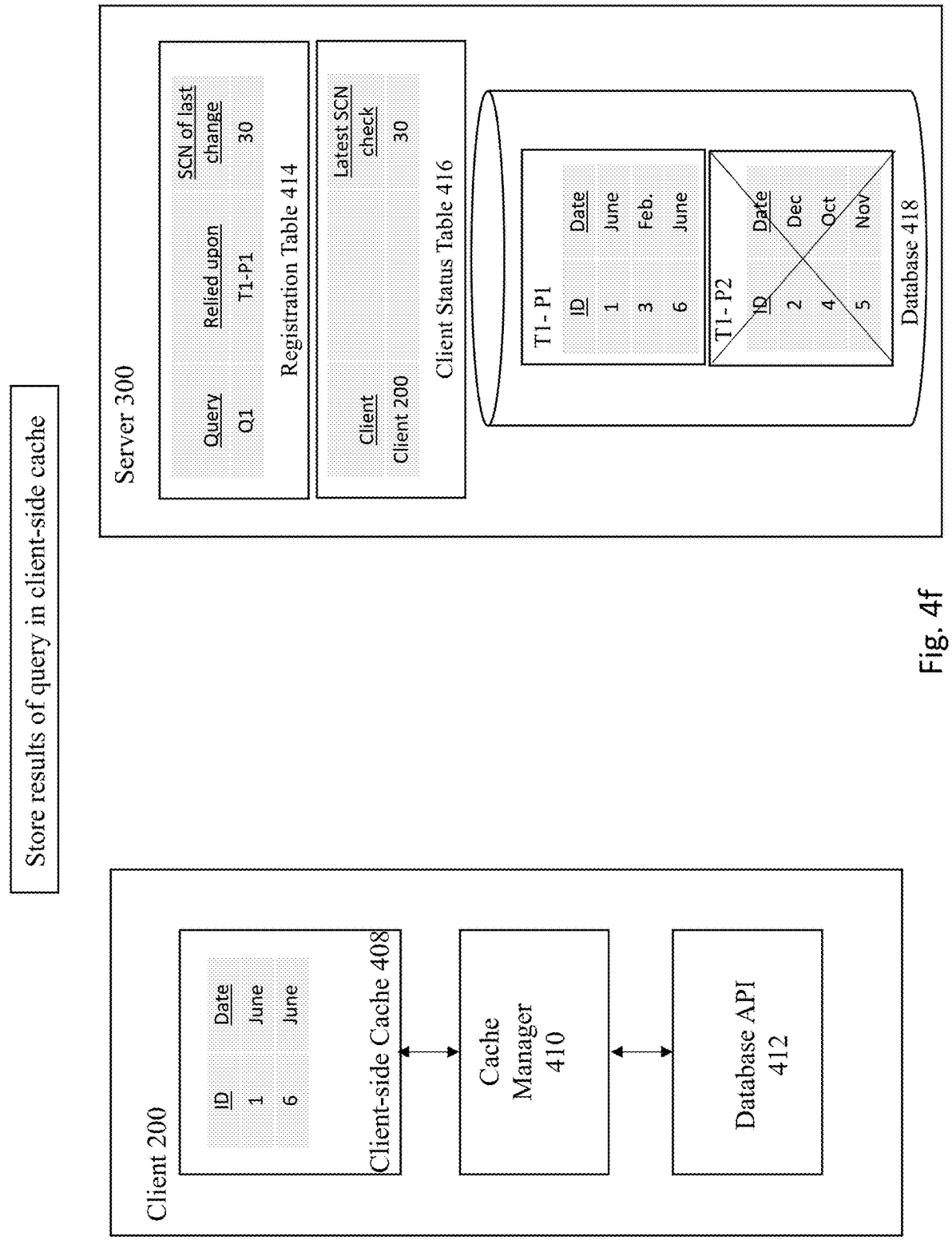

The server then registers query 401 corresponding to the partition in the registration table 414 and client status table 416 and sends the result of the query back to the client 200, as shown in FIG. 4E. Finally, FIG. 4F shows the client 200 storing the results of the query 401 in the client-side cache 408.

Figure 5:
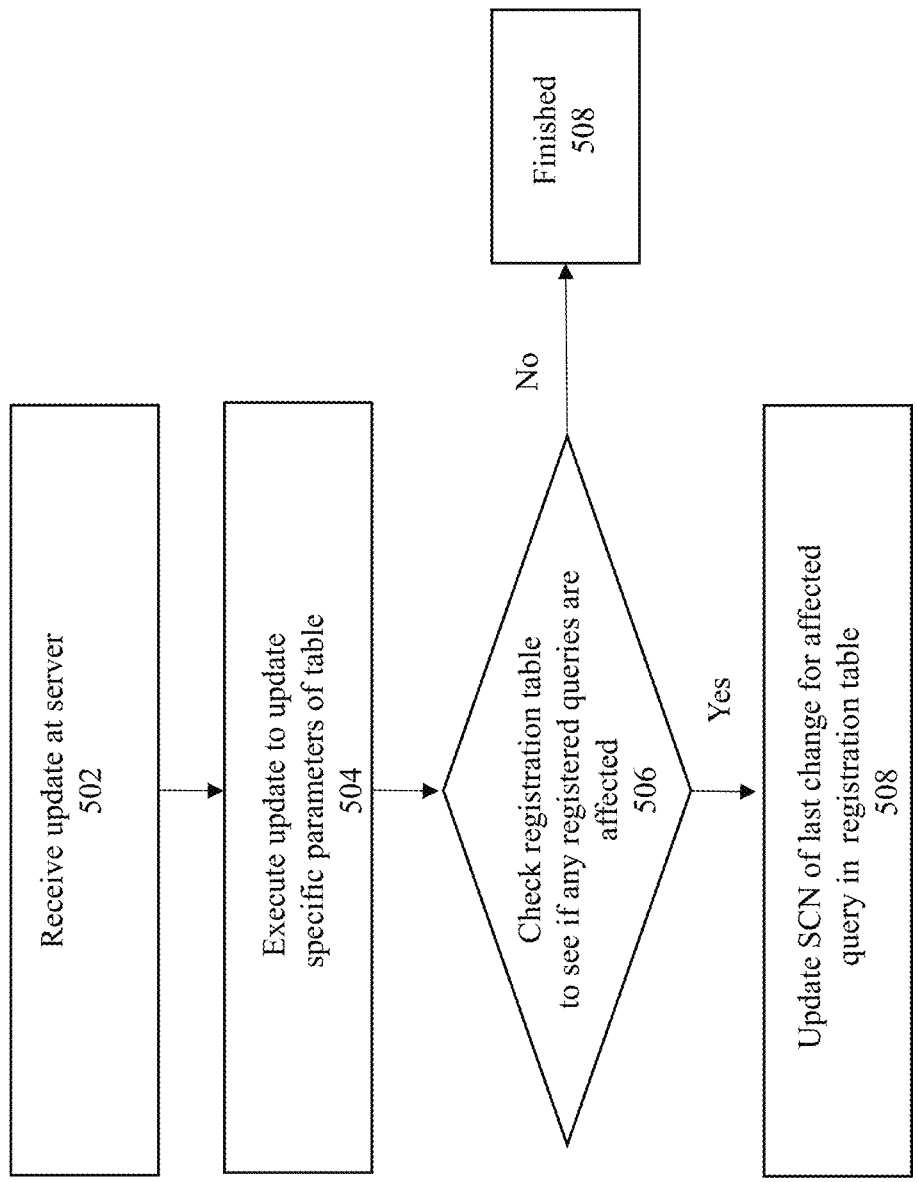
FIG. 5 is a flowchart for invalidating partition-based queries according to some embodiments of the invention.

FIG. 5 is a flowchart for updating the registration table according to some embodiments of the invention. In FIG. 5, the server receives an update for one or more database objects within the database. Next, at 504, the server executes the update to update the specific objects identified in the update statement. For example, one or more partitions may be updated by the update operation.

At 506, the server will then check the registration table to see if any registered queries are affected by the update. This action is performed to check whether there are any queries that have been registered which correspond to a partition that has been updated by the update operation. If there are no registered queries that are affected by the update then the process is finished at 508.

However, if there are any registered queries that are affected by the update, then the server will update the specific entries for those queries. In particular, at 508, the SCN corresponding to the update operation is included into the affected entries within the registration table.

Figure 6A:
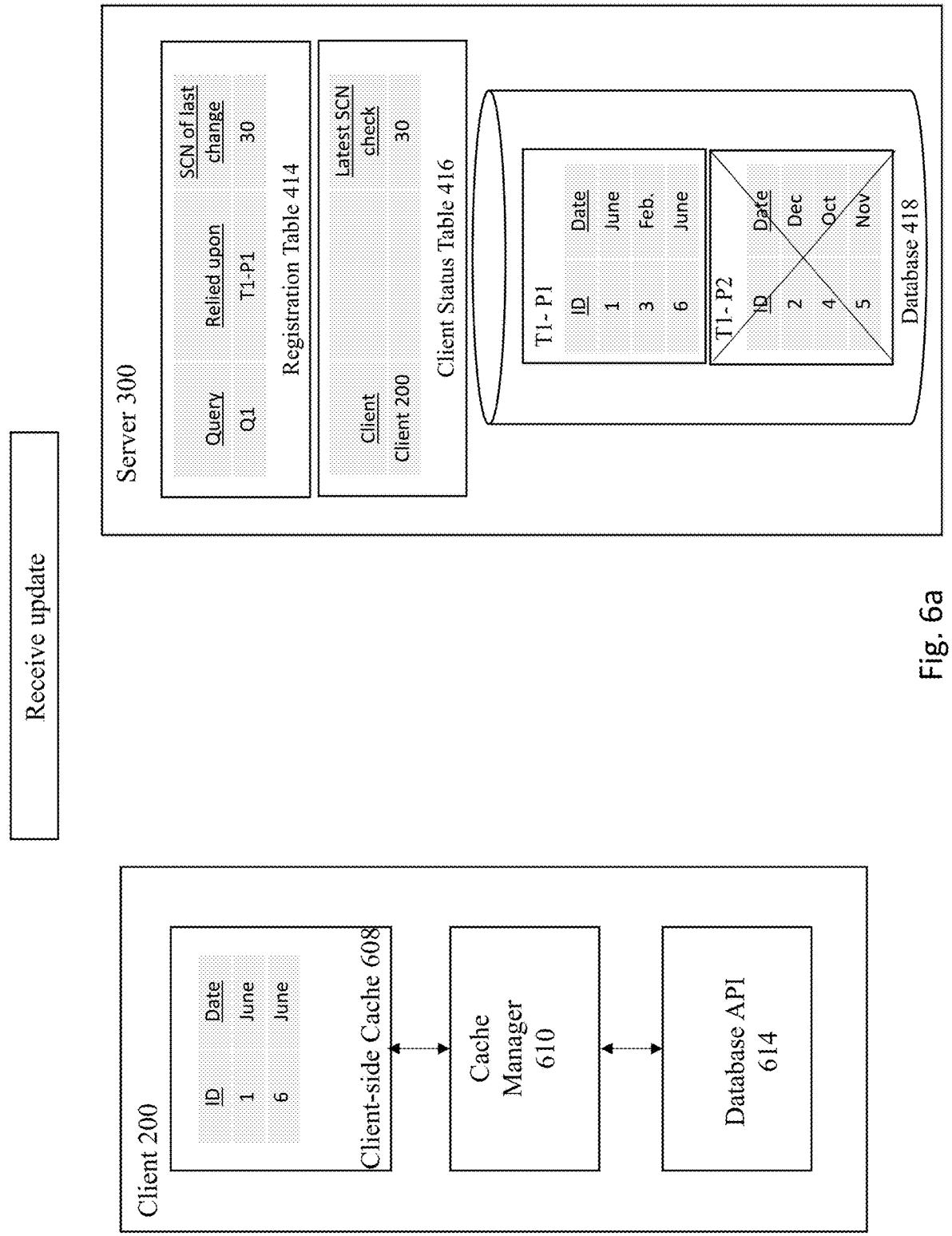
Figure 6B:
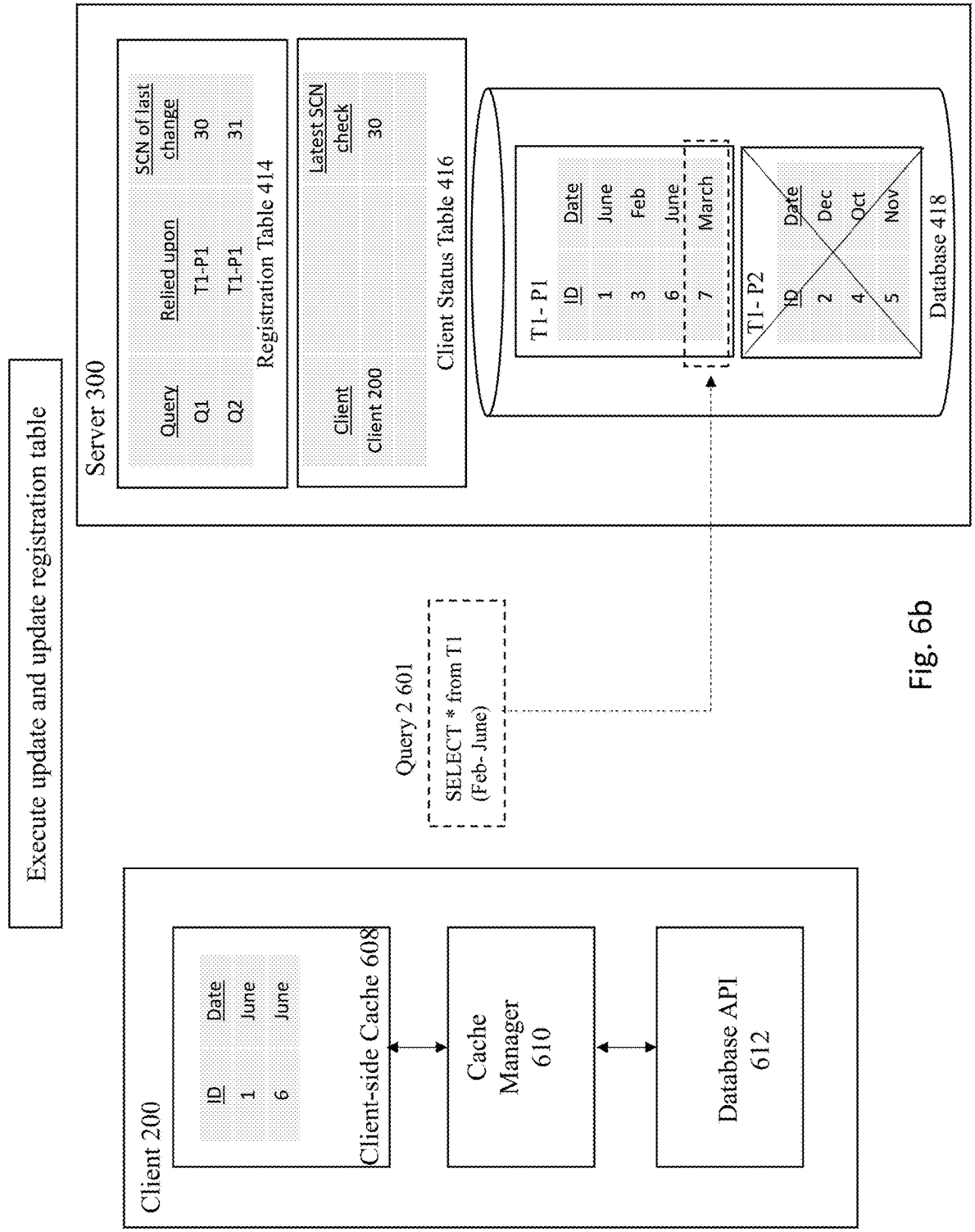

FIGS. 6A-6D illustrates an example of updating the registration table according to some embodiments of the invention. As shown in FIG. 6A, the Server 300 receives the following request 601: "INSERT INTO T1 VALUES (7, MARCH)." This update operation is requested by another client that is not shown in the figure. FIG. 6B depicts the server executing the update by inserting a new row into T1-P1 of Database 418.

Figure 6D:
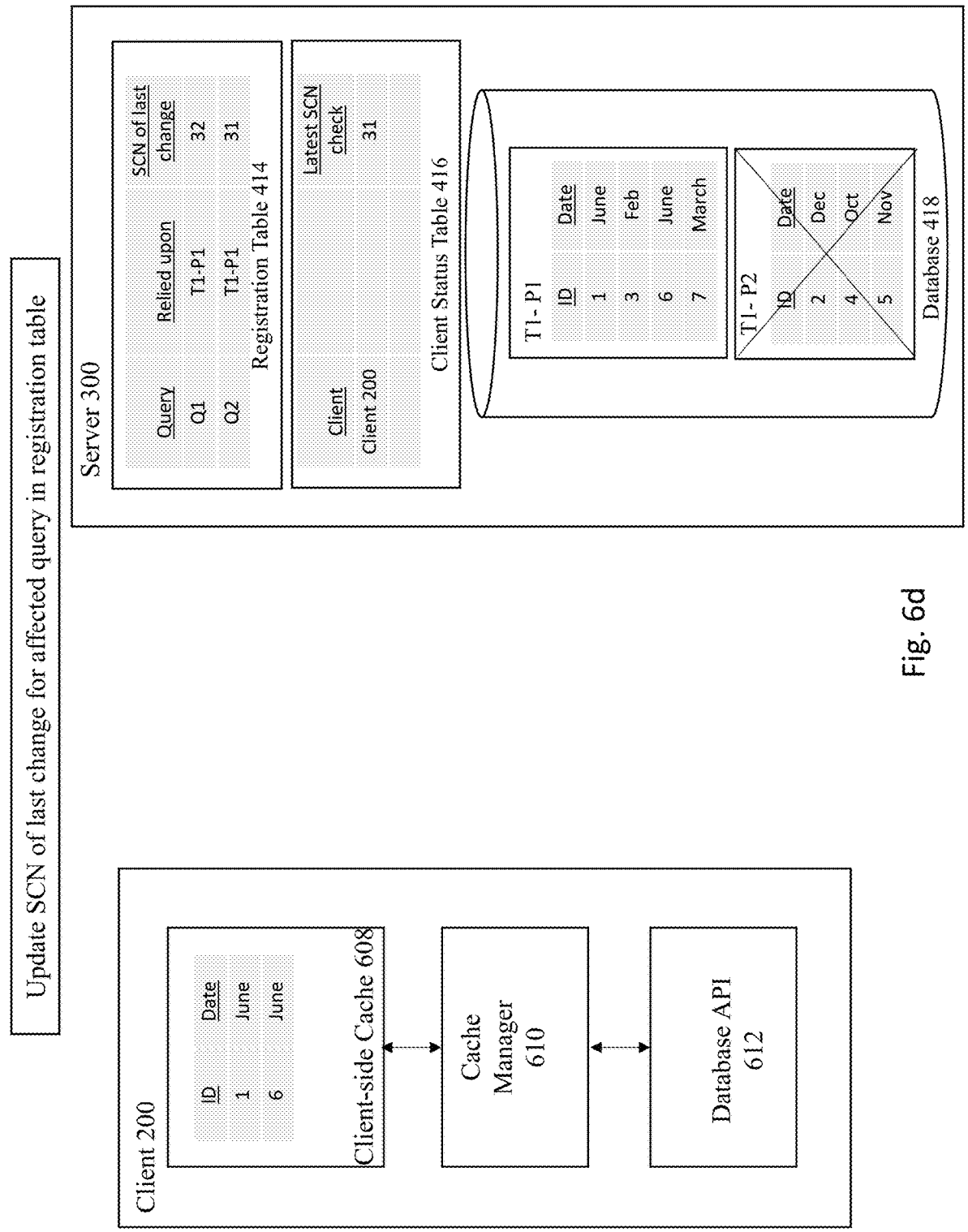

Next, a determination is made whether there are any entries in the registration table affected by the update. FIG. 6C shows the server checking the registration table 414 to see if any registered queries are affected. In this case, the Registration Table 414 reveals that Q1 and Q2 has a reliance upon partition T1-P1 that was affected by the latest update operation. Therefore, as shown in FIG. 6D, the server updates the SCN of last change for the affected query (e.g., Q1) in the registration table 414 (from the previous SCN 31 to the new SCN 32).

Figure 7:
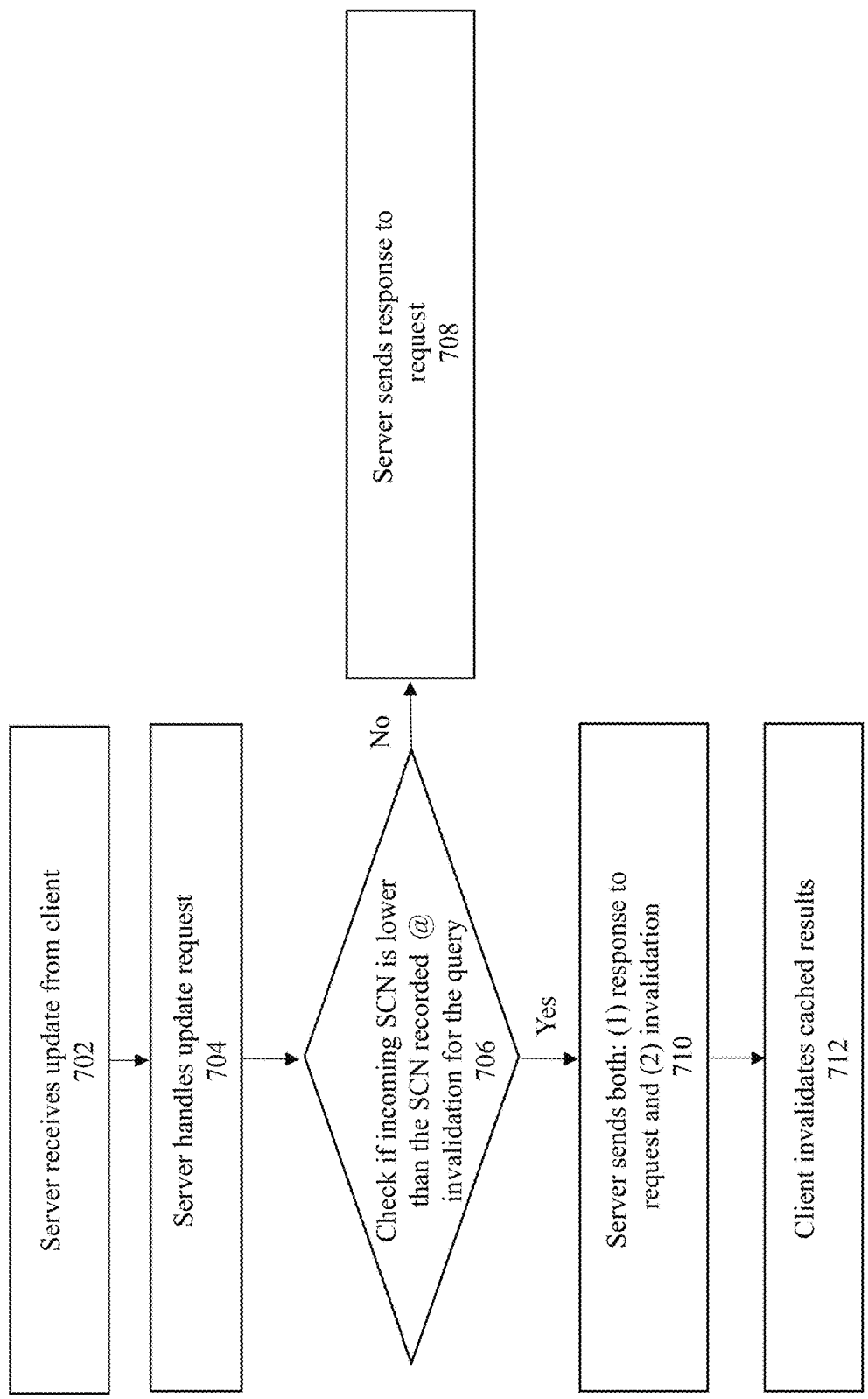
FIG. 7 is a flowchart for piggybacking an invalidation message according to some embodiments of the invention.

FIG. 7 is a flowchart for piggybacking an invalidation message to the client according to some embodiments of the invention. In FIG. 7, the server receives a request from the client at 702. The request will be associated with an incoming-SCN (i.e., associated with the last SCN/snapshot associated with the client for data accessed previously by the client). At 704, the server handles the request.

Then, at 706, the server checks the status table to identify any queries associated with the client. The server will also check the registration table whether, for any queries associated with the client, if incoming SCN is lower than the SCN recorded @ invalidation for the client's registered quer(ies). If the incoming SCN is not lower than the SCN recorded @ invalidation for the query then the server sends a response to the request to the client at 708.

However, if the incoming SCN is lower than the SCN recorded @ invalidation for the query then, this indicates that an update has been made to a dependent object for the query in question. Therefore, at 710, the server sends both: (1) response to request and (2) an invalidation message for the identified query. As such, at 712, the client knows to invalidate the cached result for that query.

FIGS. 8A-8E illustrates an example of piggybacking an invalidation response according to some embodiments of the invention.

Figure 8A:
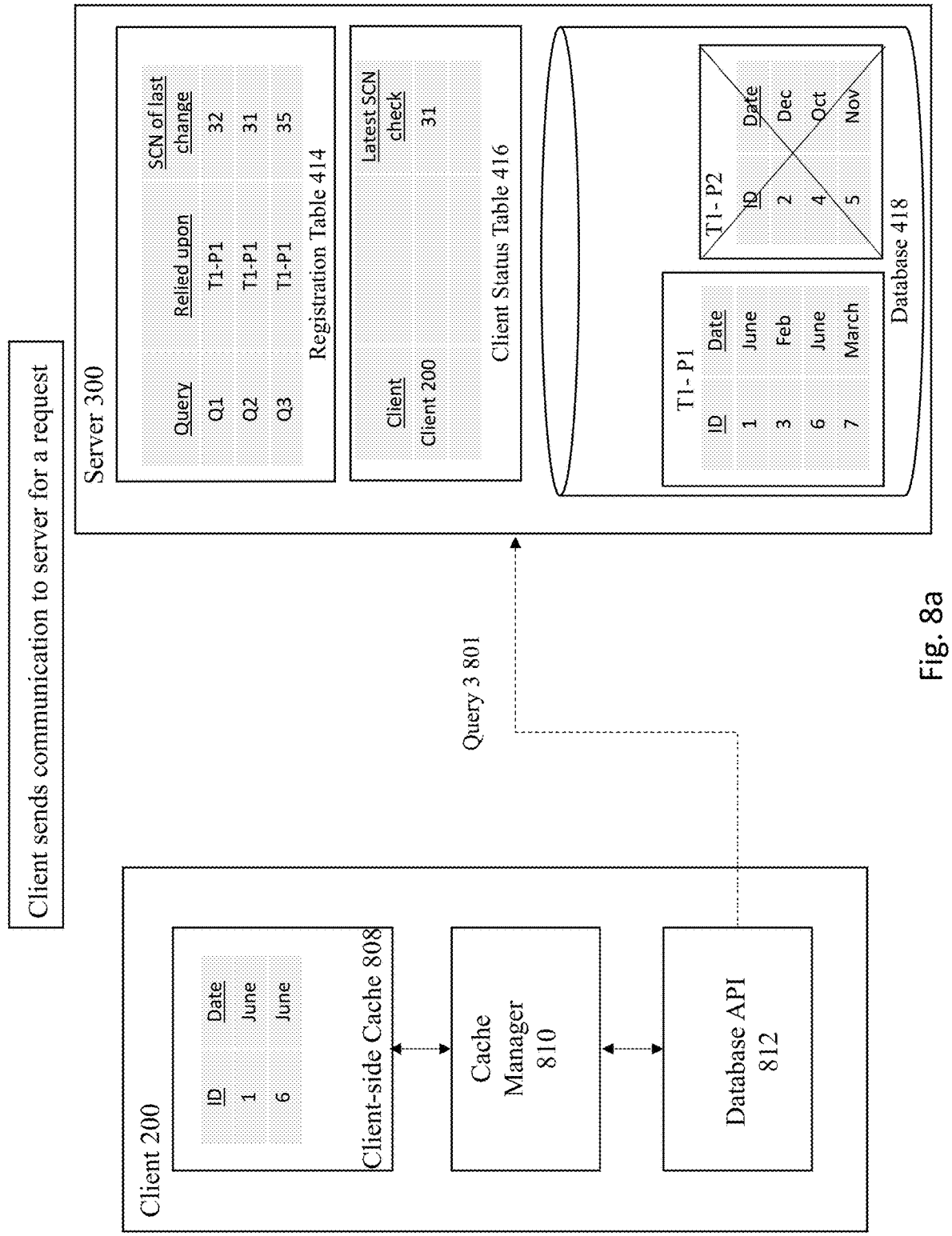
Figure 8C:
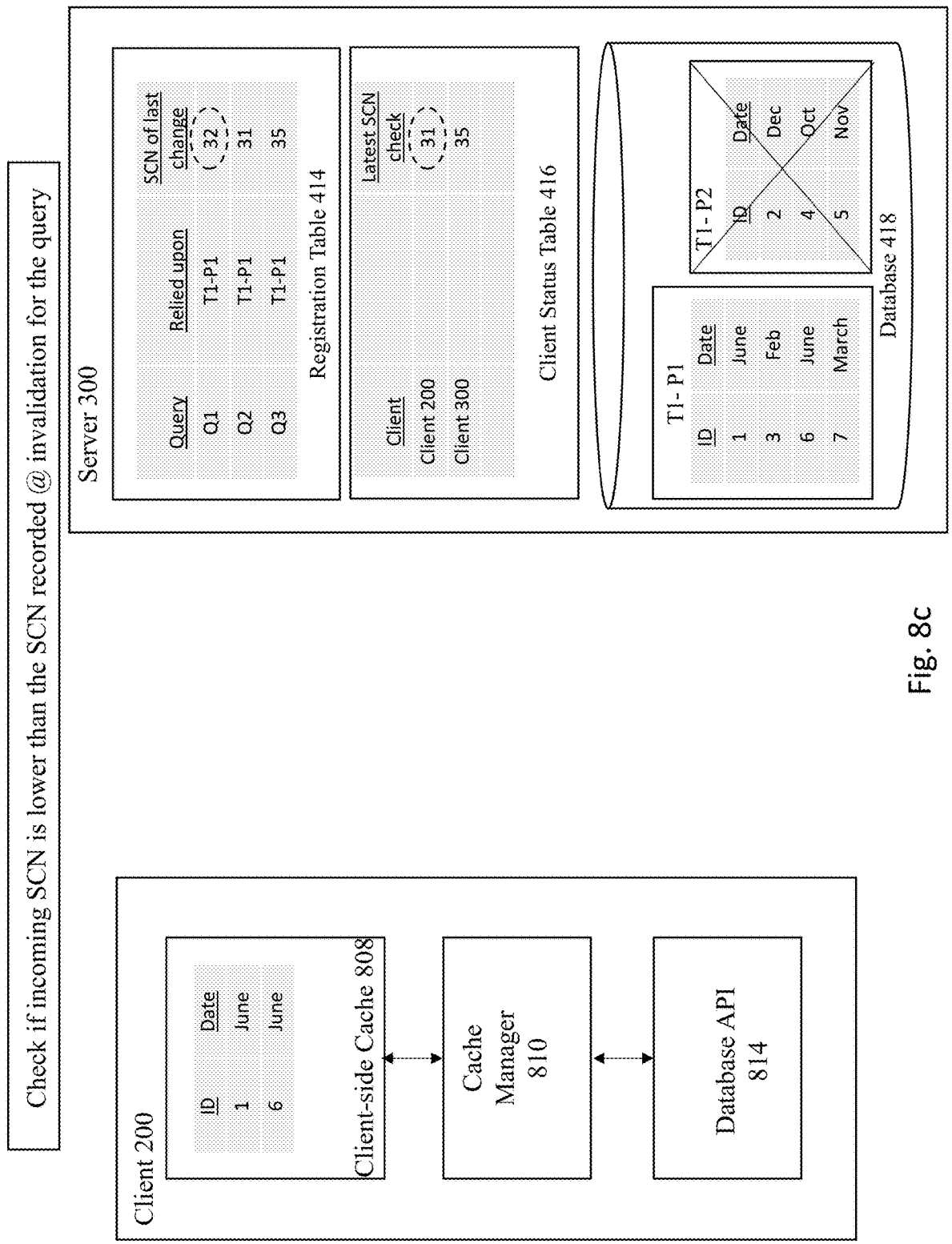

As illustrated in FIG. 8A, the client sends a communication request (e.g., Query 3 801) to the server. The query is associated with an In-SCN of 31 based upon the snapshot number corresponding to the data that is currently cached at that client.

The server handles the request, as shown in FIG. 8B. At the same time, the server checks whether the incoming SCN is lower than the SCN recorded for any query associated with the client. Here, the client is associated with Q1 as identified by checking the client status table. The registration table is then checked for the latest SCN for Q1, which is "32". The in-SCN for the client is compared against the Q1 SCN number, as shown in FIG. 3C. In this scenario, the in-SCN of 31 is less than the SCN 32 recorded for Q1. Therefore, this means that a subsequent update has occurred for a dependent object relied upon by Q1. As such, an invalidation message needs to be sent to the client.

Figure 8D:
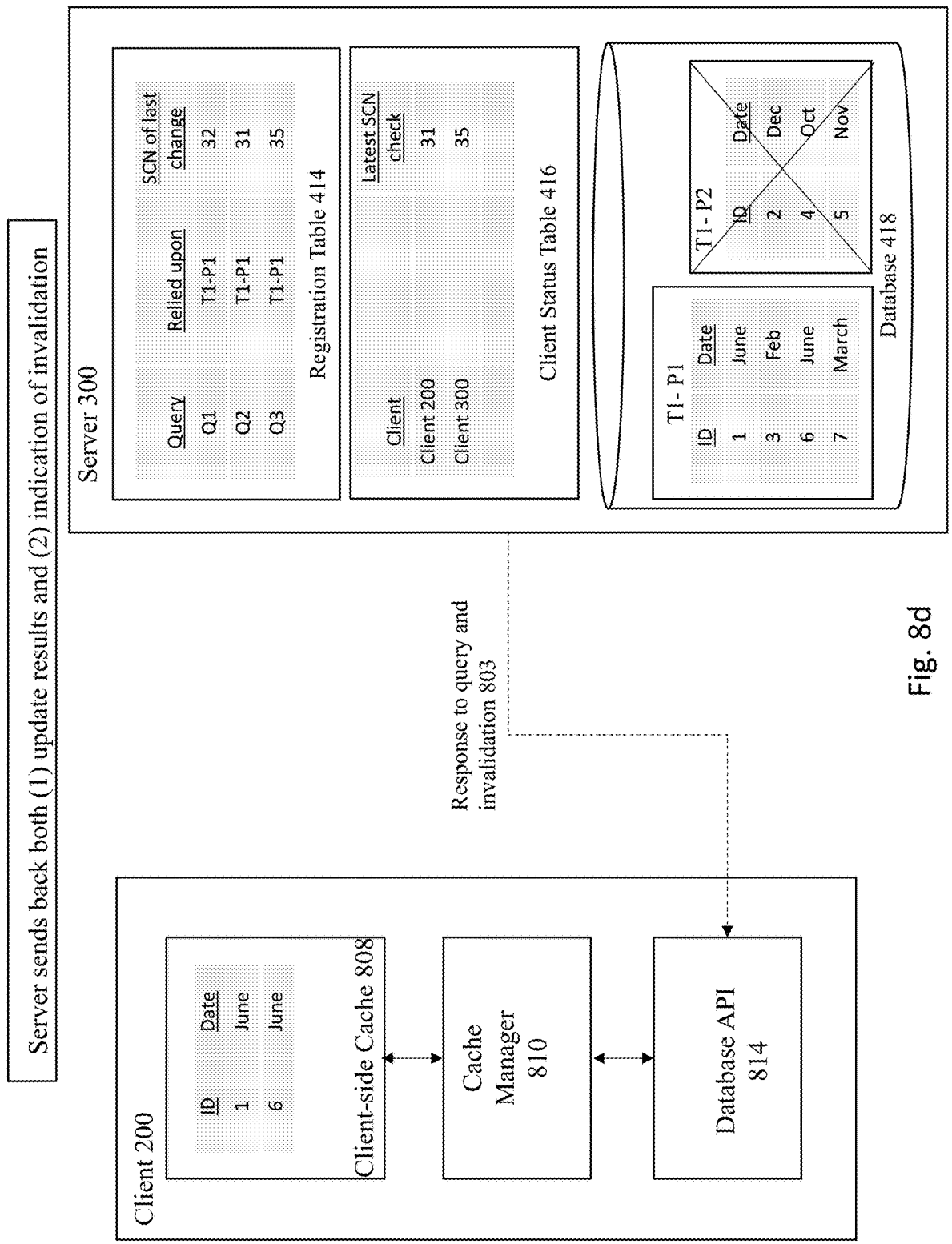
Figure 8E:
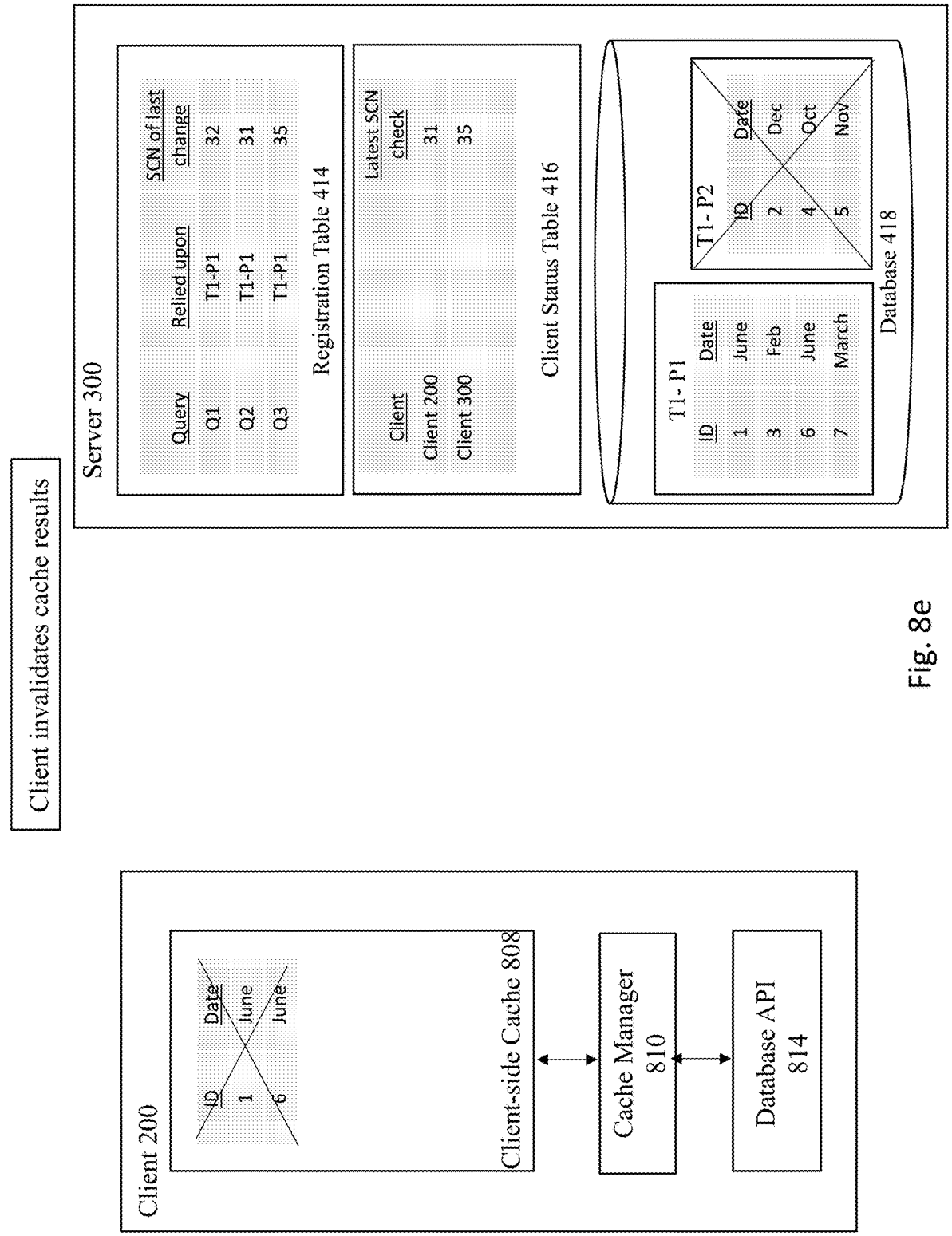

FIG. 8D shows the server sending back both (1) update results and (2) indication of invalidation 803 to the client 200. The client 200 now knows that that the client-side cache 808 is no longer valid and thus the client invalidates the cache results, as shown in FIG. 8E. In operation, a cache manager 810 at the client performed the invalidations for the identified cached result sets corresponding to the query ids included in the cache invalidations for the client 200.

Column-Based Invalidations

This portion of the document will now describe an approach to implement a consistent client-side cache for column-based registrations of queries according to some embodiments of the invention.

Figure 9:
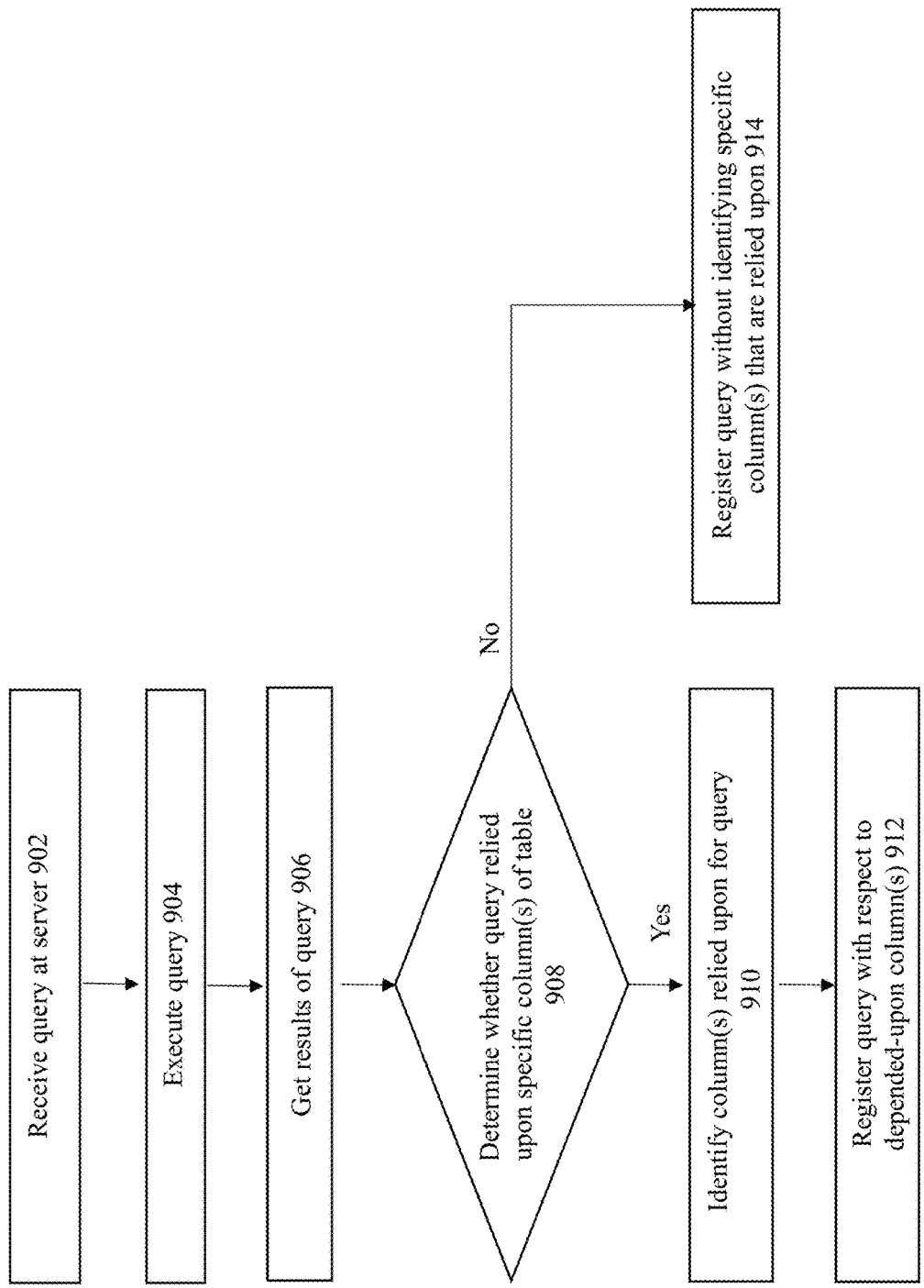
FIG. 9 is a flowchart of a process for implementing a consistent client-side cache for column-based invalidations according to some embodiments of the invention.

FIG. 9 shows a flowchart of an approach to implement a consistent client-side cache for column-based registrations of queries according to some embodiments of the invention. In FIG. 9, the flowchart begins by first receiving a query at the server 902. Next, the server executes the query against a database at the server at 904 and then obtain the results of the query at 906.

A determination is made whether the query is relied upon specific column(s) of the database table at 908. If the query does not rely upon specific column(s) of the database table, then the server 300 registers the query at the registration table 1014 without identifying any specific column(s) that are relied upon at 914. However, if a determination is made that the query indeed relies upon specific column(s) of the database table, then the server identifies the column(s) relied upon for query at 910 and registers the query along with information regarding the depended-upon column(s) at 912. During query registration, the system stores information pertaining to the specific column(s) of the table that the query is dependent on. As such, the next time a DML operation occurs, the system is able to see the specific column(s) mapped to those columns where data impacted by the DML resides in.

FIGS. 10A-10M illustrates an example of processing a query that relies on column-based invalidations according to some embodiments of the invention.

Figure 10A:
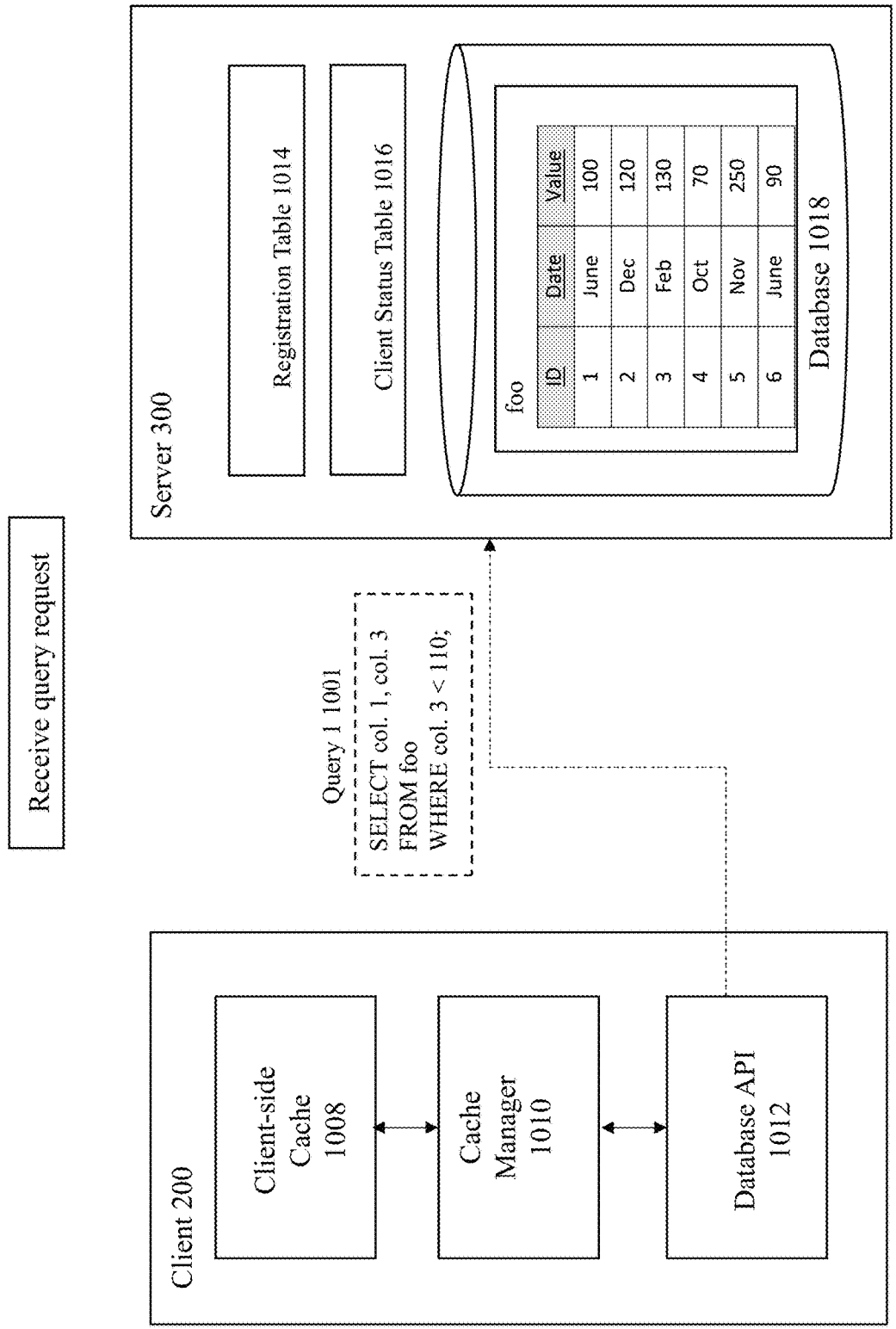
Figure 10B:
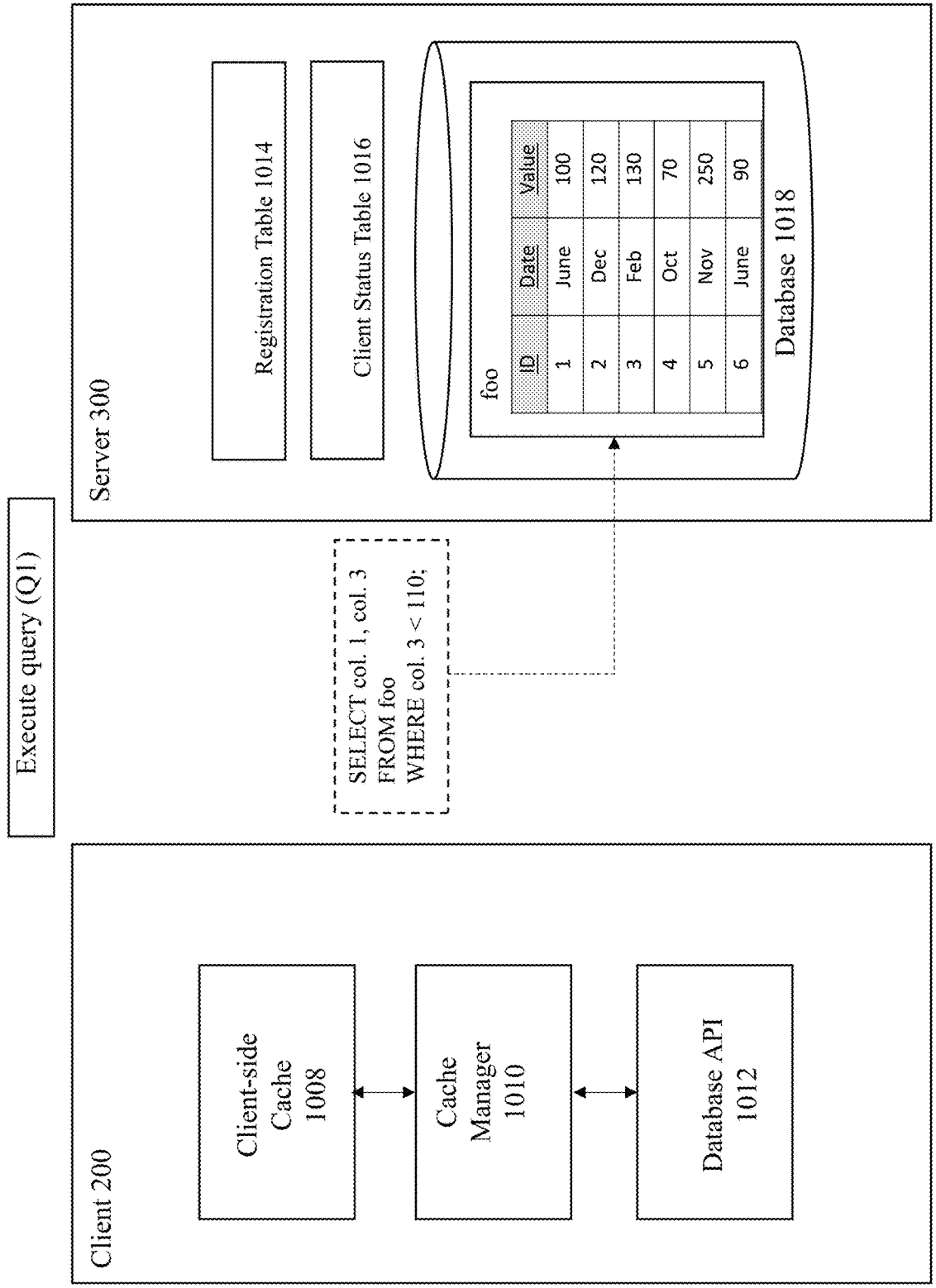
Figure 10C:
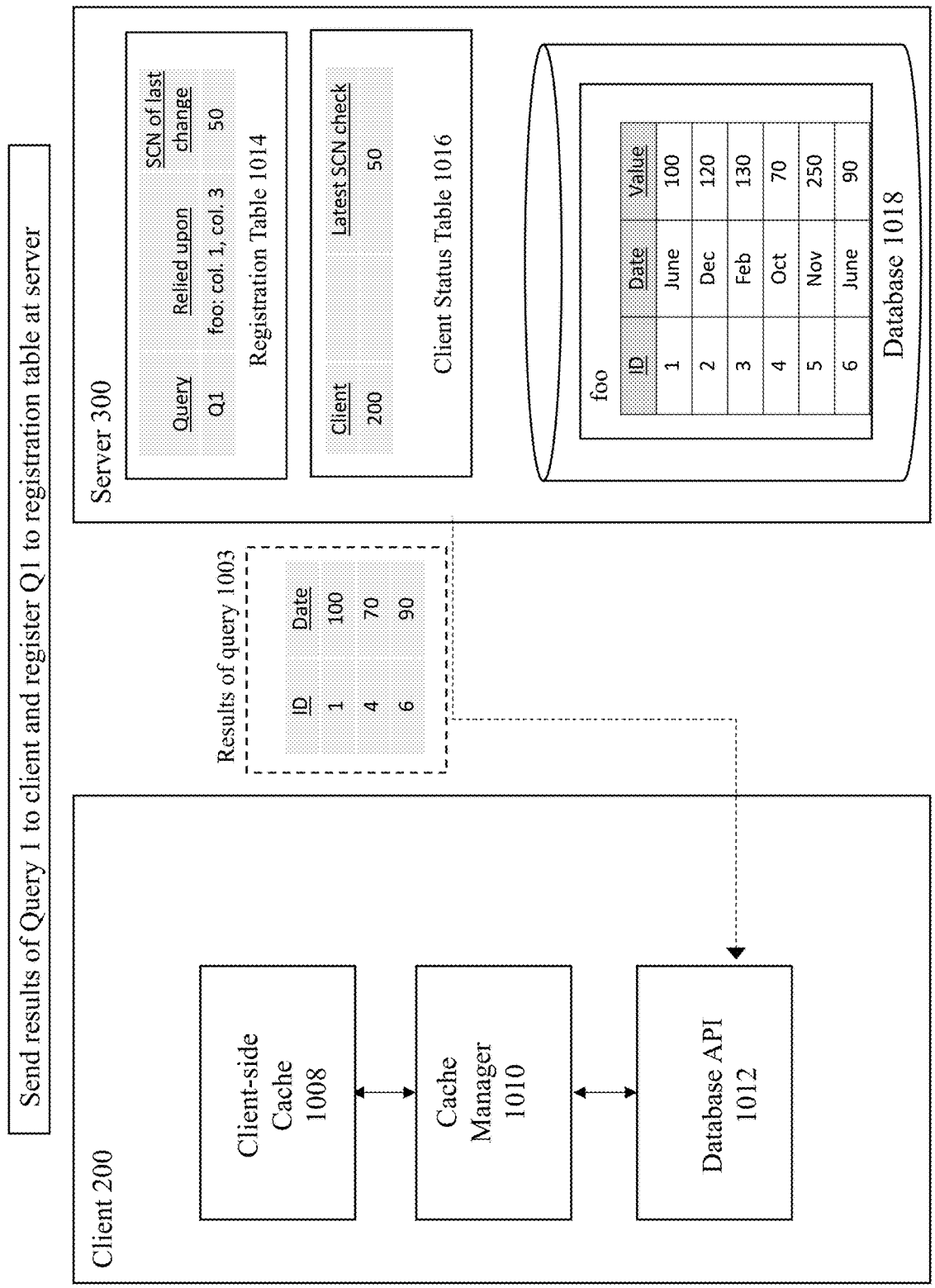
Figure 10D:
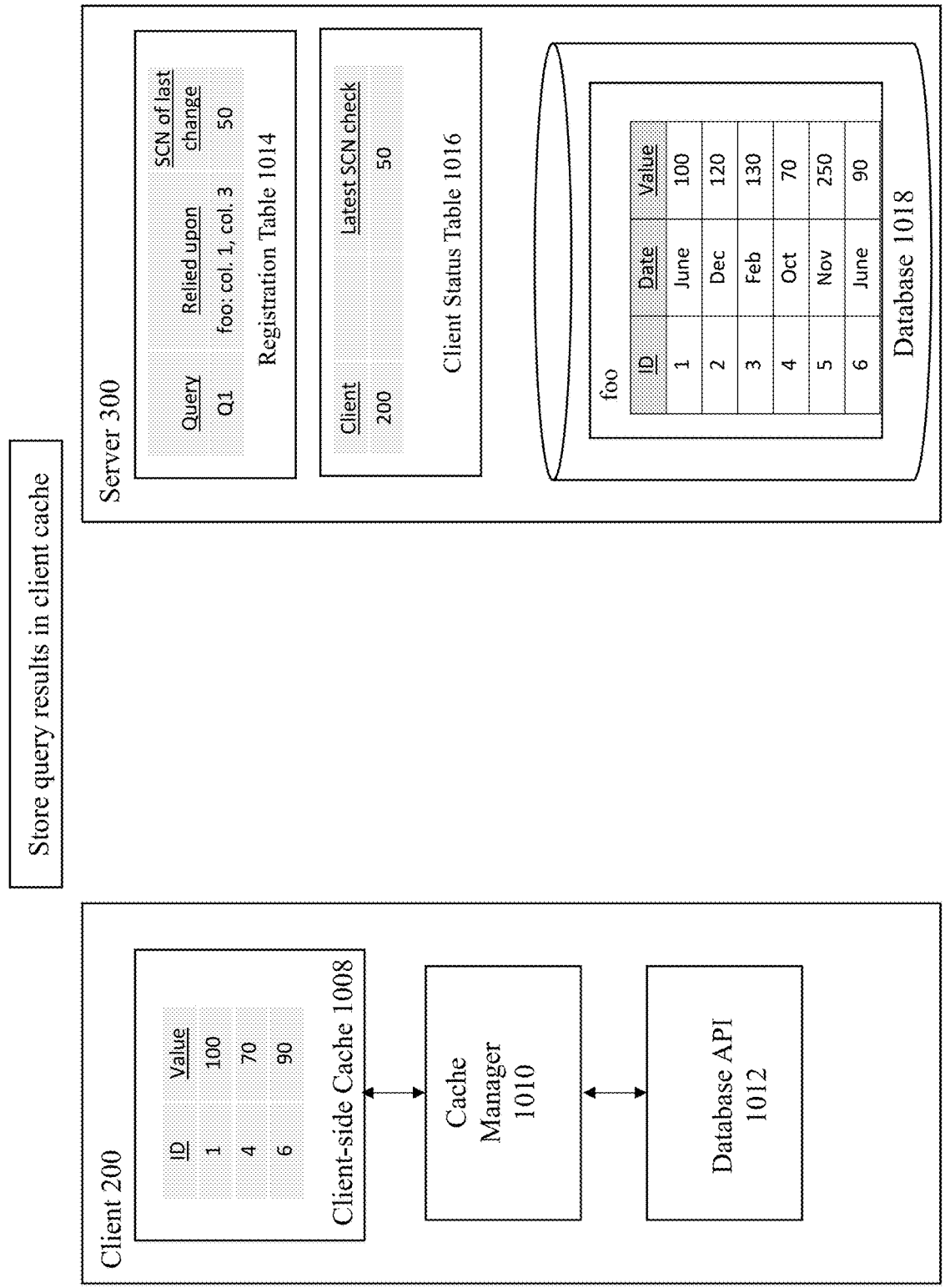

In FIG. 10A, the server 300 receives the following query 1001: "SELECT col. 1, col. 3 FROM foo WHERE col. 3<110." Next, the query 1001 is executed against the database 1018, as shown in FIG. 10B. In this example, the query 1001 is executed against the foo table to select the first and third columns that have a value of less than 110 from database 1018. The server then registers the query 1001 along with information regarding the columns relied upon (e.g., foo: col. 1, col. 3) and the SCN number of the last change to the database (e.g., 50) in both the registration table 1014 and client status table 1016 and sends the results of the query back to the client 200, as shown in FIG. 10C. As previously explained, database transactions executed against the database are all assigned a respective SCN number upon commit of a transaction such that each transaction has its own unique transaction ID. The transaction ID may be used at a later time to read the corresponding registration table and retrieve the transaction Commit snapshot. The client 200 storing the results of the query in the client cache 1008 at FIG. 10D.

Figure 10E:
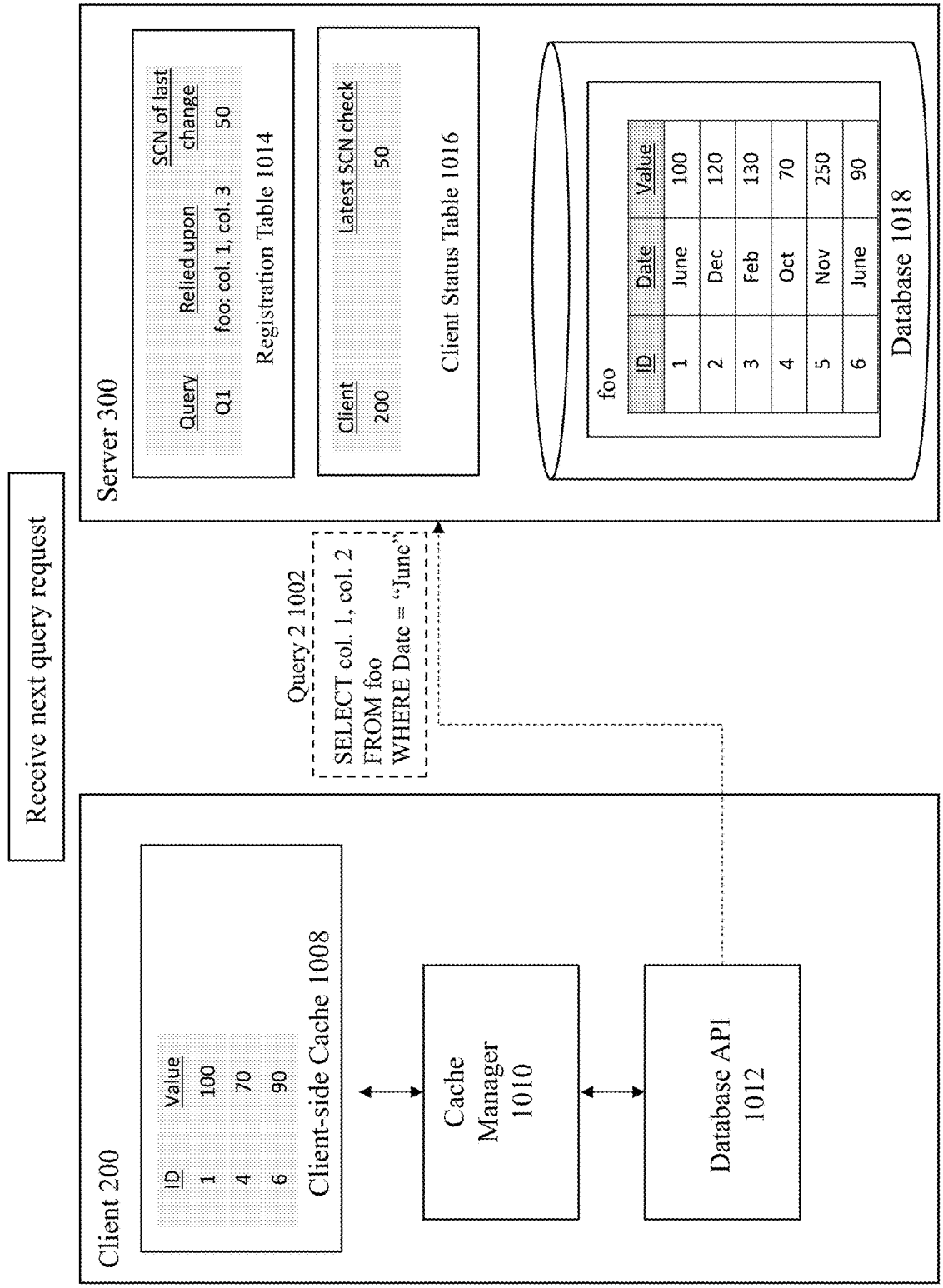
Figure 10F:
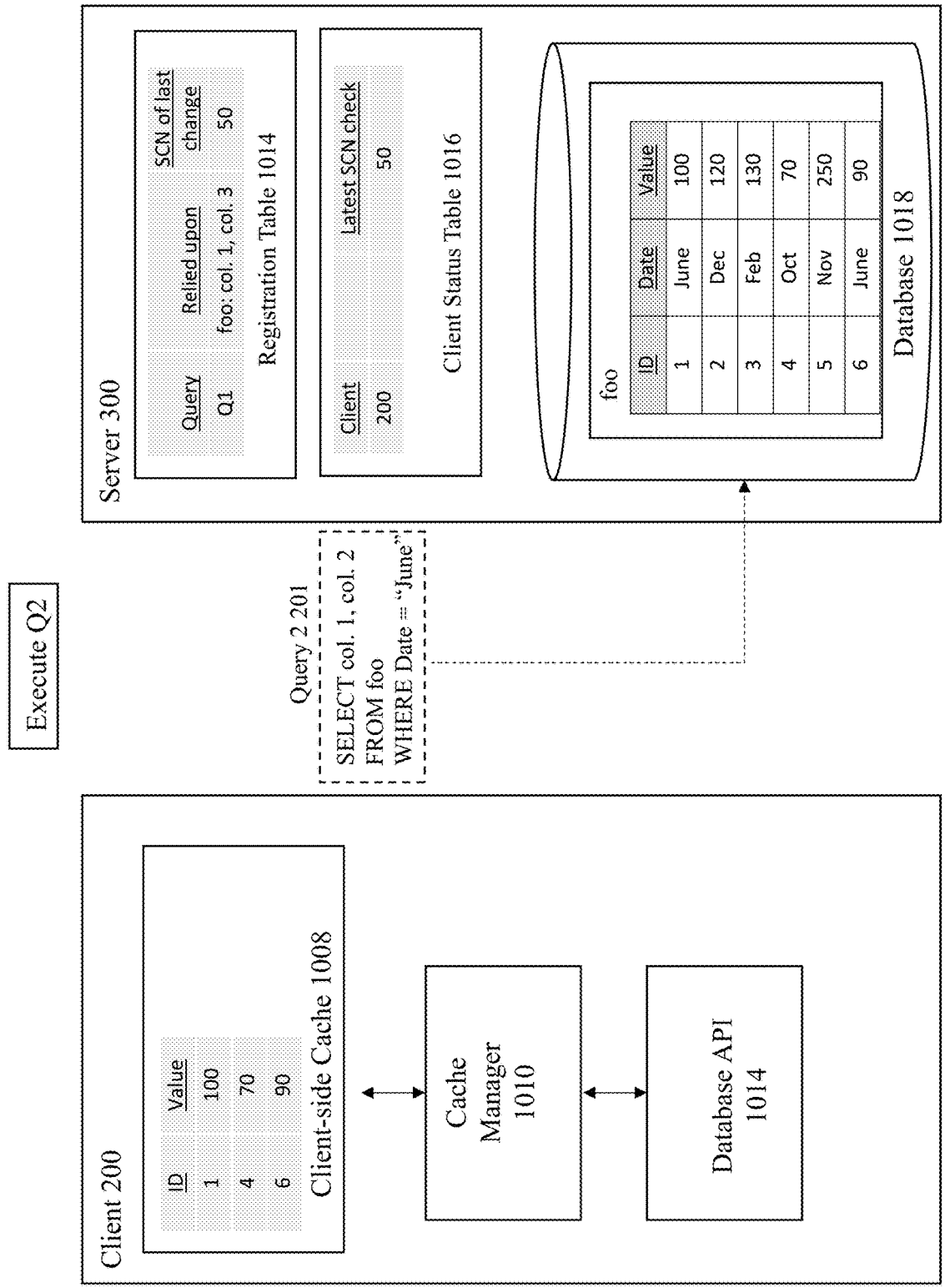
Figure 10G:
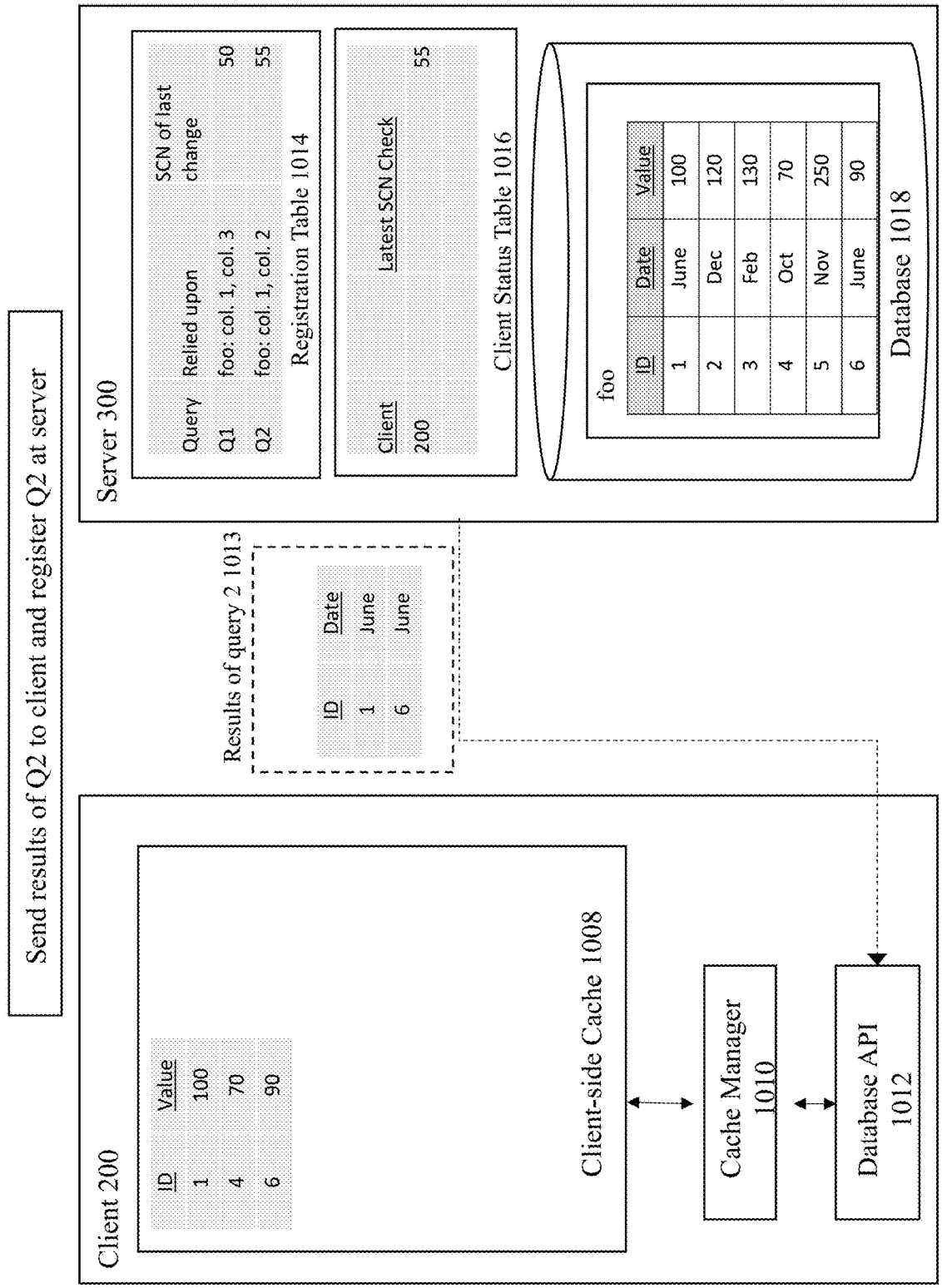
Figure 10H:
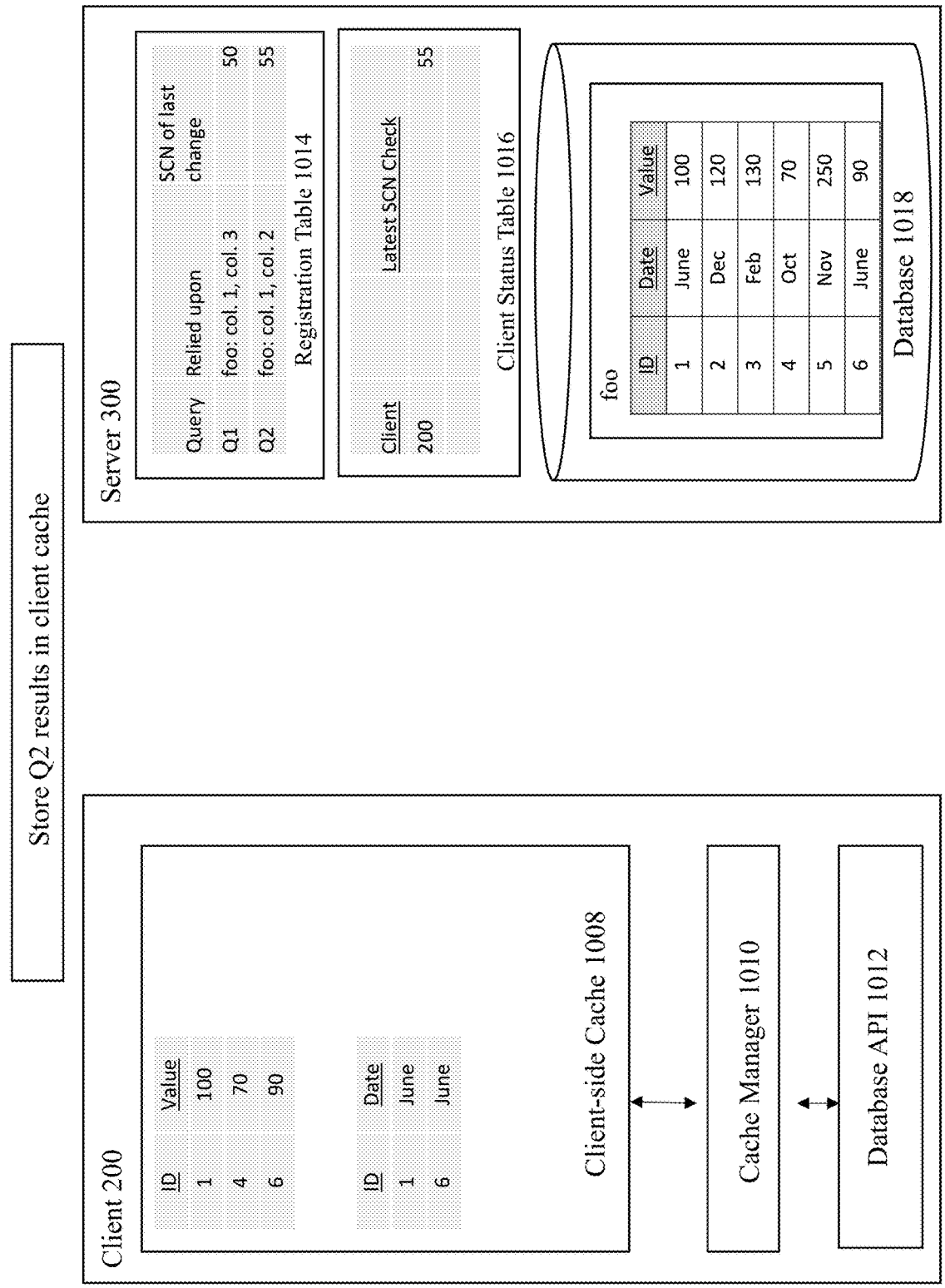

FIG. 10E depicts the server 300 receiving the next query request 1002: "SELECT col. 1, col. 2 FROM foo WHERE Date="June." The server 300 executes the query 1002 against the database 1018, as depicted in FIG. 10F. In this example, the query 1002 is executed against the foo table to select the first and second columns that have a date of June from database 1018. FIG. 10G shows the server sending the results of query 2 1013 to the client 200 and registering the query in the registration table 1014 and client status table 1016. Here, the server 300 registers the query 1013 along with information regarding the columns relied upon (e.g., foo: col. 1, col. 2) and the SCN number of the last change to the database (e.g., 55) in both the registration table 1014 and client status table 1016 and sends the results of the query back to the client 200. The client 200 then stores the query 1013 in the client-side cache 1008 at FIG. 10H.

Figure 10I:
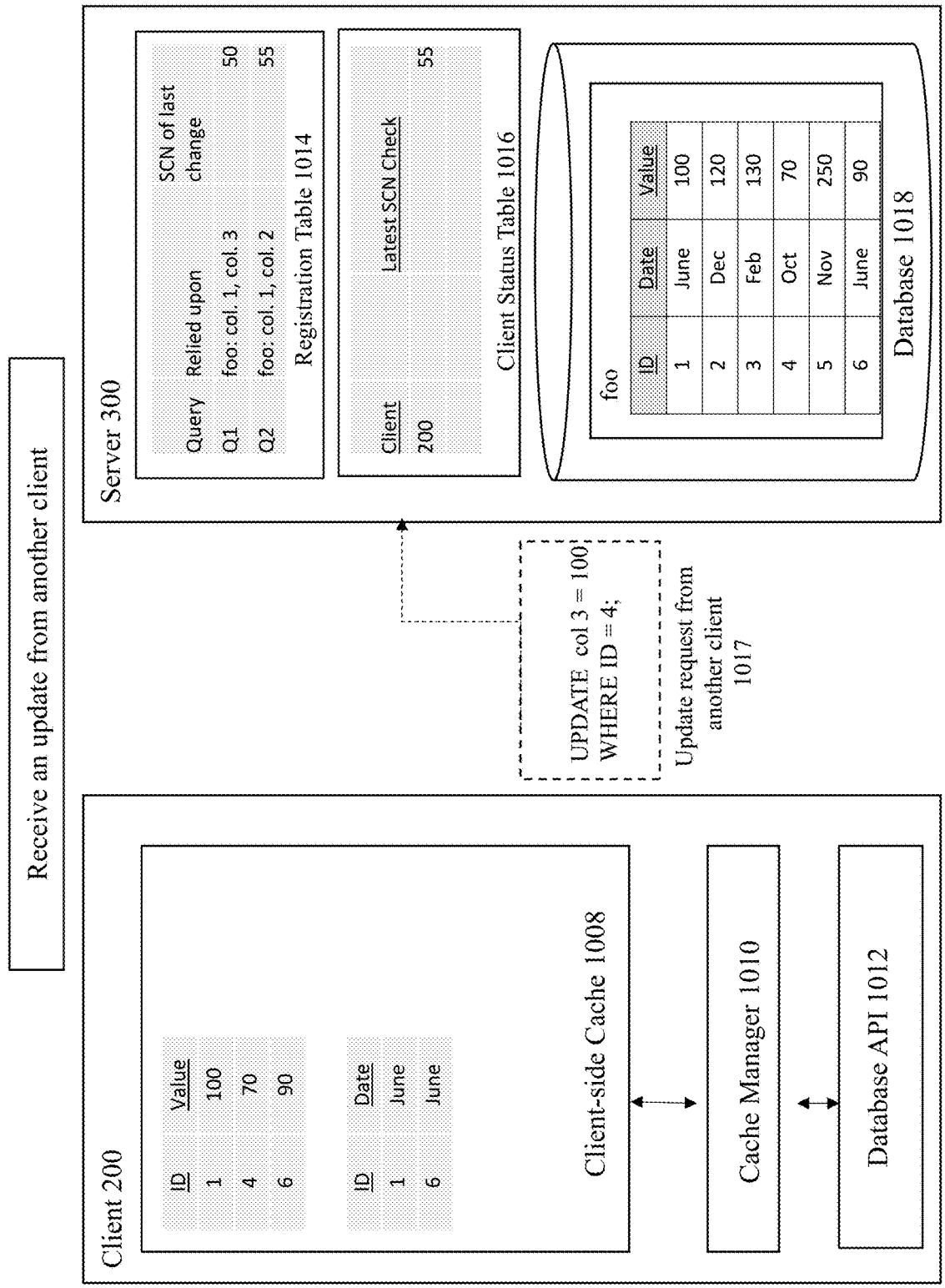
Figure 10J:
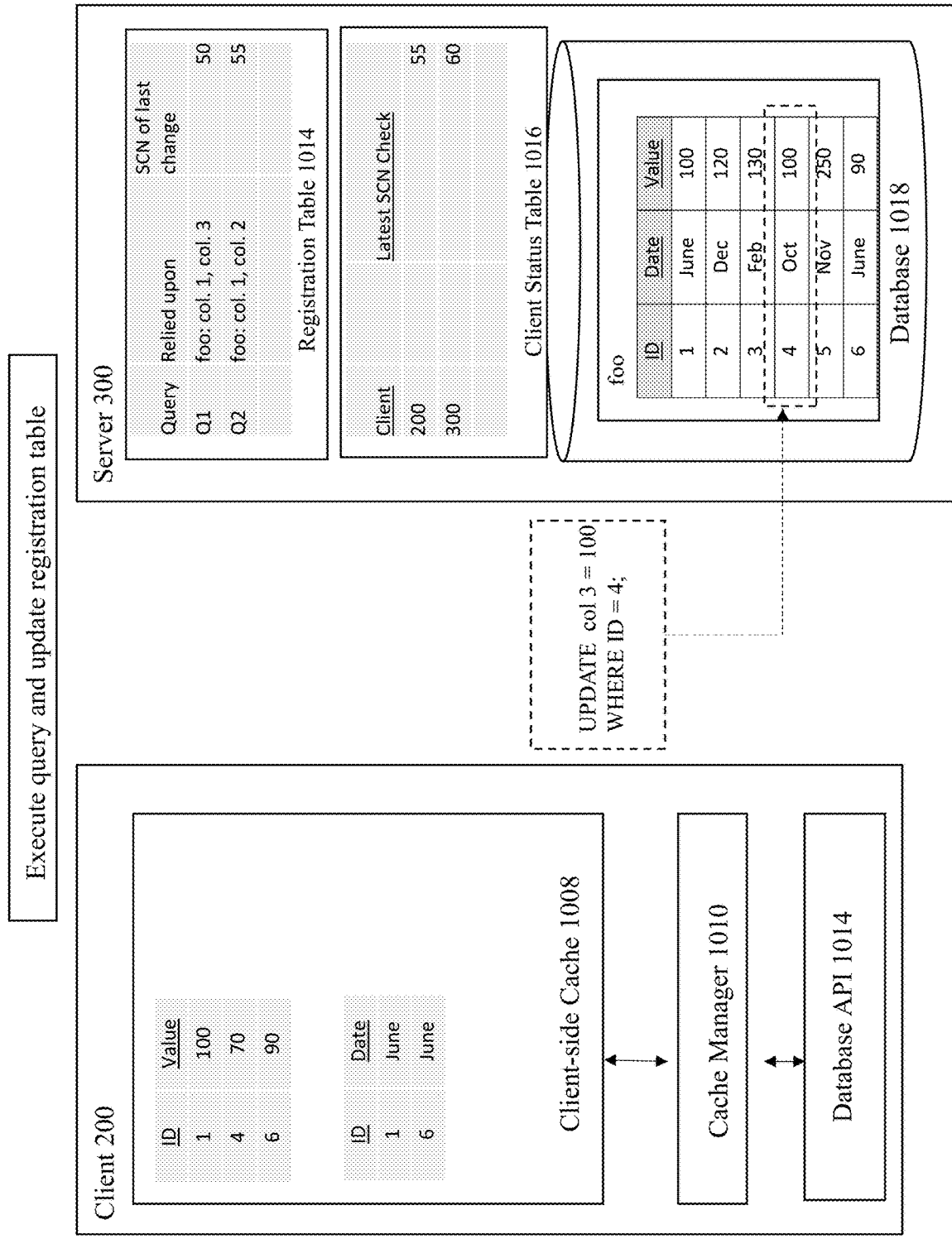

FIG. 10I depicts the server 300 receiving an update from any client to update the database 1018. In this example, the update shown here is: "UPDATE col. 3=100, where ID=4." This means that column 3 in the foo table will have its value updated from 130 to 100 as shown in 10J.

Figure 10K:
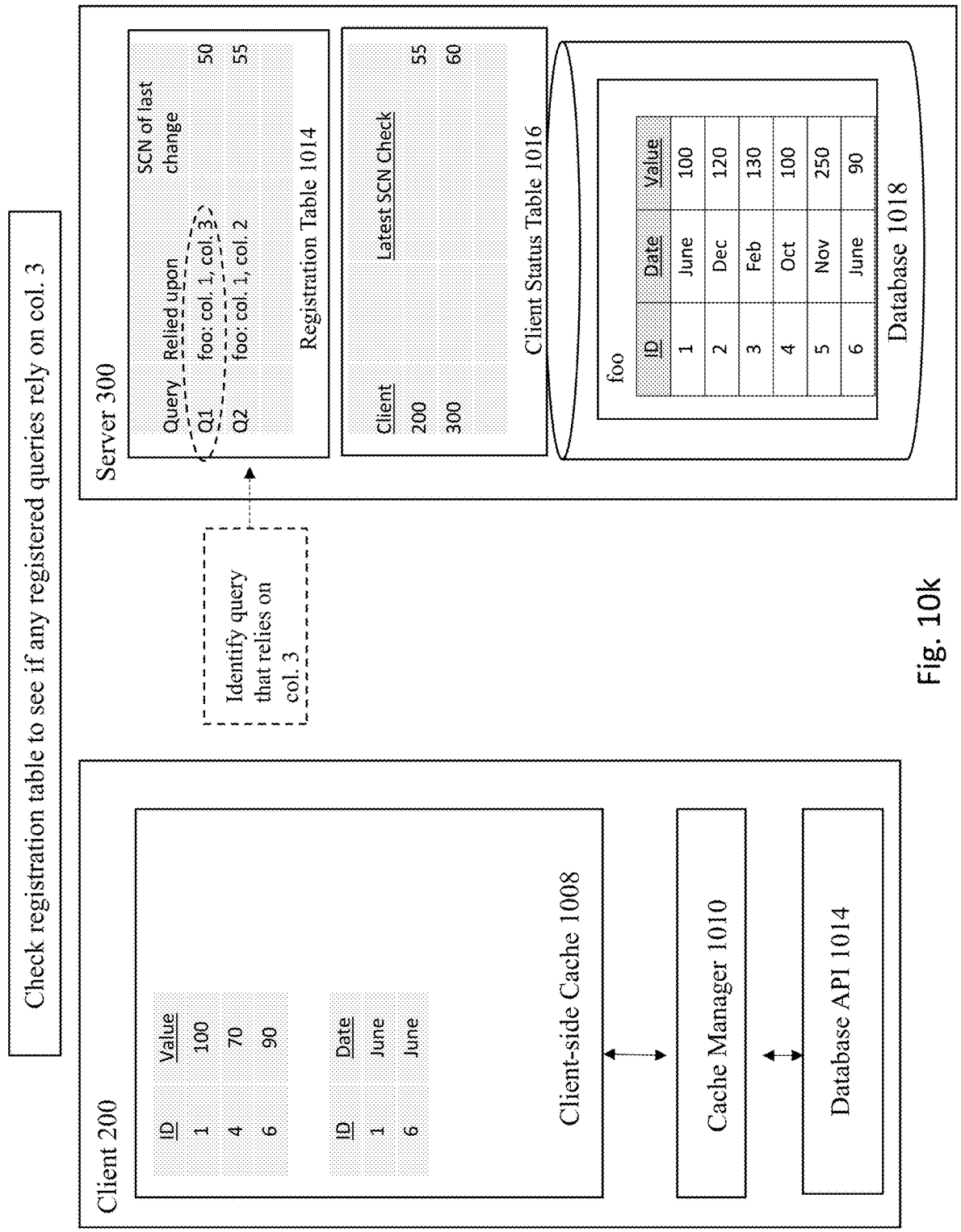
Figure 10I:
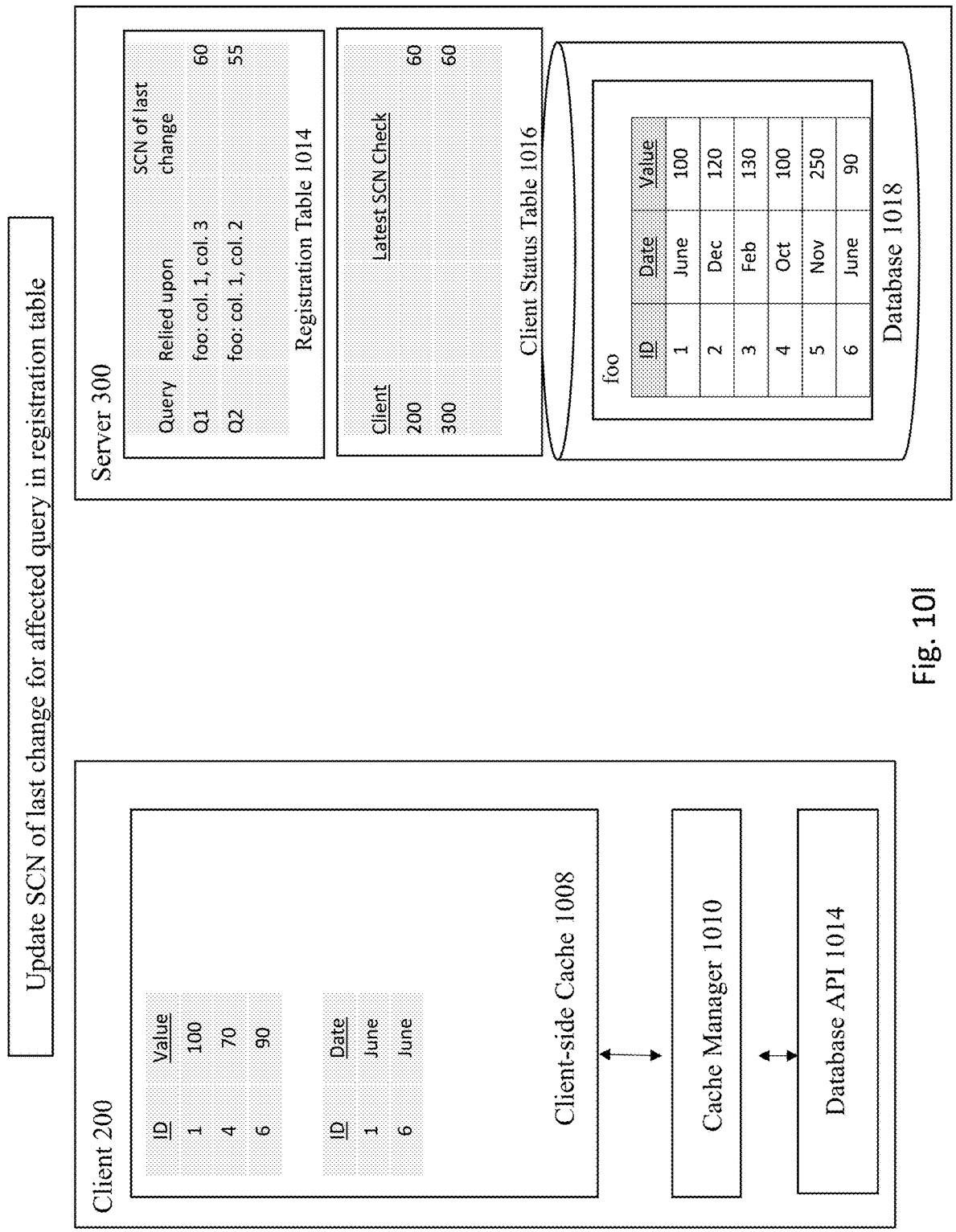

Next, a determination is made whether there are any entries in the registration table that were affected by the update. FIG. 10K shows the server checking the registration table 1014 to see if any registered queries rely on col. 3 of table foo. In this case, the registration table 1014 reveals that query 1 (e.g., Q1) has a reliance upon col. 3 that was affected by the latest update operation. Therefore, as shown in FIG. 10L, the server updates the SCN of last change for the affected query (e.g., Q1) in the registration table 1014 (from the previous SCN 50 to the new SCN 60) and the client status table 1016.

Figure 10M:
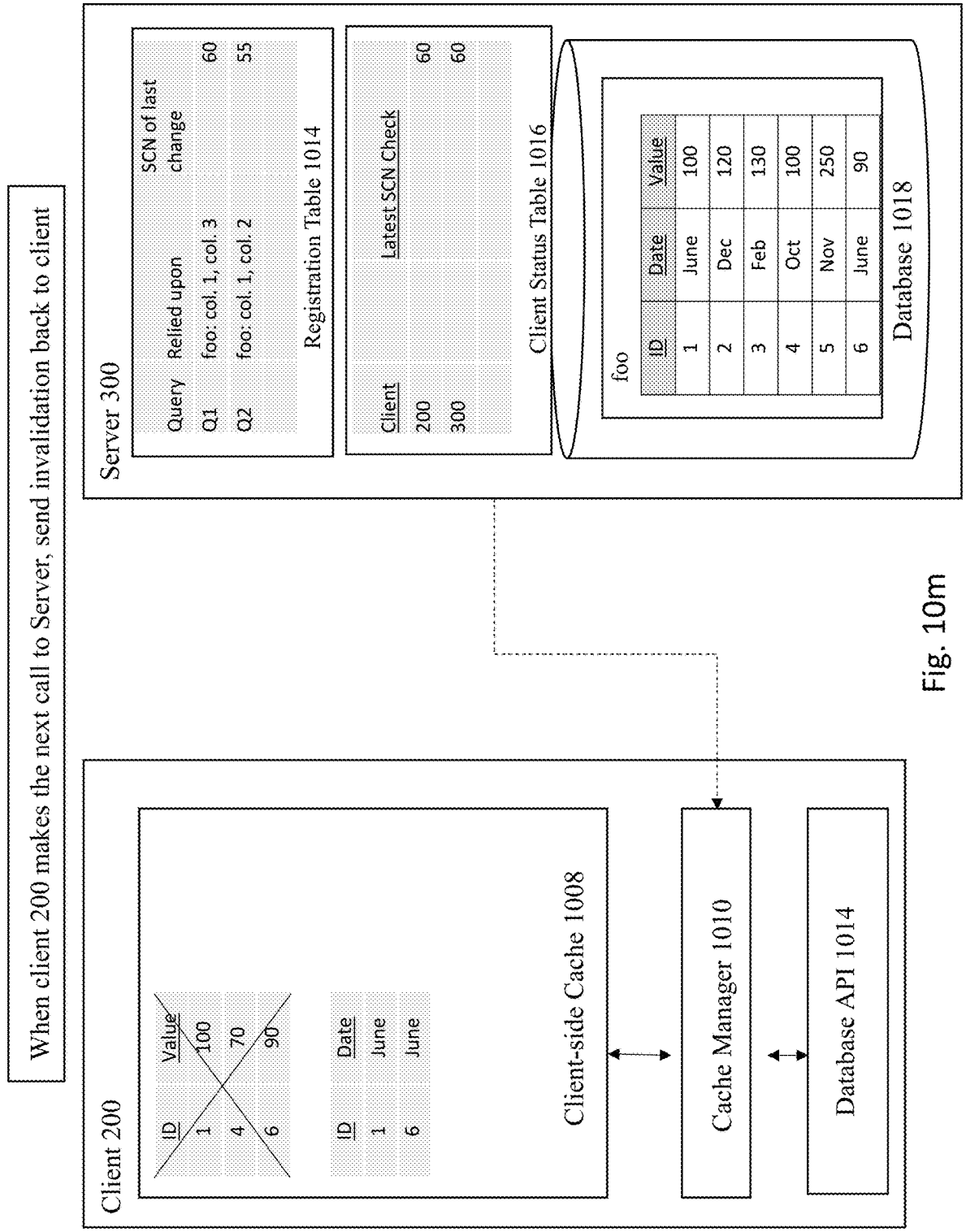

As illustrated in FIG. 10M, at some later point in time (e.g., when client 200 makes a next call to the server), a piggybacked invalidation message can be sent to the client for Q1 by piggybacking the next call to the server. The client 200 is now aware that the client-side cache 1008 is no longer valid and, thus, the client invalidates the cache results (e.g., ID 4 from foo which previously had a value of 70 is now updated to have a value of 100 by the update), as shown in FIG. 10M. In operation, a cache manager 1010 at the client may perform the invalidations for the identified cached result sets corresponding to the query ids in the cache invalidations for the client 200.

Bind-Value Based Invalidations

This portion of the document will now describe an approach to implement a consistent client-side cache for bind-value based registrations of queries according to some embodiments of the invention.

Figure 11:
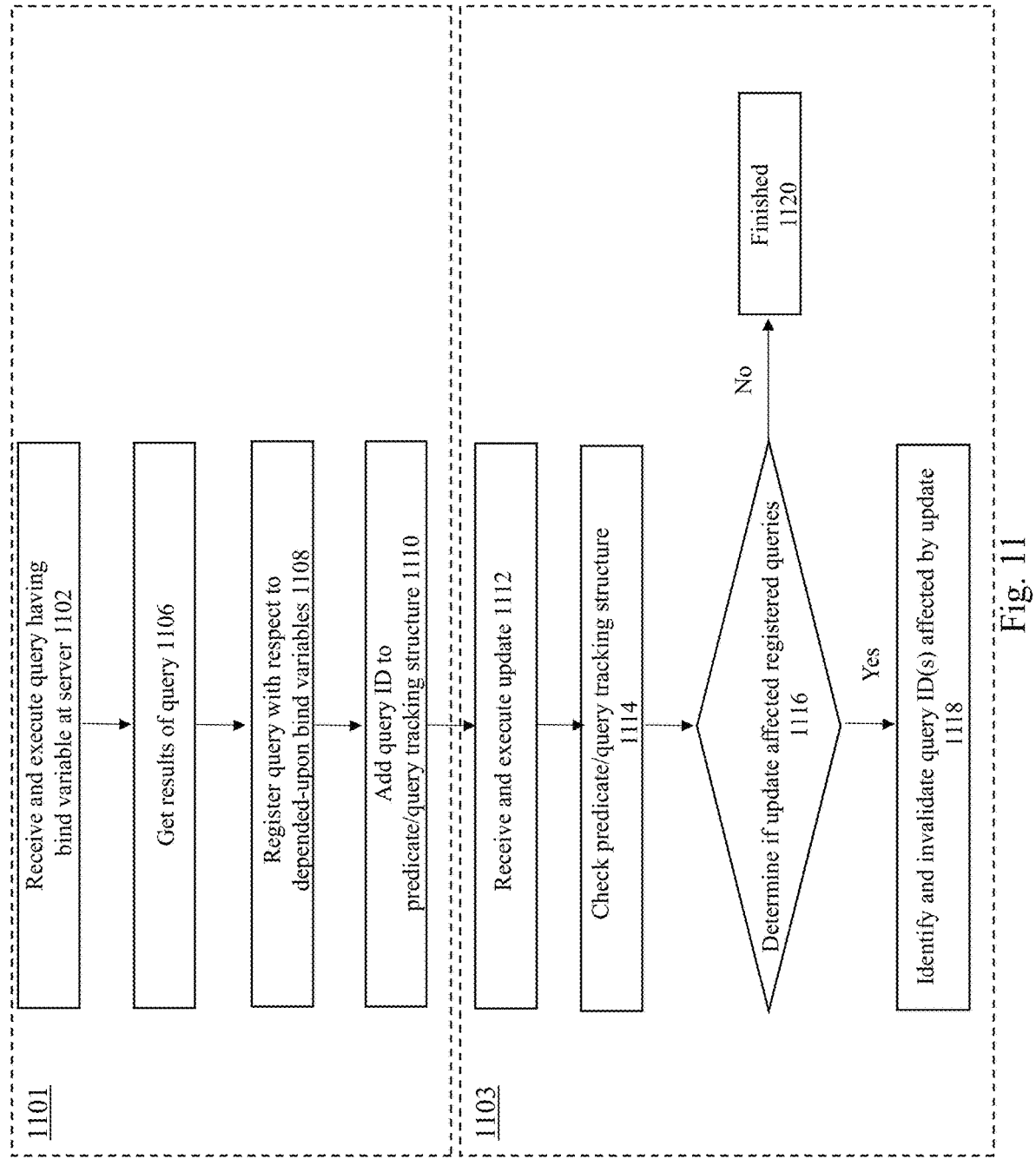
FIG. 11 is a flowchart of a process for implementing a consistent client-side cache for bind-variable based invalidations according to some embodiments of the invention.

FIG. 11 shows a flowchart of an approach to implement a consistent client-side cache for bind-variable registrations of a query according to some embodiments of the invention. At a high level, the flowchart in FIG. 11 is broken down into two parts—steps of the flow chart within 1101 depicts storing a cache in the client-side for a registered query and steps of the flow chart within 1103 depicts a later point in time when a DML statement is sent to the server.

In FIG. 11, the flowchart begins by receiving and executing a query having bind variables against a database on the server 301. Next, the server will obtain the results of the query at 1106. Then, the server registers the query along with the depended-upon bind variable(s) in the registration table and client status table at 1108. During query registration, the system stores the depended-upon bind variable(s) that the query is dependent on. When a DML operation occurs, the system is aware of the bind-variables mapped to those extent/segments where data impacted by DML resides in. At 1110, the server adds the query ID to a predicate/query tracking structure. In some embodiments, the predicate/query tracking structure may be stored as an index AVL tree.

At a later point in time when a DML statement is sent to the server. In 1112, the server receives and executes an update for one or more database objects within the database. For example, one or more bind variables may be updated by the update operation. At 1114, the server checks the predicate/query tracking structure to determine whether any queries are affected. The server then determines if the update affected any registered queries at 1116. This action is performed to check whether there are any queries that have been registered which correspond to a bind variable that has been updated by the update operation. If there are no registered queries that are affected by the update then the process is finished at 1120. However, if there are any registered queries that are affected by the update, then the server identifies and invalidates query ID(s) affected by the update at 1118. In particular, the SCN corresponding to the update operation is included into the affected entries within the registration table.

Figure 12A:
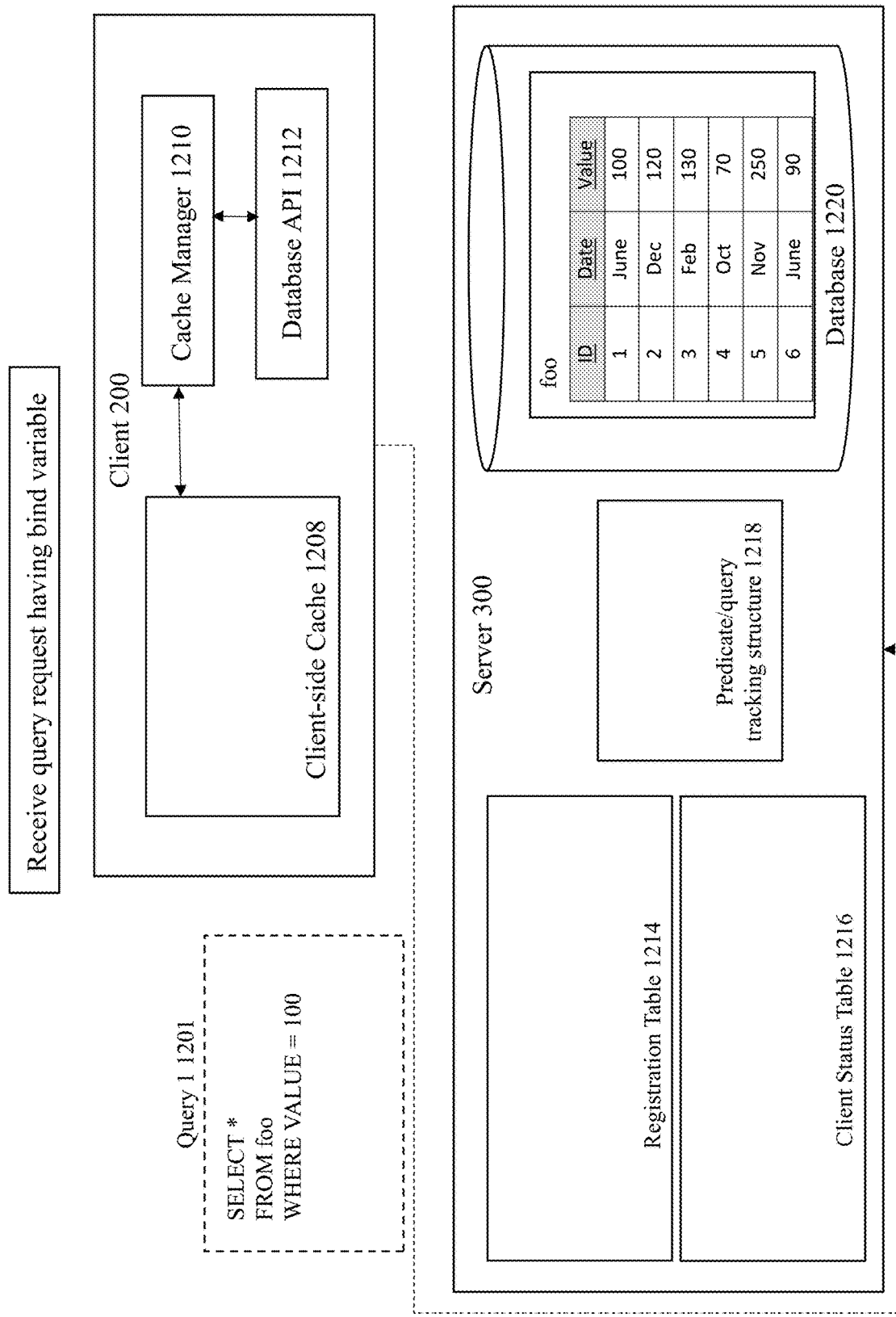
FIGS. 12A-12R illustrate an example of implementing a consistent client-side cache for bind-variable based invalidations according to some embodiments of the invention.
Figure 12B:
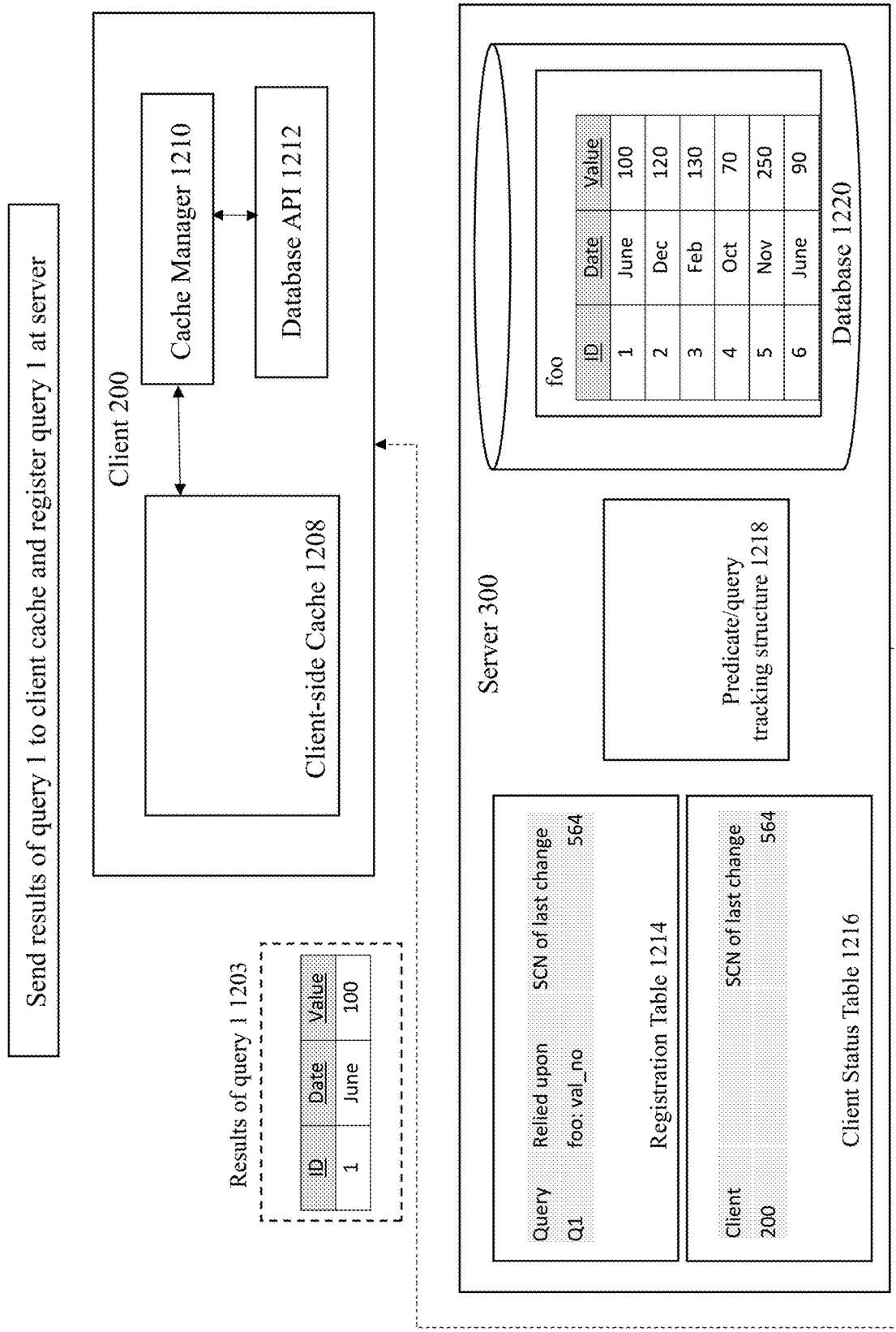
Figure 12C:
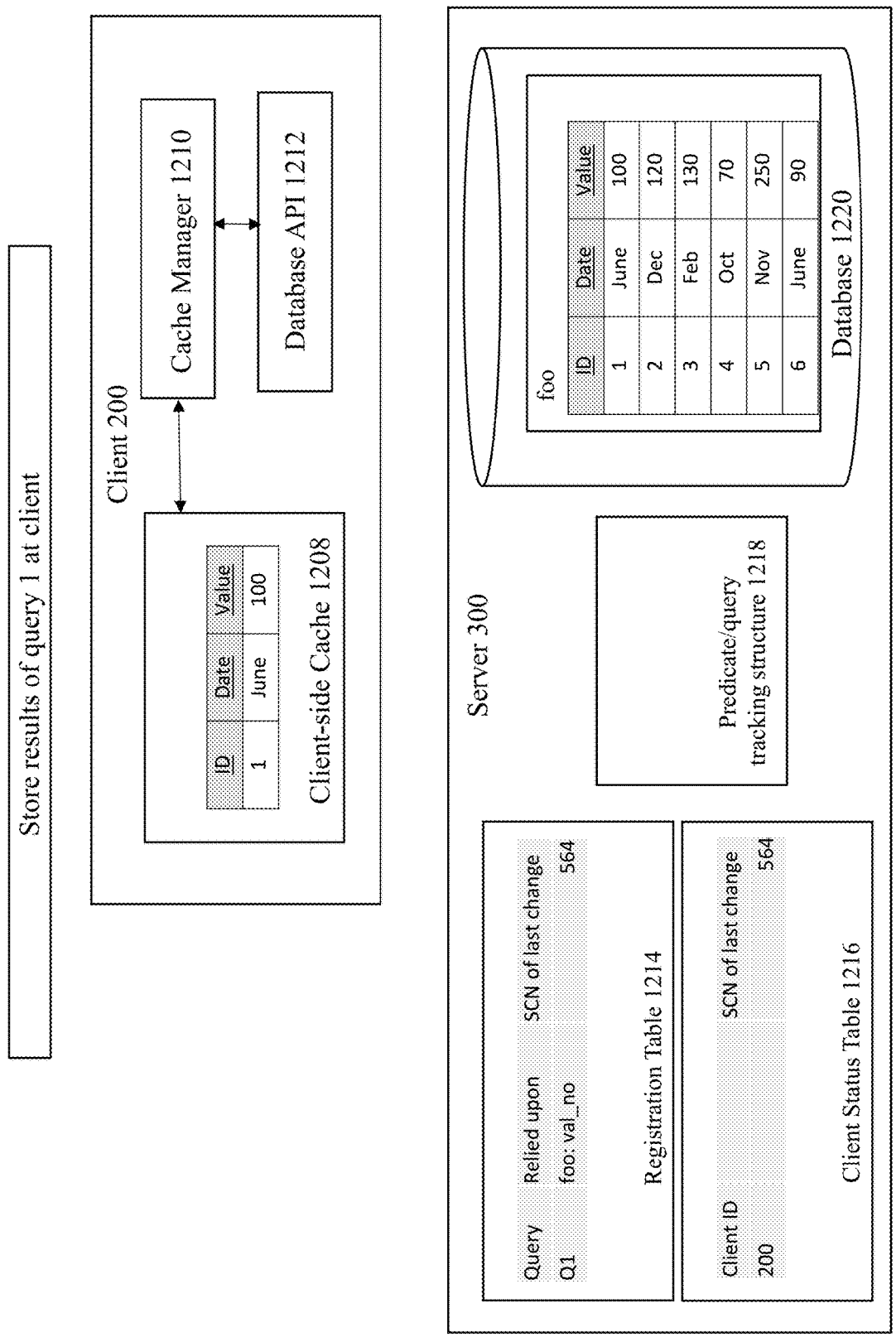
Figure 12D:
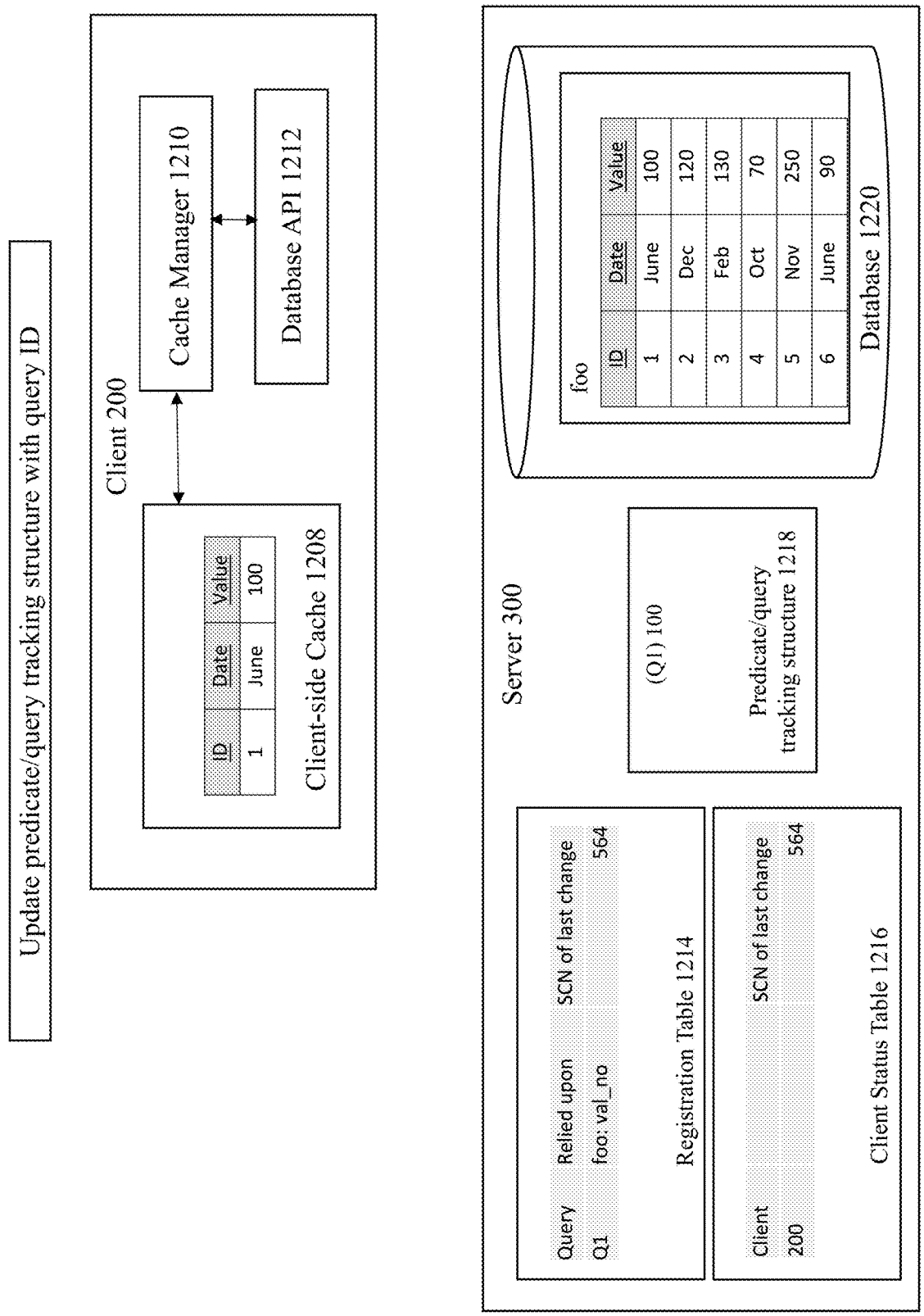
Figure 12E:
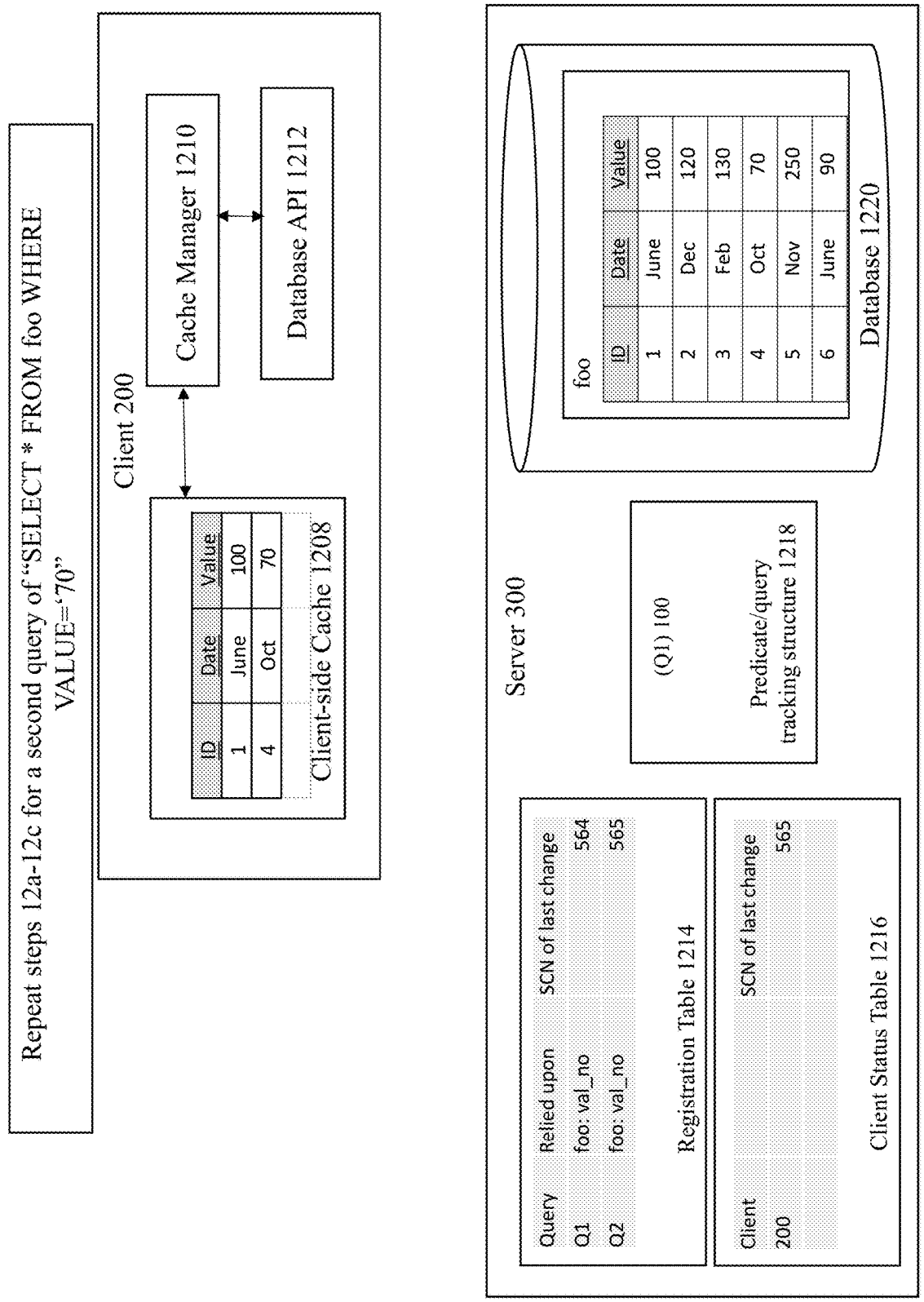
Figure 12F:
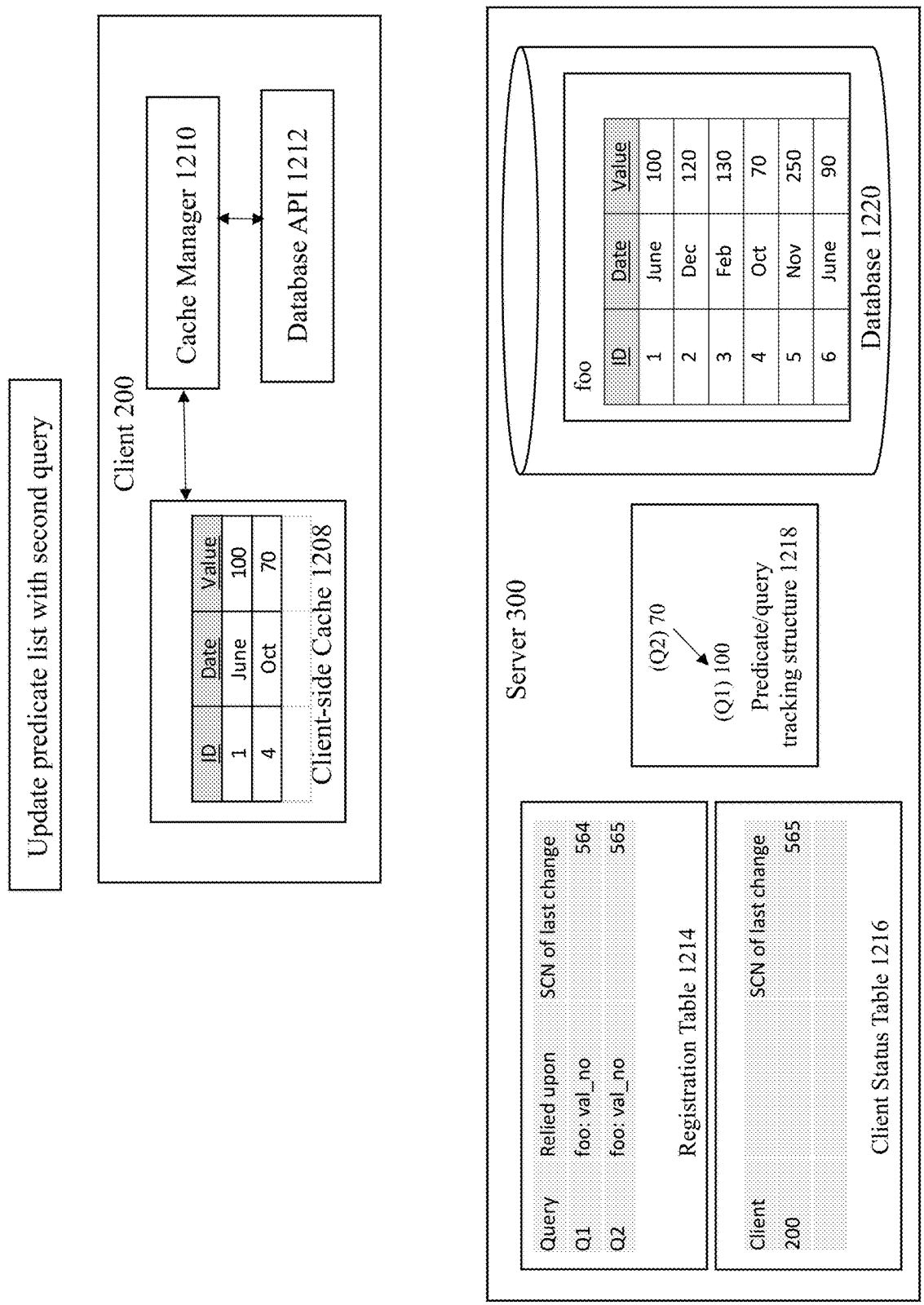
Figure 12G:
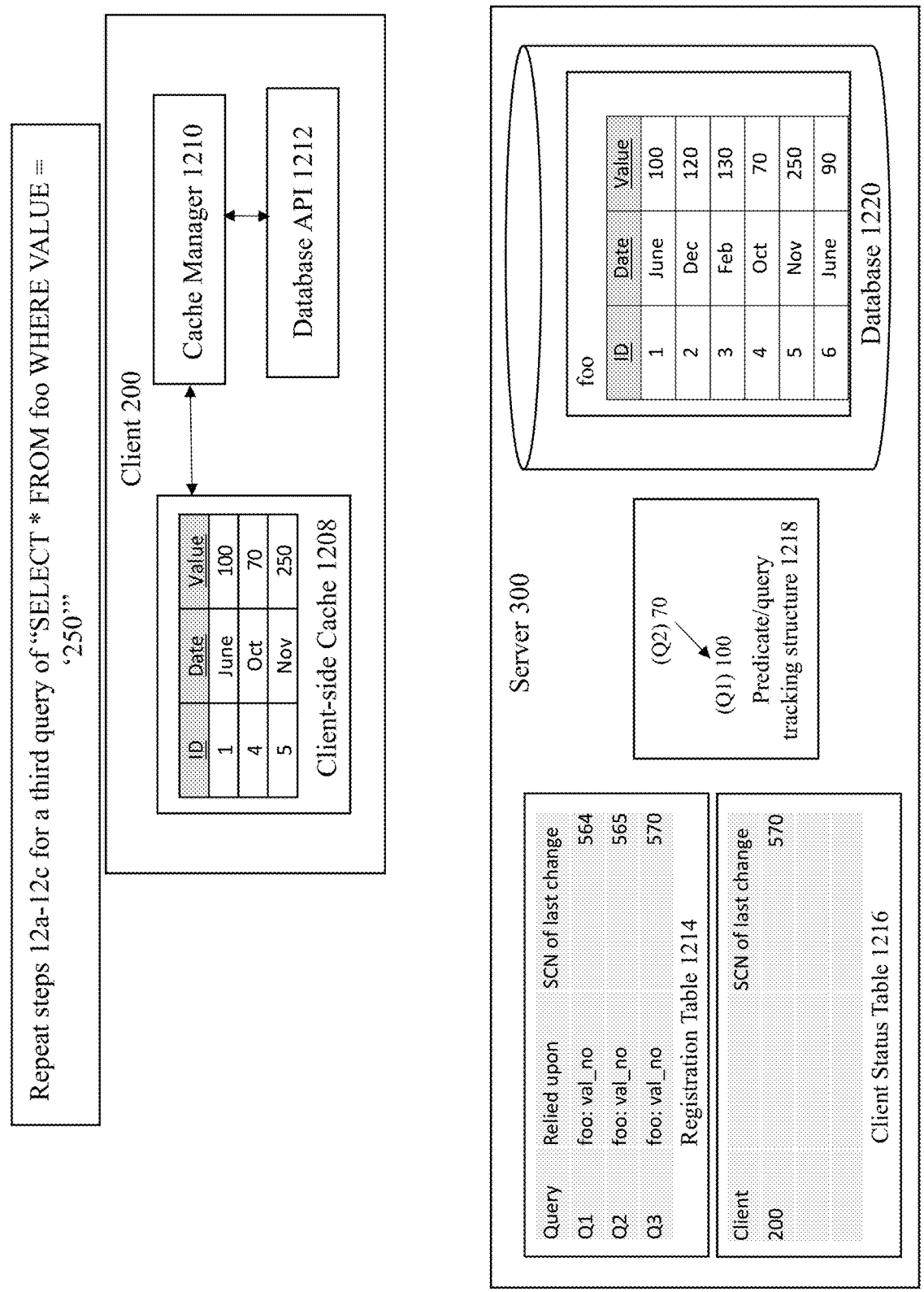
Figure 12H:
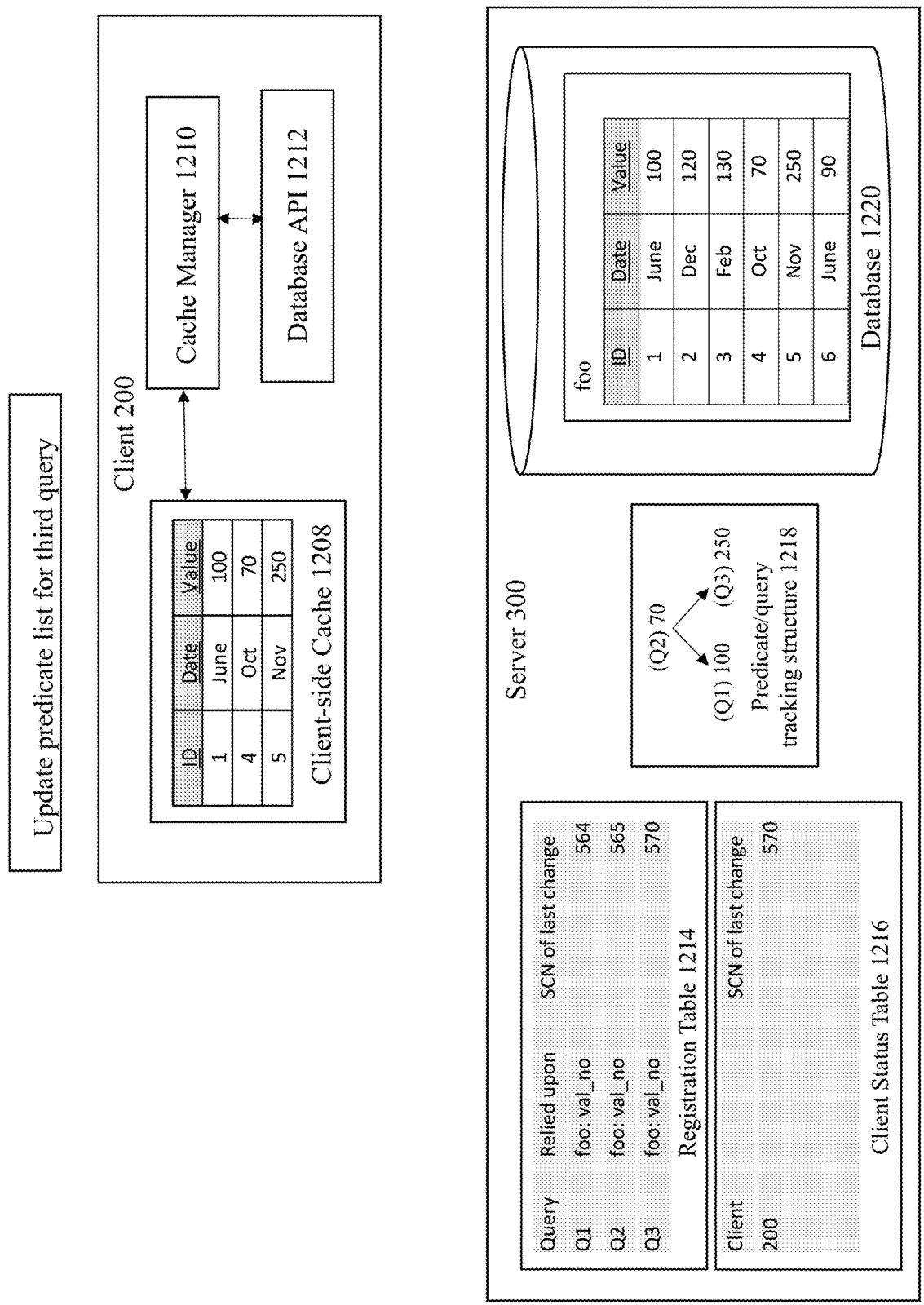
Figure 12I:
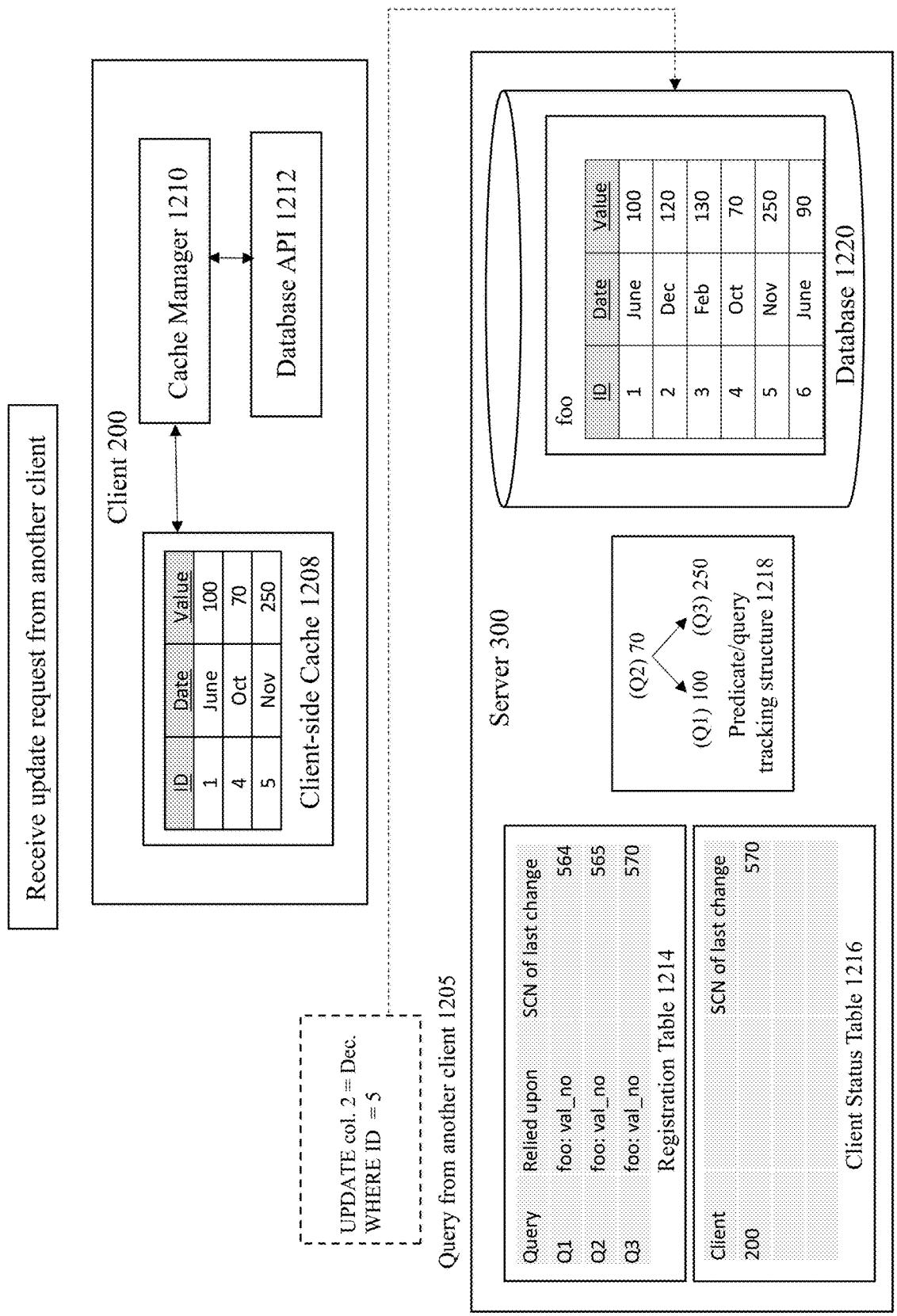
Figure 12J:
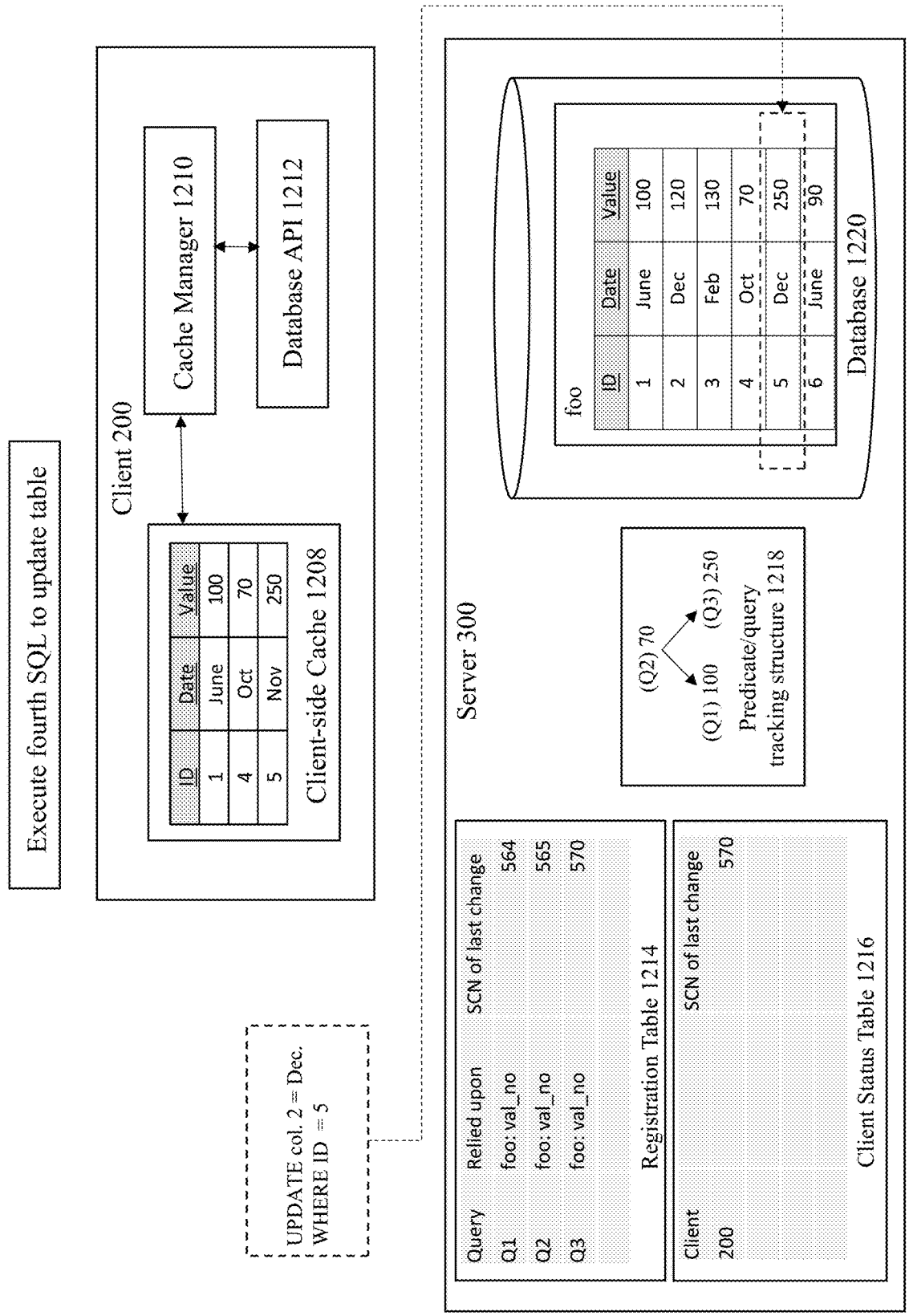
Figure 12K:
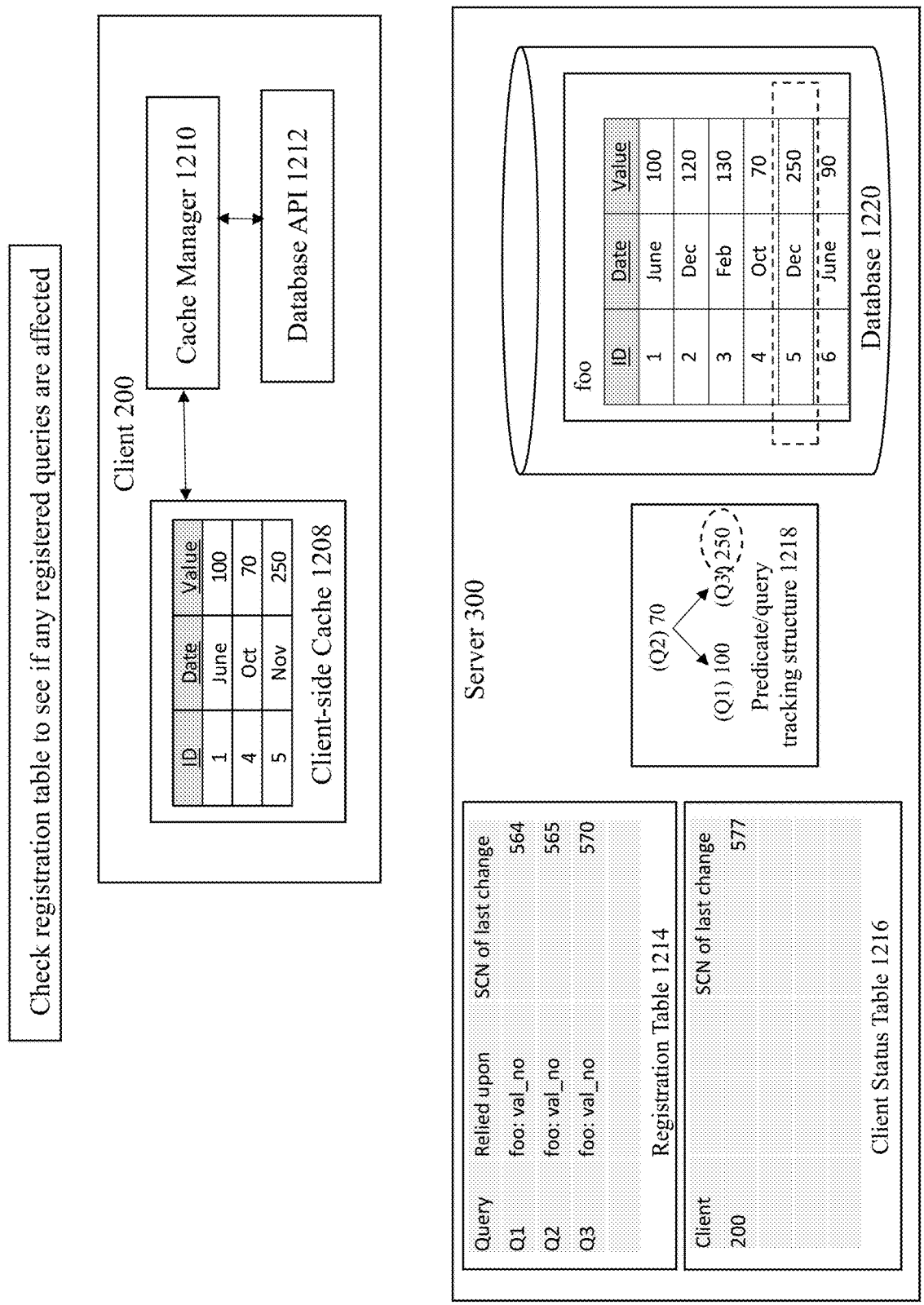
Figure 12I:
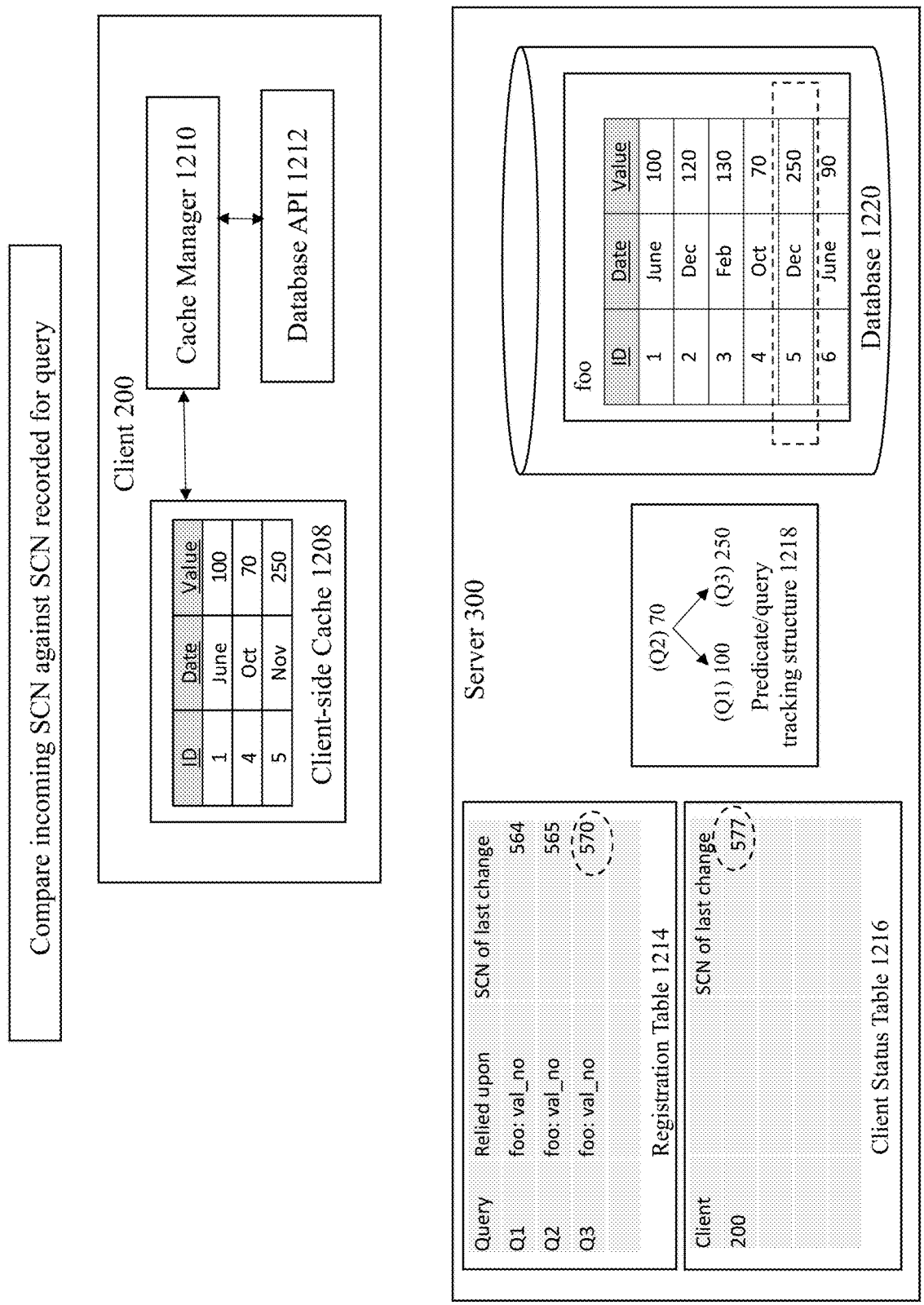
Figure 12M:
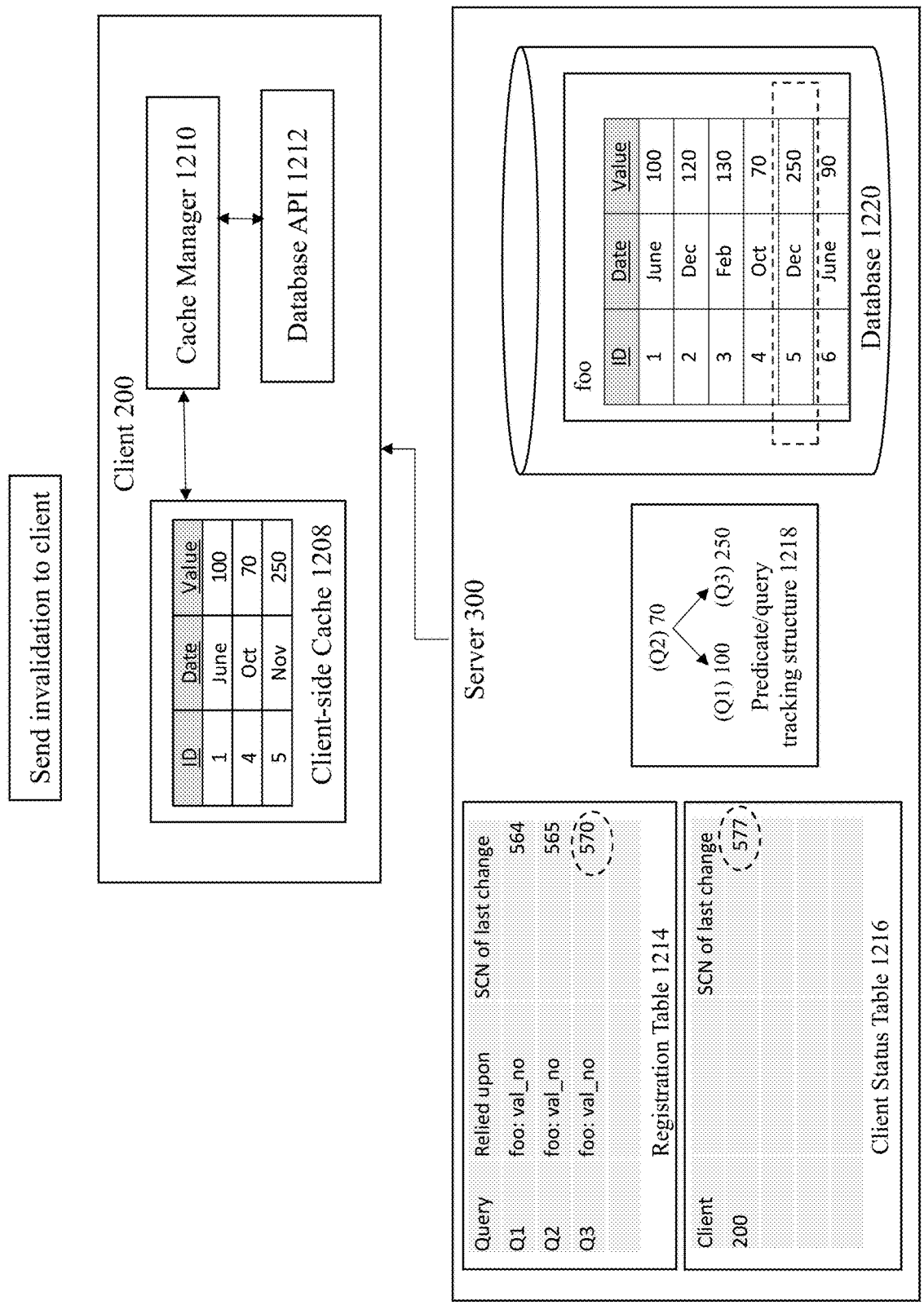
Figure 12N:
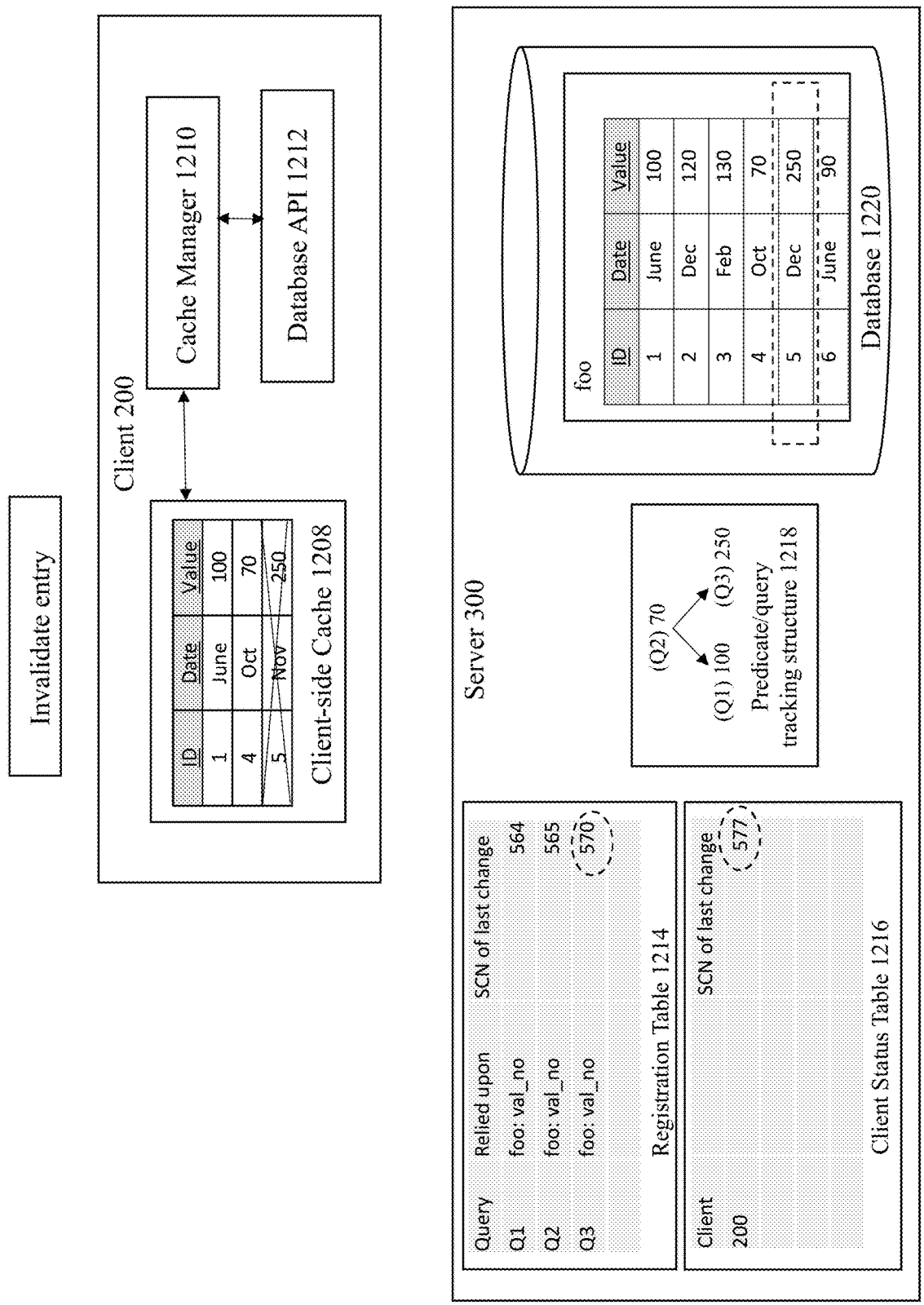
Figure 12O:
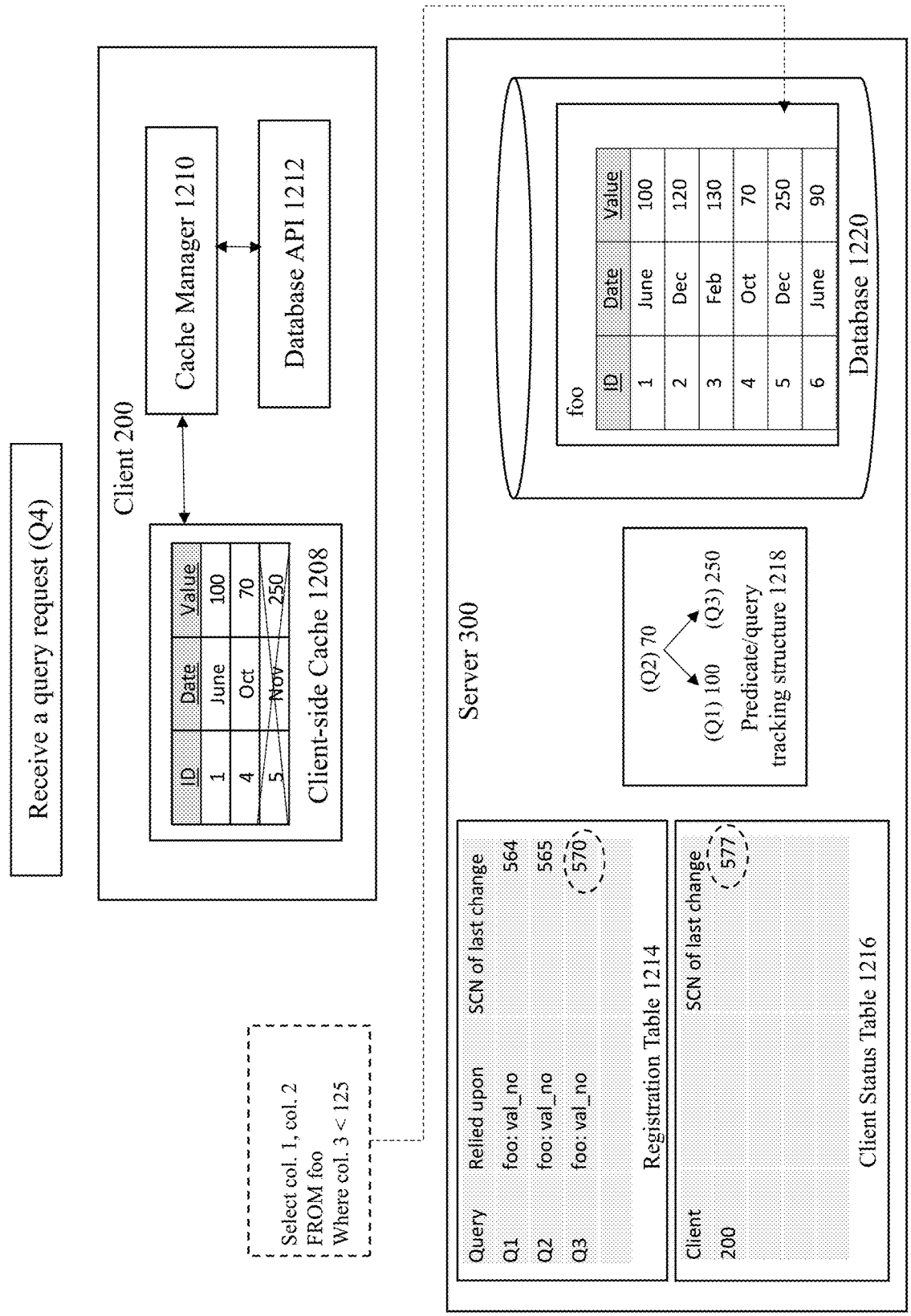
Figure 12P:
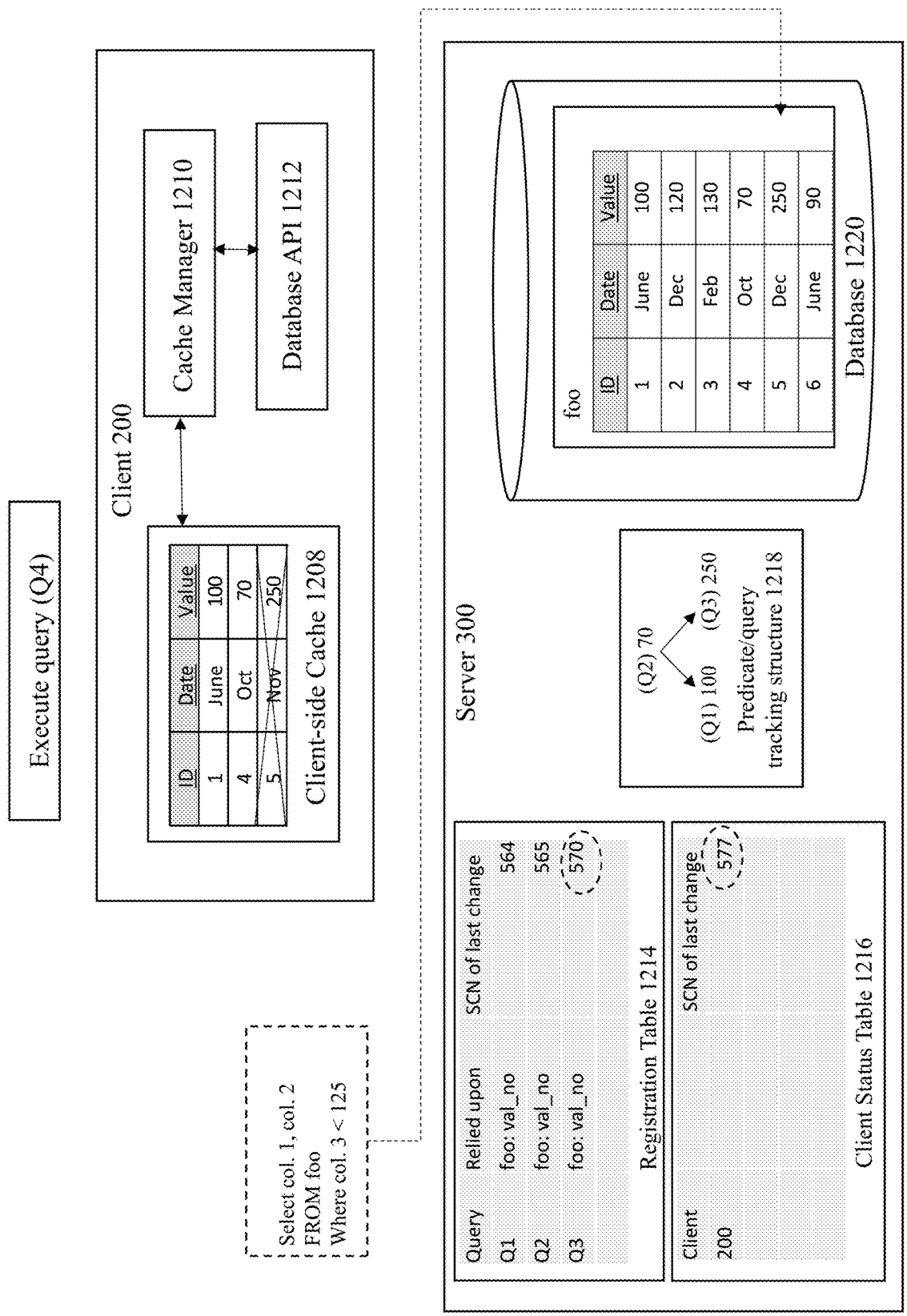
Figure 12Q:
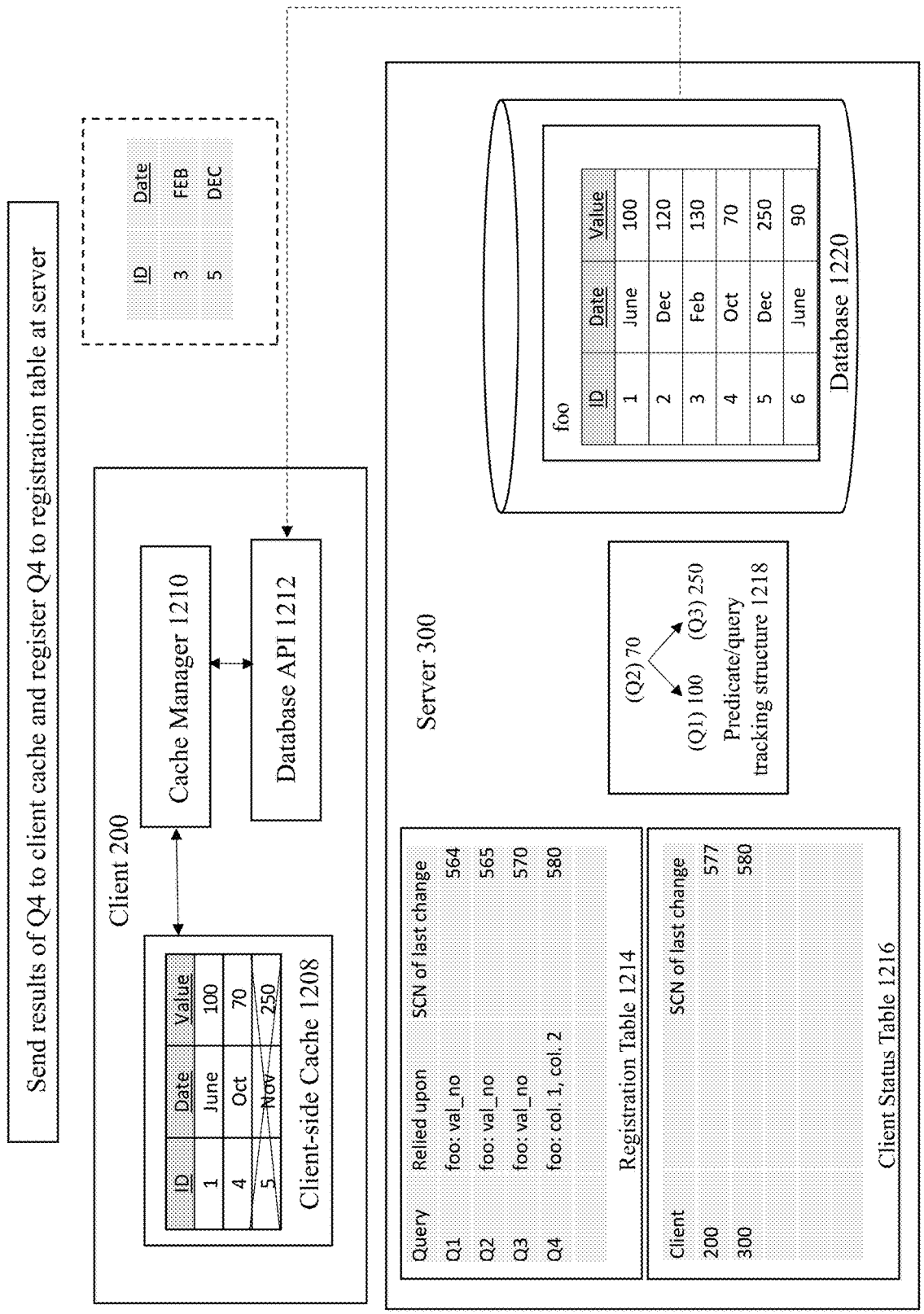

FIGS. 12A-12Q illustrate an example of processing a query with bind-variable according to some embodiments of the invention.

As shown in FIG. 12A, the server 300 receiving the following query 1201: "SELECT*FROM foo WHERE VALUE='100.'" In this example, the server 300 executes the query 1201 against the database 1220 which will obtain any entries in table foo that contain the value 100.

The server 300 then registers query 1 1201 corresponding to the bind-variable relied upon in registration table 1214 and client status table 1216, as shown in FIG. 12b. The server then stores the results of query 1 at the client-side cache 1208 at the client 200, as shown in FIG. 12c. Then, at FIG. 12d, the server 300 updates the predicate/query tracking structure with the query ID. For example, one or more bind-variables may be updated by the update operation.

FIG. 12E shows a similar process to FIGS. 12A-12C for a second query where the server receives a query of: ""SELECT*FROM foo WHERE VALUE='70'". In this example, the server 300 executes the query against the database 1220 which will obtain any entries in table foo that contain the value 70. The server 300 then registers the results of the query in the registration table 1214 and client status table 1216 and updates the predicate list with the second query, as shown in FIG. 12F.

FIG. 12G shows a similar process to FIGS. 12A-12C for a third query where the server receives a query of ""SELECT*FROM foo WHERE VALUE='250'". In this example, the server 300 executes the query against the database 1220 which will obtain any entries in table foo that contain the value 250. The server 300 then registers the results of the query in the registration table 1214 and client status table 1216 and updates the predicate list with the third query, as shown in FIG. 12H.

FIG. 12I shows the server 300 receiving an update request from another client that is not pictured. The server 300 executes the fourth SQL to update the registration table 1214 and the client status table 1216, as shown in FIG. 12J. In this example, the table foo from database 1220 is updated such that the "Date" in col. 2 is now updated to December from November.

FIG. 12K then shows the server 300 checking the registration table 1214 to see if any registered queries are affected by the update. In this case, the predicate/query tracking structure 1218 reveals that Q3 has a particular reliance on 250 (e.g., associated with ID 5) that was affected by the latest update operation. As such, the registration table 1214 and client status table 1216 is checked to see which entries are affected by Q3. The server then compares incoming SCN against the SCN recorded for the query, as shown in FIG. 12L. If there are any registered queries that are affected by the update, as is the case here, then the server will update the specific entries for those queries. In particular, the SCN corresponding to the update operation is included into the affected entries within the registration table.

FIG. 12M shows invalidating the entry related to the affected query ID at the client-side cache 1208 and FIG. 12N shows the server 300 sending an invalidation message to the client 200.

Figure 12R:
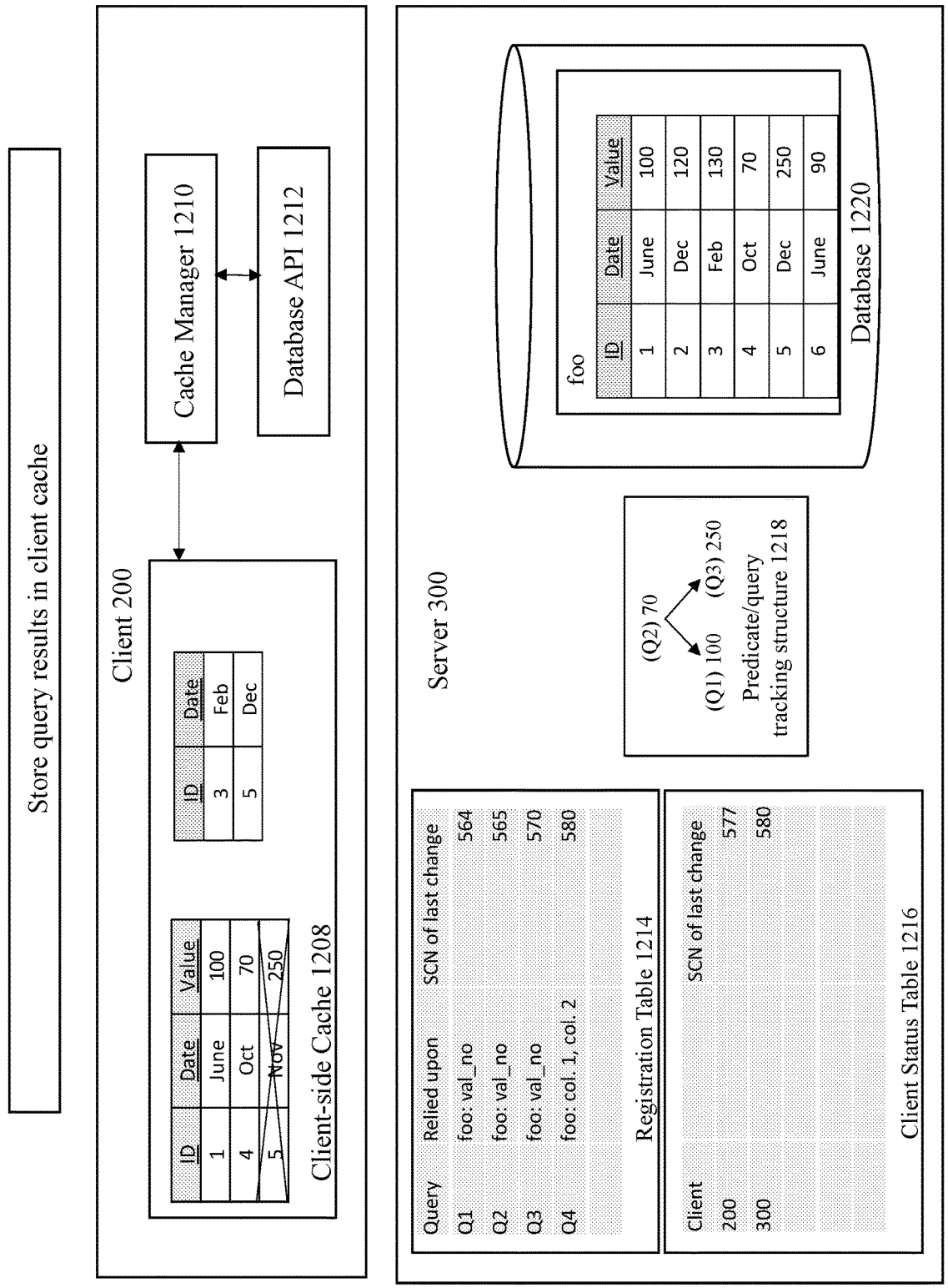

FIGS. 12O-12R shows mixing techniques of relying on column-based invalidations and bind-variable value based invalidations. FIG. 12O depicts the server 300 executing a query that relies on column-based invalidations. The server 300 executes the query, sends the result of query to the client cache, and registers the query to the registration table, as depicted in FIG. 12P. Finally, the client 200 stores the query results in client cache, as shown in FIG. 12R.

2-Level Invalidations

When there are concurrent connections from the same client cache process to the database, it is possible that the invalidations re-invalidate the result set repeatedly. The system stores the snapshot SCN of cached result-set and, only if it is less than the invalidation SCN, does the system invalidate the result-set. Otherwise, the system ignores that invalidation.

Consider an example with: "SELECT*from foo; Cached with SCN=30." If it is a multi-threaded or multi-session client, there can be three calls in parallel going to the server. Consider below the sequence of operations:

Call-1 returns with invalidation SCN 30;
Call-2 is processing on server;
Call-3 re-execute result-set and returns result-set with SCN=35;
Call-2 returns from server and tries to re-invalidate result-set with invalidation SCN 30.

If the system honors all invalidations from the server, then performance will be reduced by un-necessary invalidations. In this case, the system compares cached result-set SCN 35 and ignores invalidation with SCN 30. When client processes have hundreds of connections to a database, the gain by reducing unnecessary invalidation be vastly beneficial. In one embodiment, the above approaches can be combined. For example, a 2-level invalidation with fine-grain partition invalidation.

System Architecture

Figure 13:
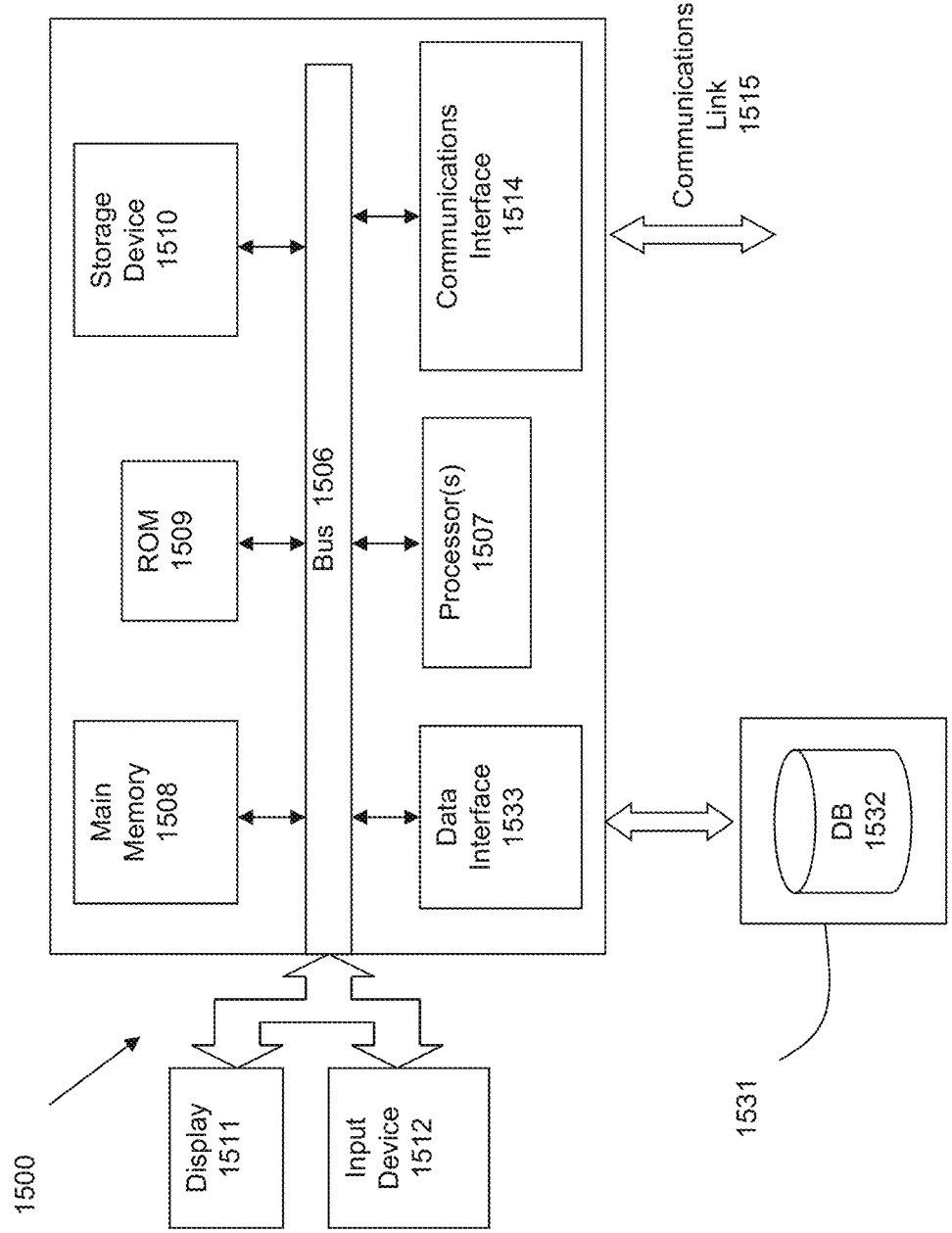
FIG. 13 is a block diagram of a computing system suitable for implementing an embodiment of the present invention.

FIG. 13 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for caching query results in a client-side cache, comprising:
    caching results for executing a query as cached query results at a client-side cache stored at a client, wherein the query is directed to a database table stored at a server that is partitioned into a plurality of partitions;
    generating, for a plurality of clients, a client status table and a registration table stored at a server, wherein the client status table interacts with the registration table to determine whether an update to a table partition relied upon by one or more queries associated with a specific client of the plurality of clients has occurred that invalidates the cached query results at the client-side cache of the specific client, by:
        generating the client status table comprising a first client status table column identifying a client and a second client status table column identifying information corresponding to a client interaction time with the server, wherein the client status table is used to determine a last invalidation check of the client-side cache for the client, and
        generating the registration table comprising a first registration table column identifying the query, a second registration table column identifying a table partition from a plurality of partitions that was relied upon by the query to generate the cached query results that are cached in the client-side cache, and a third registration table column identifying information corresponding to a last change time to the table partition from the plurality of partitions that was relied upon by the query; and
    executing invalidation of the cached query results at the specific client in response to the last change time to the table partition from the registration table for the one or more queries associated with the specific client being greater than the client interaction time from the client status table corresponding to the last invalidation check of the client-side cache for the specific client.

2. The method of claim 1, wherein the registration table further comprises one or more additional entries corresponding to a level of granularity less than a granularity of the table corresponding to at least one of column-based information, row-based information, or bind-variable information for a bind variable pertaining to the query.

3. The method of claim 1, further comprising:
    sending first reference information with a server request indicating a state of a database after a previous database server request by the client;
    receiving second reference information with the query results indicating a current state of the database; and
    updating the first reference information with the second reference information.

4. The method of claim 1, further comprising:
    invalidating some or all of the cached query results that have been indicated as invalid for a client session, wherein the some or all of the cached query results comprise cached results for the client session, and the cached query results relate to one or more uncommitted database changes made by the client with the client session.

5. The method of claim 3, further comprising receiving one or more cached result identifiers, wherein the one or more cached result identifiers relate to one or more transactions that occurred between the first reference information and the second reference information.

6. The method of claim 1, further comprising:
    executing the invalidation at a server in response to the cached query results at the client-side cache being invalid due to a database operation based at least in part upon a first commit number or timestamp associated with a last change associated with the query and a second commit number or timestamp associated with the database operation.

7. The method of claim 1, further comprising:
maintaining a client status table that comprises an entry for the client and a last check of a commit number or timestamp for the client;
wherein the last check of the commit number or timestamp for the client tracks when the client was last notified of a possible invalidation.

8. The method of claim 1, wherein a registration entry in the registration table further comprises a timestamp or a commit number associated with the registration entry, wherein if a subsequent change is applied to any of a plurality of queries identified in the registration table then the timestamp or the commit number associated with the registration entry changes.

9. The method of claim 1, wherein invalidation information comprising one or more invalid cached result identifiers corresponding to the cached query results are piggybacked onto a server response that was issued for another query that is different from the query that produced the cached query results.

10. A computer program product comprising a non-transitory computer readable medium having executable code which, when executed by a processor, causes the processor to perform a set of acts for caching query results in a client-side cache, the set of acts comprising:
caching results for executing a query as cached query results at a client-side cache stored at a client, wherein the query is directed to a database table stored at a server that is partitioned into a plurality of partitions;
generating, for a plurality of clients, a client status table and a registration table stored at a server, wherein the client status table interacts with the registration table to determine whether an update to a table partition relied upon by one or more queries associated with a specific client of the plurality of clients has occurred that invalidates the cached query results at the client-side cache of the specific client, by:
generating the client status table comprising a first client status table column identifying a client and a second client status table column identifying information corresponding to a client interaction time with the server, wherein the client status table is used to determine a last invalidation check of the client-side cache for the client, and
generating the registration table comprising a first registration table column identifying the query, a second registration table column identifying a table partition from a plurality of partitions that was relied upon by the query to generate the cached query results that are cached in the client-side cache, and a third registration table column identifying information corresponding to a last change time to the table partition from the plurality of partitions that was relied upon by the query; and
executing invalidation of the cached query results at the specific client in response to the last change time to the table partition from the registration table for the one or more queries associated with the specific client being greater than the client interaction time from the client status table corresponding to the last invalidation check of the client-side cache for the specific client.

11. The computer program product of claim 10, wherein the registration table further comprises one or more additional entries corresponding to a level of granularity less than a granularity of the table corresponding to at least one of column-based information, row-based information, or bind-variable information for a bind variable pertaining to the query.

12. The computer program product of claim 10, wherein the set of acts by the executable code further comprises:
sending first reference information with a server request indicating a state of a database after a previous database server request by the client;
receiving second reference information with the results indicating a current state of the database; and
updating the first reference information with the second reference information.

13. The computer program product of claim 10, wherein the set of acts by the executable code further comprises:
invalidating some or all of the cached query results that have been indicated as invalid for a client session, wherein the some or all of the cached query results comprise cached results for the client session and the cached query results relate to one or more uncommitted database changes made by the client with the client session.

14. The computer program product of claim 12, wherein the set of acts by the executable code further comprises:
receiving one or more cached result identifiers, wherein the one or more cached result identifiers relate to one or more transactions that occurred between the first reference information and the second reference information.

15. The computer program product of claim 10, wherein the set of acts by the executable code further comprises:
executing the invalidation at a server in response to the cached query results at the client-side cache being invalid due to a database operation based at least in part upon a first commit number or timestamp associated with a last change associated with the query pertaining to the query or the table partition and a second commit number or timestamp associated with the database operation.

16. The computer program product of claim 10, wherein invalidation information comprising one or more invalid cached result identifiers corresponding to the cached query results are piggybacked onto a server response that was issued for another query that is different from the query that produced the cached query results.

17. The computer program product of claim 10, wherein a registration entry in the registration table further comprises a timestamp or a commit number associated with the registration entry, wherein if a subsequent change is applied to any of a plurality of queries identified in the registration table then the timestamp or the commit number associated with the registration entry changes.

18. A system for caching query results in a client-side cache comprising:
a processor; and
memory storing a sequence of instructions which, when executed by the processor, causes the processor to execute a set of acts, the set of acts comprising:
caching results for executing a query as cached query results at a client-side cache stored at a client, wherein the query is directed to a database table stored at a server that is partitioned into a plurality of partitions;
generating, for a plurality of clients, a client status table and a registration table stored at a server, wherein the client status table interacts with the registration table to determine whether an update to a table partition relied upon by one or more queries associated with a specific client of the plurality of clients has occurred that invalidates the cached query results at the client-side cache of the specific client, by:
- generating the client status table comprising a first client status table column identifying a client and a second client status table column identifying information corresponding to a client interaction time with the server, wherein the client status table is used to determine a last invalidation check of the client-side cache for the client, and
- generating the registration table comprising a first registration table column identifying the query, a second registration table column identifying the table partition from a plurality of partitions that was relied upon by the query to generate the cached query results that are cached in the client-side cache, and a third registration table column identifying information corresponding to a last change time to the table partition from the plurality of partitions that was relied upon by the query; and executing invalidation of the cached query results at the specific client in response to the last change time to the table partition from the registration table for the one or more queries associated with the specific client being greater than the client interaction time from the client status table corresponding to the last invalidation check of the client-side cache for the specific client.

19. The system of claim 18, wherein invalidation information comprising one or more invalid cached result identifiers corresponding to the cached query results are piggybacked onto a server response that was issued for another query that is different from the query that produced the cached query results.

20. The system of claim 18, wherein the processor is further programmed for:
- sending first reference information with a server request indicating a state of a database after a previous database server request by the client;
- receiving second reference information with the query results indicating a current state of the database; and
- updating the first reference information with the second reference information.

* * * * *

UNITED STATES PATENT AND TRADEMARK OFFICE
CERTIFICATE OF CORRECTION

| | |
|---|---|
| PATENT NO. | : 11,567,934 B2 |
| APPLICATION NO. | : 15/958517 |
| DATED | : January 31, 2023 |
| INVENTOR(S) | : Bastawala et al. |

It is certified that error appears in the above-identified patent and that said Letters Patent is hereby corrected as shown below:

On the Title Page

Item (73), Assignee, Line 1, after "Corporation" insert -- (US) --, therefor.

In the Specification

In Column 2, Line 48, delete "invention" and insert -- invention. --, therefor.

In Column 6, Line 28, delete "DML," and insert -- DML --, therefor.

In Column 9, Line 15, delete "that that" and insert -- that --, therefor.

In Column 10, Line 4, delete "snapshot." and insert -- Snapshot. --, therefor.

In Column 10, Line 27, after "in" insert -- FIG. --, therefor.

In Column 13, Line 40, delete "PTSN," and insert -- PSTN, --, therefor.

Signed and Sealed this
Nineteenth Day of December, 2023

Katherine Kelly Vidal
*Director of the United States Patent and Trademark Office*